US011803728B2

(12) United States Patent
Rasmussen et al.

(10) Patent No.: US 11,803,728 B2
(45) Date of Patent: *Oct. 31, 2023

(54) ACOUSTIC BIOMETRIC TOUCH SCANNER

(71) Applicant: The Board of Trustees of the Leland Stanford Junior University, Stanford, CA (US)

(72) Inventors: Morten Fischer Rasmussen, San Francisco, CA (US); Gerard Touma, Stanford, CA (US); Butrus T. Khuri-Yakub, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,406

(22) Filed: Dec. 29, 2021

(65) Prior Publication Data

US 2022/0237941 A1 Jul. 28, 2022

Related U.S. Application Data

(63) Continuation of application No. 16/661,674, filed on Oct. 23, 2019, now Pat. No. 11,288,479, which is a (Continued)

(51) Int. Cl.

*G06K 19/073* (2006.01)
*G06F 21/32* (2013.01)
(Continued)

(52) U.S. Cl.

CPC ....... *G06K 19/07354* (2013.01); *G06F 21/32* (2013.01); *G06K 19/0718* (2013.01);
(Continued)

(58) Field of Classification Search

CPC .......... G06K 19/07354; G06K 19/0718; G06F 21/32; G06V 40/1306; G06V 40/1388; G06V 40/1394; G06V 40/15; G06V 40/70
(Continued)

(56) References Cited

U.S. PATENT DOCUMENTS

| | | |
|---|---|---|
| 4,429,413 A | 1/1984 | Edwards |
| 4,977,601 A | 12/1990 | Wieslaw |

(Continued)

FOREIGN PATENT DOCUMENTS

| | | |
|---|---|---|
| CN | 104503172 A | 4/2015 |
| CN | 105378756 A | 3/2016 |

(Continued)

OTHER PUBLICATIONS

Decision of Rejection dated Apr. 26, 2022 for Japanese Patent Application No. 2019-558542.

(Continued)

*Primary Examiner* — Ali Bayat
(74) *Attorney, Agent, or Firm* — Knobbe, Martens, Olson & Bear, LLP

(57) ABSTRACT

An acoustic biometric touch scanner device and method is disclosed. In one aspect, an acoustic fingerprint sensing device includes an array of ultrasonic transducers configured to transmit an ultrasound signal having a frequency in a range from 50 megahertz (MHz) to 500 MHz. The acoustic fingerprint ultrasonic transducers include a piezoelectric film. The acoustic fingerprint sensing device further includes a receiving surface configured to receive a finger. The acoustic fingerprint sensing device further includes a processor configured to generate an image of at least a portion of a fingerprint of the finger based on a reflection of the ultrasound signal from the finger.

20 Claims, 43 Drawing Sheets

Related U.S. Application Data continuation of application No. 16/399,724, filed on Apr. 30, 2019, now Pat. No. 10,489,627, which is a continuation of application No. PCT/US2018/029309, filed on Apr. 25, 2018, which is a continuation-in-part of application No. 15/605,785, filed on May 25, 2017, now Pat. No. 9,953,205.

(60) Provisional application No. 62/658,370, filed on Apr. 16, 2018, provisional application No. 62/491,984, filed on Apr. 28, 2017.

(51) Int. Cl.

| | |
|---|---|
| ***G06K 19/07*** | (2006.01) |
| ***G06V 40/13*** | (2022.01) |
| ***G06V 40/12*** | (2022.01) |
| *G06V 40/10* | (2022.01) |
| *G06V 40/70* | (2022.01) |

(52) U.S. Cl.
CPC ...... *G06V 40/1306* (2022.01); *G06V 40/1388* (2022.01); *G06V 40/1394* (2022.01); *G06V 40/15* (2022.01); *G06V 40/70* (2022.01)

(58) Field of Classification Search
USPC .......................................................... 382/124
See application file for complete search history.

(56) References Cited

U.S. PATENT DOCUMENTS

| | | | | |
|---|---|---|---|---|
| 5,456,256 | A | 10/1995 | Schneider et al. | |
| 5,935,071 | A | 8/1999 | Schneider et al. | |
| 6,292,576 | B1 | 9/2001 | Brownlee | |
| 6,314,195 | B1 | 11/2001 | Fukuzumi | |
| 6,327,376 | B1 | 12/2001 | Harkin | |
| 7,400,750 | B2 | 7/2008 | Nam | |
| 8,201,739 | B2 | 6/2012 | Schneider et al. | |
| 8,310,372 | B2 | 11/2012 | Kukula et al. | |
| 8,724,859 | B2 | 5/2014 | Schneider et al. | |
| 8,801,274 | B2 | 8/2014 | Mainguet et al. | |
| 8,977,013 | B2 | 3/2015 | Maev et al. | |
| 9,323,393 | B2 | 4/2016 | Djordjev et al. | |
| 9,453,822 | B2 | 9/2016 | Schneider et al. | |
| 9,815,087 | B2 | 11/2017 | Ganti | |
| 9,953,205 | B1 | 4/2018 | Rasmussen et al. | |
| 10,262,188 | B2 | 4/2019 | Agassy | |
| 10,489,627 | B2 | 11/2019 | Rasmussen | |
| 10,592,718 | B2 | 3/2020 | Khuri-Yakub | |
| 10,713,347 | B2 * | 7/2020 | Talwerdi | G06F 21/86 |
| 10,846,501 | B2 | 11/2020 | Rasmussen et al. | |
| 2003/0001459 | A1 | 1/2003 | Scott | |
| 2004/0140735 | A1 | 7/2004 | Scott et al. | |
| 2005/0069182 | A1 | 3/2005 | Schneider et al. | |
| 2005/0157912 | A1 | 7/2005 | Schneider et al. | |
| 2005/0163353 | A1 | 7/2005 | Schneider et al. | |
| 2006/0173316 | A1 | 8/2006 | Schneider et al. | |
| 2009/0219154 | A1 | 9/2009 | Kukula et al. | |
| 2010/0113952 | A1 | 5/2010 | Raguin et al. | |
| 2012/0177257 | A1 | 7/2012 | Maev et al. | |
| 2012/0279865 | A1 | 11/2012 | Regniere et al. | |
| 2013/0131515 | A1 | 5/2013 | Lee | |
| 2014/0090473 | A1 | 4/2014 | Schneider et al. | |
| 2014/0219521 | A1 | 8/2014 | Schmitt et al. | |
| 2014/0355381 | A1 | 12/2014 | Lal et al. | |
| 2015/0016223 | A1 | 1/2015 | Dickinson et al. | |
| 2015/0036065 | A1 | 2/2015 | Yousefpor et al. | |
| 2015/0169136 | A1 | 6/2015 | Ganti | |
| 2015/0198699 | A1 | 7/2015 | Kuo et al. | |
| 2015/0220771 | A1 | 8/2015 | Thiebot et al. | |
| 2015/0241393 | A1 | 8/2015 | Ganti et al. | |
| 2016/0042217 | A1 | 2/2016 | Kim et al. | |
| 2016/0070404 | A1 | 3/2016 | Kerr et al. | |
| 2016/0117541 | A1 | 4/2016 | Lu et al. | |
| 2016/0149116 | A1 | 5/2016 | Wang | |
| 2016/0163958 | A1 | 6/2016 | Park | |
| 2016/0246427 | A1 | 8/2016 | Xing et al. | |
| 2016/0315246 | A1 | 10/2016 | Wang | |
| 2017/0060315 | A1 | 3/2017 | Park et al. | |
| 2017/0075700 | A1 | 3/2017 | Abudi et al. | |
| 2017/0090024 | A1 | 3/2017 | Kitchens, II et al. | |
| 2017/0090028 | A1 | 3/2017 | Djordjev et al. | |
| 2017/0110504 | A1 | 4/2017 | Panchawagh et al. | |
| 2017/0231534 | A1 | 8/2017 | Agassy et al. | |
| 2017/0285817 | A1 * | 10/2017 | Mori | G06F 3/0446 |
| 2017/0285877 | A1 * | 10/2017 | Hinger | G01N 29/26 |
| 2017/0300799 | A1 | 10/2017 | Breed | |
| 2017/0330012 | A1 * | 11/2017 | Salvia | G06F 1/3231 |
| 2017/0364726 | A1 | 12/2017 | Buchan | |
| 2018/0107854 | A1 * | 4/2018 | Tsai | B81C 1/00301 |
| 2018/0129849 | A1 | 5/2018 | Strohmann et al. | |
| 2018/0144173 | A1 * | 5/2018 | Bauchspies | G06V 40/70 |
| 2018/0357457 | A1 | 12/2018 | Rasmussen | |
| 2019/0050618 | A1 | 2/2019 | Khuri-Yakub | |
| 2019/0087621 | A1 | 3/2019 | Khuri-Yakub | |
| 2019/0258841 | A1 | 8/2019 | Rasmussen | |
| 2020/0125815 | A1 | 4/2020 | Lu et al. | |

FOREIGN PATENT DOCUMENTS

| | | | |
|---|---|---|---|
| JP | 2010-233224 | | 10/2010 |
| JP | 2016-513983 | | 5/2016 |
| JP | 2016-535338 | A | 11/2016 |
| KR | 10-2002-0089403 | A | 11/2002 |
| KR | 10-2016-0016330 | A | 2/2016 |
| TW | 201636901 | A | 10/2016 |
| WO | WO 01/71648 | A | 9/2001 |
| WO | WO 2005/070297 | A1 | 8/2005 |
| WO | WO 2006/042144 | A2 | 4/2006 |
| WO | WO 2015/066599 | A2 | 5/2015 |
| WO | WO 2015/112452 | A1 | 7/2015 |
| WO | WO 2015/134816 | A1 | 9/2015 |
| WO | WO 2016/115363 | A1 | 7/2016 |
| WO | WO 2018-026163 | | 2/2018 |

OTHER PUBLICATIONS

Bamber, Lee, "Pulse Detection with Intel® ReaslSense™ Technology," updated Jul. 31, 2015, available at https://software.intel.com/en-us/articles/pulse-detection-with-intel-realsense-technology.

Brown, Mark, "MIT algorithm measures your pulse by looking at your face," Wired, Jul. 25, 2012, available at http://www.wired.co.uk/article/mit-algorithm.

Collinson, Patrick, "Forget fingerprints—banks are starting to use vein patterns for ATMs," The Guardian, May 14, 2014, available at: https://www.theguardian.com/money/2014/may/14/fingerprints-vein-pattern-scan-atm.

Conner-Simons, Adam, et al., "Detecting emotions with wireless signals," MIT News, Sep. 20, 2016, available at http://news.mit.edu/2016/detecting-emotions-with-wireless-signals-0920.

Dantu, et al., "Non-Invasive Blood Glucose Monitor Based on Spectroscopy Using a Smartphone", Conf. Proc IEEE Eng. Med. Biol. Soc. 2014, pp. 3695-3698.

Drahansky, Martin (2011). Liveness Detection in Biometrics, Advanced Biometric Technologies, Dr. Girija Chetty (Ed.), ISBN: 978-953-307-487-0, InTech, Available from: http://www.intechopen.com/books/advancedbiometric-technologies/liveness-detection-in-biometrics.

Freitas, Ubiratan S., "Remote Camera-based Pulse Oximetry," eTELEMED 2014: The Sixth International Conference on eHealth, Telemedicine, and Social Medicine. 2014, available at https://www.thinkmind.org/download.php?articleid=etelemed_2014_3_40_40198.

Gastel, Mark Van, "New principle for measuring arterial blood oxygenation, enabling motion-robust remote monitoring," Scientific Reports 6, Article No. 38609, Dec. 7, 2016,available at https://www.nature.com/articles/srep38609.

Handy, Alex "Intel hopes RealSense inspires developers," SD Times, Apr. 6, 2015, available at http://sdtimes.com/intel-hopes-realsense-inspires-developers/#sthash.GglnssdS.dpuf.

(56) References Cited

OTHER PUBLICATIONS

Happich, Julien, "Fingerprint sensors under price pressure, says Yole," eeNews Europe, Jan. 20, 2017, available at: http://www.eenewseurope.com/news/fingerprint-sensors-under-price-pressure-says-yole.
Holly, Russell "Fujitsu smartphone camera tech can monitor your pulse," Geek.com, Mar. 18, 2013, available at https://www.geek.com/geek-pick/fujitsu-smartphone-camera-tech-can-monitor-your-pulse-1543239/.
Integrity Applications, "Integrity Applications is devoted to breakthrough innovations that bring positive change and provide real solutions," copyright 2017, available at http://www.integrity-app.com/the-glucotrack/the-products/.
International Search Report dated Aug. 10, 2018 for International Patent Application No. PCT/US2018/029309, 4 pages.
Laude, D., et al., "Effect of breathing pattern on blood pressure and heart rate oscillations in humans," Clinical and Experimental Phamacology and Physiology, 1993, vol. 20, pp. 619-626.
Leonard, P., et al., "Standard pulse oximeters can be used to monitor respiratory rate," BMJ Journals, vol. 20, Iss. 6, 2003, available at http://emj.bmj.com/content/20/6/524.
Pappas, Stephanie, "The Best Heart Rate Monitor Apps," Live Science, Jan. 30, 2015, available at https://www.livescience.com/49653-best-heart-rate-monitor-apps.html.
Photonics Media, "Photoacoustic spectroscopy takes sting out of glucose testing," Photonics.com., Jan. 2014,available at https://www.photonics.com/Article.aspx?PID=1&VID=118&IID=740&AID=55779.
Pleitez, Miguel A., et al., "Windowless ultrasound photoacoustic cell for in vivo mid-IR spectroscopy of human epidermis: Low interference by changes of air pressure, temperature, and humidity caused by skin contact opens the possibility for a non-invasive monitoring of glucose in the interstitial fluid," Review of Scientific Instruments, vol. 84, Iss. 8. Aug. 2013.
Rasmussen, et al., "3D ultrasound imaging performance of a row-column addressed 2D array transducer: a simulation study," in Proc. of SPIE vol. 8675, Medical Imaging 2013: Ultrasonic Imaging, Tomography, and Therapy, pp. 86750C-1-86750C-11.
Scherhag, Ulrich Johannes, "Presentation Attack Detection for State-of-the-Art Speaker Recognition Systems," Hochschule Darmstadt, University of Applied Science—Bio metrics and Internet-Security Research Group , Faculty of Computer Science, Mar. 30, 2016, available at https://dasec.h-da.de/wp-content/uploads/2016/05/Masterthesis_Scherhag.pdf.
Scott, V.A., et al., "Retinal pulse oximetry: towards a method for measuring cerebral oxygen saturation," Engineering in Medicine and Biology Society, 1995, IEEE 17th Annual Conference. Sep. 1995.
Second Office Action for Chinese Application No. 201880028030.X dated Nov. 25, 2020.
Spector, Rosanne, "New method developed for measuring oxygen in blood," Stanford News, Stanford Report, Jan. 19, 2005, available at http://news.stanford.edu/news/2005/january19/med-oximeter-0119.html.
Spectros, "First Clinical Experiences with Non-Pulsatile Optical Diffusion Tissue Oximetry during Cardiopulmonary Bypass," 2003 ASA Annual Meeting, San Francisco, CA, Oct. 11-15, 2003, available at http://www.spectros.com/uploads/tx_rtgfiles/Van_der_Starre_-_Optical_Tissue_Oximetry_During_CPB_04.pdf/.
Spectros, "The contribution of capillary, venous and arterial blood in the oxygen saturation reported by the T-Stat VLS Tissue Oximeter," available at http://www.spectros.com/uploads/tx_rtgfiles/Contribution_of_Capillary_-_Venous_Arterial_Blood_in_O2_Sat_by_T-Stat.pdf.
Supplementary Partial European Search Report for Application No. EP 18 79 2109 dated Oct. 21, 2020.
Supplementary European Search Report for Application No. EP 18 79 2109 dated Feb. 11, 2021.
Written Opinion dated Aug. 10, 2018 for International Patent Application No. PCT/US2018/029309, 9 pages.
Yury, Carrie, "Your Heartbeat May Soon Be Your Only Password," Wired, Jun. 2014, available at https://www.wired.com/insights/2014/06/heartbeat-may-soon-password/.
Zesch, et al., "Deposition of highly oriented low-stress ZnO films," IEEE, 1991 Ultrasonics Symposium, Dec. 8-11, 1991, pp. 445-448.
Office Action for Japanese Patent Application No. 2019-558542 dated Jul. 27, 2021.
Decision to Reject for Korean Patent Application No. 10-2019-7035168 dated Mar. 11, 2021.
Third Office Action for Chinese Patent Application No. 201880028030.X dated Jun. 8, 2021.
First Office Action and Search Report for Taiwan Patent Application No. 107114352, dated Oct. 12, 2021.
First Office Action for Chinese Application No. 201880028030.X dated Jun. 22, 2020.
Examination Report for European Patent Application No. 18792109.3 dated Jan. 3, 2022.
Examination Report for Indian Patent Application No. 201917042496 dated Feb. 11, 2022.

* cited by examiner

ACOUSTIC BIOMETRIC TOUCH SCANNER

CROSS REFERENCE TO PRIORITY APPLICATIONS

Any and all applications for which a foreign or domestic priority claim is identified in the Application Data Sheet as filed with the present application are hereby incorporated by reference under 37 C.F.R. § 1.57. This application is a continuation of U.S. patent application Ser. No. 16/661,674, filed Oct. 23, 2019, entitled "ACOUSTIC BIOMETRIC TOUCH SCANNER." U.S. patent application Ser. No. 16/661,674 is a continuation of U.S. patent application Ser. No. 16/399,724, filed Apr. 30, 2019, entitled "ACOUSTIC BIOMETRIC TOUCH SCANNER," issued as U.S. Pat. No. 10,489,627 on Nov. 26, 2019. U.S. patent application Ser. No. 16/399,724 is a continuation of International Patent Application No. PCT/US2018/029309, filed Apr. 25, 2018, entitled "ACOUSTIC BIOMETRIC TOUCH SCANNER." International Patent Application No. PCT/US2018/029309 is a continuation-in-part of U.S. patent application Ser. No. 15/605,785, filed May 25, 2017, entitled "ACOUSTIC BIOMETRIC TOUCH SCANNER," issued as U.S. Pat. No. 9,953,205 on Apr. 24, 2018. International Patent Application No. PCT/US2018/029309 also claims the benefit of priority of U.S. Provisional Patent Application No. 62/658,370, filed Apr. 16, 2018, entitled "SMART CARD WITH ACOUSTIC BIOMETRIC TOUCH SCANNER." International Patent Application No. PCT/US2018/029309 also claims the benefit of priority of U.S. Provisional Patent Application No. 62/491,984, filed Apr. 28, 2017, entitled "ACOUSTIC BIOMETRIC TOUCH SCANNER." The contents of each of the above-mentioned applications are hereby incorporated by reference herein in their entireties and for all purposes.

BACKGROUND

Technological Field

The disclosed technology relates to acoustic scanning, and particularly to devices and methods for acoustic biometric touch scanning, including applications to fingerprint recognition, live finger detection, temperature detection, and force sensing and including implementations in smart cards.

Description of the Related Technology

Fingerprints have been associated with a wide variety of applications and uses including criminal identification, banking, ID recognition for personal devices, official forms, and others. Automated optical fingerprint scanners have been used to acquire fingerprint images. Ultrasound-based fingerprint scanners and capacitive fingerprint scanners are other fingerprint detection technologies. There is a need for robust and cost-effective fingerprint scanning systems.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of the disclosed technology is an acoustic fingerprint sensing device. The device includes an array of ultrasonic transducers configured to transmit an ultrasound signal having a frequency in a range from 50 megahertz (MHz) to 500 MHz. The device further includes first metal lines. The device further includes second metal lines orthogonal to the first metal lines. The first metal lines and the second metal lines enable addressing of the ultrasonic transducers of the array. The device further includes a receiving surface configured to receive a finger. The device further includes a processor configured to generate an image of at least a portion of a fingerprint of the finger based on a reflection of the ultrasound signal from the finger. The acoustic fingerprint sensing device can perform transmit focusing on a selected portion of the surface.

The array of ultrasonic transducers can be arranged in rows and columns, and the acoustic fingerprint sensing device can further include a transmit circuit configured to excite the ultrasonic transducers in a subset of the columns of the array to transmit the ultrasound signal to the selected portion of the surface. The processor can be configured to perform transmit focusing using a post-processing synthetic aperture focusing.

The frequency of the ultrasound signal can be in a range from 125 MHz to 250 MHz. The frequency of the ultrasound signal can be in a range from 50 MHz to 100 MHz.

The piezoelectric film can have a thickness in a range from 3 micrometers (μm) to 75 μm. The piezoelectric film can have a thickness in a range from 10 micrometers (μm) to 20 μm.

The acoustic fingerprint sensing device can include receive circuitry configured to process an electronic receive signal generated by the array of ultrasonic transducers in response to the reflection to provide a processed signal to the processor.

The image can have a resolution of at least 500 pixels per inch.

The first metal lines can be in physical contact with a plate that includes the surface.

The surface can be a surface of a plate that includes glass and a matching layer, and the matching layer can have a thickness corresponding to a quarter of a wavelength of the ultrasound signal in material of the matching layer.

The piezoelectric film can include at least one of zinc oxide, aluminum nitride, or lead zirconium titanate.

The processor can be configured to detect a parameter associated with a liveness of the finger based on the reflection, and to provide an indication of whether the finger is part of a live human based on the liveness parameter. The processor can be configured to estimate a force at which the finger contacts the surface based on an area of the finger in contact with the surface. The processor can be configured to detect a temperature of the finger based on a sound speed associated with the reflection.

Another aspect of the disclosed technology is an acoustic biometric sensing device. The device includes ultrasonic transducers configured to transmit an ultrasound signal having a frequency in a range from 50 megahertz (MHz) to 500 MHz. The device further includes a processor configured to generate biometric information based on a reflection of the ultrasound signal. The acoustic biometric sensing device can be configured to perform transmit focusing on a selected portion of the surface.

The ultrasonic transducers can include a piezoelectric film having a thickness in a range from 3 micrometers (μm) to 75 μm. The biometric image can represent at least a portion of a fingerprint and the biometric image can have a resolution of at least 500 pixels per inch.

Another aspect of the disclosed technology is an acoustic biometric sensing device. The device includes ultrasonic transducers configured to transmit an ultrasound signal, the ultrasonic transducers comprising a piezoelectric film having a thickness in a range from over 5 micrometers (μm) to less than 100 μm. The device further includes a processor configured to generate biometric information based on a reflection of the ultrasound signal.

Another aspect of the disclosed technology is a method of generating a biometric image. The method includes transmitting, using one or more ultrasonic transducers, an ultrasonic signal in a frequency range from 50 megahertz (MHz) to 500 MHz. The method further includes receiving a reflection of the ultrasonic signal. The method further includes generating the biometric image based on the reflection.

Another aspect of this disclosure is a method of generating a biometric image, the method including: transmitting, using one or more ultrasonic transducers, an ultrasound signal in a frequency range from 50 megahertz (MHz) to 500 MHz, where the transmitting includes transmit focusing; receiving, using the one or more ultrasonic transducers, a reflection of the ultrasound signal; and generating the biometric image based on the reflection of the ultrasound signal.

The biometric image can represent at least a portion of a fingerprint and can have a resolution of at least 500 pixels per inch. The one or more ultrasonic transducers can include a piezoelectric film having a thickness in a range from 3 micrometers (μm) to 75 μm. The method can include detecting a parameter associated with a liveness of the finger based on the reflection, and providing an indication of whether the finger is part of a live human based on the liveness parameter.

Another aspect of the disclosed technology is a biometric sensing system that uses a thin film piezoelectric device in the frequency range of 50 to 500 MHz. This frequency range provides a desired resolution (e.g., 50 micrometers) even when using an acoustic coupling layer such as glass where the speed of sound is relatively high (5760 m/s). The thin film transducer array can be fabricated using a sputtering process, and the material can consist of zinc oxide. Simulations for specific transducer parameters show a very low insertion loss of approximately 3 dB, resulting in receiving half the voltage signal back on the receive side. For example, in a simulation with a 4 V excitation, the output voltage was on the order of 2 V. The device obtains 3D ultrasound images of the fingerprint layers, and implements row column addressing and beamforming that can increase the image quality. In an embodiment, the scan resolution (DPI) is derived from the point spread function of the beamformed when transmitting ultrasound. In an embodiment, absorbing layers, such as rubber or epoxy loaded with particles of tungsten or silicon carbide or any such material, are placed at the edge of the receiving surface to reduce reflections from the edges of the receiving (ringing), enabling a higher frame rate.

Another aspect of the disclosed technology is a method for manufacturing a biometric sensing system. The method includes patterning bottom metal electrodes on top of a glass substrate in a first direction, the bottom metal electrodes on a bottom plane in a second direction. The method further includes depositing a thin film over all but left and right edge portions of the top side of the bottom metal electrodes through magnetron sputtering, the left and right edge portions left uncovered. This can allow metallic contacts to be formed over the uncovered edge portions. The method further includes depositing top metal electrodes in the second direction, the top metal electrodes conforming to the top of the thin film, the top metal electrodes conforming to the left and right edge portions of the thin film.

The method can further include etching trenches or grooves in the deposited thin film in the first direction and the second direction, in which the first direction is orthogonal to the second direction. Such etching can reduce cross talk between neighboring transducers. The etches can be formed outside of an active area of a traducer and between plates on opposing sides of the thin film. In an embodiment, an etched trench includes a v-shaped etch.

Another aspect is a biometric sensing device with temperature detection. The device includes a receiving surface configured to receive a finger. The device further includes transducers configured to transmit an acoustic signal through the receiving surface to the finger. The device further includes a processor configured to detect a temperature of the finger based on a sound speed associated with the acoustic signal and to generate an image of at least a portion of a fingerprint of the finger based on a reflection of the acoustic signal from the finger.

Another aspect is a method of detecting temperature of a finger. The method includes transmitting an acoustic signal through an intermediate medium to a finger. The method further includes determining a sound speed of the acoustic signal through the intermediate medium. The method further includes detecting a temperature of the finger based on the sound speed.

Another aspect is a sensing device. The sensing device includes one or more transducers configured to transmit an acoustic signal through a solid medium. The sensing device further includes a processor configured to determine a sound speed associated with the acoustic signal propagating through the solid medium and to detect a temperature based on the determined sound speed.

In an embodiment, the method further includes generating a three-dimensional model of a finger. In an embodiment, the method further includes detecting ambient temperature. In an embodiment, the method further includes detecting a temperature based on a difference between reflection off of a finger and a reflection used to detect ambient temperature. In an embodiment, the acoustic signal is an ultrasound signal.

Another aspect is a biometric sensing device with force detection. The biometric sensing device includes a receiving surface configured to receive a finger. The device further includes transducers configured to transmit an acoustic signal through the receiving surface to the finger. The device further includes a processor configured to generate an image of at least a portion of a fingerprint of the finger based on a reflection of the acoustic signal from the finger, detect a surface area of ridges of the finger in contact with the receiving surface based on the reflection; and estimate a force at which the finger contacts the receiving surface based on the detected surface area.

Another aspect is a method of force detection. The method includes transmitting an acoustic signal to a finger. The method further includes generating an image of at least a portion of a fingerprint of the finger based on a reflection of the acoustic signal from the finger. The method further includes detecting an area of the finger in contact with a surface based on the reflection. The method further includes estimating a force at which the finger contacts the surface based on the detected area of the finger in contact with surface.

Another aspect is a biometric sensing device with force detection. The device includes one or more transducers configured to transmit an acoustic signal. The device further includes a processor. The processor is configured to generate a biometric image associated with an object based on a reflection of the acoustic signal. The processor is further configured to detect a surface area of the object in contact with a surface based on the reflection. The processor is further configured to estimate a force at which the object contacts the surface based on the detected surface area of the object in contact with the surface.

Another aspect is a method for detecting touch force and/or tissue stiffness. In an embodiment, touch force is detected and quantified by measuring ridge widening of, for example, a fingertip. In an embodiment, touch force is detected and quantified by measuring fingerprint width and surface area. In an embodiment, tissue stiffness is determined by comparing an estimated touch force with that of a direct force or pressure measurement.

Another aspect is a biometric sensing device with force detection to estimate a pulse rate. The biometric sensing device includes a receiving surface configured to receive a finger. The device further includes transducers configured to transmit an acoustic signal through the receiving surface to the finger. The device further includes a processor configured to estimate a time series of samples of forces acquired at a first sampling rate; generate an image of at least a portion of a fingerprint of the finger based on a reflection of the acoustic signal from the finger for each sample, detect a surface area of ridges of the finger in contact with the receiving surface based on the reflection for each sample; estimate a force at which the finger contacts the receiving surface based on the detected surface area for each sample; and estimate a period of the time series of force estimates, the period corresponding to the pulse rate estimate. In an embodiment, the first sampling rate exceeds twice a maximum pulse rate. For example, if a maximum pulse rate is assumed to be 220 beats per minute for a pulse taken during aerobic exercise, the first sampling rate is at least 440 per minute.

Another aspect is a smart card with ultrasonic fingerprint sensing. The smart card includes a card body and an ultrasonic fingerprint sensing device embedded within the card body. The ultrasonic fingerprint sensing device is configured to transmit an ultrasound signal and to generate image data of at least a portion of a fingerprint of a finger based on reflections of the ultrasound signal from the finger. The image data has a resolution of at least 500 pixels per inch.

The card body can be sized to fit in a wallet. The smart card can include a security chip configured to authenticate the smart card. The smart card can include a magnetic strip on the card body.

The card body can be formed primarily of at least one material selected from the group consisting of: Nylon, PVC, and Mylar. The card body can include Nylon and the ultrasonic fingerprint sensing device can transmits the ultrasound signal at a frequency of between about 12.5 MHz and about 50 MHz. The card body can include Nylon and the ultrasonic fingerprint sensing device can transmit the ultrasound signal at a frequency of about 25 MHz. The card body can include PVC and the ultrasonic fingerprint sensing device can transmit the ultrasound signal at a frequency of between about 25 MHz and about 100 MHz. The card body can include PVC and the ultrasonic fingerprint sensing device can transmit the ultrasound signal at a frequency of about 50 MHz.

The card body can include a material having a speed of sound for the ultrasound signal of between about 1,000 meters per second and about 2,500 meters per second and the ultrasonic fingerprint sensing device can transmit the ultrasound signal at a frequency of between about 12.5 MHz and about 100 MHz. The card body can include a material having a speed of sound for the ultrasound signal of between about 1,000 meters per second and about 2,500 meters per second and the ultrasonic fingerprint sensing device can transmit the ultrasound signal at a frequency of between about 25 MHz and about 50 MHz.

The smart card can include circuitry within the card body and contacts configured to couple to the circuitry to an external card reader, where the circuitry within the card body can be configured to transmit the image data to the external card reader over the contacts. The smart card can include circuitry within the card body configured to verify the user is an authorized user of the smart card based in part upon the image data; and contacts configured to couple to the circuitry to an external card reader, where the circuitry can be configured to transmit verification results indicating that the user is an authorized user of the smart card to the external card reader over the contacts. The smart card can include contacts configured to couple to the smart card to an external card reader, where the ultrasonic fingerprint sensing device can be configured to draw power from the external card reader over the contacts.

The ultrasonic fingerprint sensing device can include a dual-layer ultrasonic fingerprint sensing device. The dual-layer ultrasonic fingerprint sensing device can include a first piezoelectric layer configured to transmit or receive ultrasound signals; first metal lines disposed on the first piezoelectric layer; a second piezoelectric layer configured to transmit or receive ultrasound signals; second metal lines disposed on the second piezoelectric layer, where the second metal lines are orthogonal to the first metal lines; and a metallic conductive layer disposed between the first and second piezoelectric layer.

The ultrasonic fingerprint sensing device can be configured to perform transmit focusing on a selected portion of the card body configured to receive the finger.

Another aspect is a smart card with ultrasonic fingerprint sensing. The smart card includes a card body and an ultrasonic fingerprint sensing device embedded within the card body. The ultrasonic fingerprint sensing device includes a first array of ultrasonic transducers configured to transmit an ultrasound signal and a second array of ultrasonic transducers configured to receive a reflection of the ultrasound signal, the second array of ultrasonic transducers being stacked with the first array of ultrasonic transducers.

The first array can include first metal lines, the second array can include second metal lines, and the first metal lines can be substantially orthogonal to the second metal lines.

The card body can be sized to fit in a wallet. The smart card can include a security chip configured to authenticate the smart card to an external card reader. The smart card can include a magnetic strip on the card body.

The ultrasonic fingerprint sensing device can transmit the ultrasound signal at a frequency high enough to obtain a resolution of 500 pixels per inch.

The card body can be formed primarily of at least one material selected from the group consisting of: Nylon, PVC, and Mylar. The card body can include Nylon, and the ultrasonic fingerprint sensing device can transmit the ultrasound signal at a frequency of between about 12.5 MHz and about 50 MHz. The card body can include Nylon, and the ultrasonic fingerprint sensing device can transmit the ultrasound signal at a frequency of about 25 MHz. The card body can include PVC and the ultrasonic fingerprint sensing device can transmit the ultrasound signal at a frequency of between about 25 MHz and about 100 MHz. The card body can include PVC and the ultrasonic fingerprint sensing device can transmit the ultrasound signal at a frequency of about 50 MHz.

The card body can include a material having a speed of sound for the ultrasound signal of between about 1,000 meters per second and about 2,500 meters per second and the ultrasonic fingerprint sensing device can transmit the ultrasound signal at a frequency of between about 12.5 MHz and about 100 MHz. The card body can include a material having a speed of sound for the ultrasound signal of between about 1,000 meters per second and about 2,500 meters per second and the ultrasonic fingerprint sensing device can transmit the ultrasound signal at a frequency of between about 25 MHz and about 50 MHz.

The smart card can include contacts configured to couple to the smart card to an external card reader. The smart card can include an antenna and wireless communication circuitry configured to transmit fingerprint image data from the ultrasonic fingerprint sensing device to an external device.

The ultrasonic fingerprint sensing device can be configured to generate image data of at least a portion of a fingerprint of a finger and the image data can have a resolution of at least 500 pixels per inch.

Another aspect is a dual-layer ultrasonic fingerprint sensing device. The device includes a first piezoelectric layer configured to transmit an ultrasound signal; first metal lines disposed on the first piezoelectric layer; a second piezoelectric layer configured to receive a reflection of the ultrasound signal, the second piezoelectric layer being stacked with the first piezoelectric layer; second metal lines disposed on the second piezoelectric layer, where the second metal lines are substantially orthogonal to the first metal lines; and a metallic conductive layer disposed between the first piezoelectric and the second piezoelectric layer.

The metallic conductive layer can include a ground plane. The metallic conductive layer can be configured to provide electrical shielding between the first and second piezoelectric layers.

The dual-layer ultrasonic fingerprint sensing device can also include circuitry configured to transmit the ultrasound signal by exciting one of the first metal lines and to receive reflections of the transmitted ultrasound signals to generate an image of at least a portion of a fingerprint of a user using one of the second metal lines.

The first and second piezoelectric layers can each include polyvinyl difluoride (PVDF).

The first metal lines can be disposed on a first side of the dual-layer ultrasonic fingerprint sensing device and the second metal lines can be disposed on a second side, which can be opposite to the first side, of the dual-layer ultrasonic fingerprint sensing device.

The dual-layer ultrasonic fingerprint sensing device can include circuitry configured to generate an image of at least a portion of a fingerprint of a user's finger based on reflections of the ultrasound signal from the finger.

The image can have a resolution of at least 500 pixels per inch.

The dual-layer ultrasonic fingerprint sensing device can be configured to perform transmit focusing on a selected portion of a surface configured to receive the finger.

Another aspect is a smart card with ultrasonic fingerprint sensing. The smart card device includes a card body comprising a material and an ultrasonic fingerprint sensing device embedded within the card body. The ultrasonic fingerprint sensing device configured to transmit an ultrasound signal though the card body to a surface of the smart card and to generate image data based on a reflection of the ultrasound signal. The ultrasound signal has a frequency that together with a sound speed of the material of the card body provides a resolution of at least 50 micrometers for the image data.

The ultrasonic fingerprint sensing device can be at least partially embedded within the card body. The ultrasonic fingerprint sensing device can be completely embedded within the card body such that the card body completely surrounds the fingerprint sensing device.

The smart card can include contacts configured to couple to the smart card to an external card reader. The smart card can include an antenna and wireless communication circuitry configured to transmit the image data from the ultrasonic fingerprint sensing device to an external device.

The material can include plastic. The card body can be formed primarily of at least one substance selected from the group consisting of: nylon, PVC, mylar, glass, aluminum, and sapphire.

The card body can be sized to fit in a wallet. The smart card can include a security chip configured to authenticate the smart card to an external card reader. The smart card can include a magnetic strip on the card body.

Another aspect is a method of authentication with a smart card using ultrasonic sensing. The method includes transmitting an ultrasound signal from a smart card; generating image data of at least part of a fingerprint of a user based on a reflection of the ultrasound signal, the image data having a resolution of at least 500 pixels per inch; and authenticating the fingerprint of the user based on the image data.

The method can include providing an indication that the user has been authenticated to an external device. Authenticating the fingerprint of the user can include authenticating the fingerprint of the user with circuitry in the smart card, the method can also include providing an indication that the user has been authenticated based on the user's fingerprint to an external device. Authenticating the fingerprint of the user can include transmitting the image data to an external device for authentication of the user's fingerprint.

The smart card can include contacts that couple with an external device. The method can include drawing power, for transmitting the ultrasound signal and generating the image data, from the external device over the contacts.

The smart card can include an antenna. The method can include transmitting the image data over the antenna.

Another aspect of this disclosure is a smart card with ultrasonic fingerprint sensing, the smart card can include a card body; and an ultrasonic fingerprint sensing device at least partly embedded within the card body, the ultrasonic fingerprint sensing device can include a receiving surface configured to receive a finger, the ultrasonic fingerprint sensing device can be configured to transmit ultrasound signals and to generate image data of at least a portion of a fingerprint of the user's finger based on reflections of the ultrasound signals from the user's finger, where the image data can have a resolution of at least 500 pixels per inch.

The receiving surface of the ultrasonic fingerprint sensing device can be substantially flush with the card body such that the ultrasound signals transmitted by the ultrasonic fingerprint sensing device are transmitted into the finger through the receiving surface without passing through the card body.

The smart card can be rigid.

The ultrasonic fingerprint sensing device can include a zinc oxide piezoelectric layer. The ultrasonic fingerprint sensing device can include a zinc oxide piezoelectric layer covered by glass or fused quartz and the glass or fused quartz can form the receiving surface of the ultrasonic fingerprint sensing device. The ultrasonic fingerprint sensing device can include glass or fused quartz and the glass or fused quartz can form the receiving surface of the ultrasonic fingerprint sensing device.

The ultrasonic fingerprint sensing device can include at least one piezoelectric layer selected from the group consisting of: a lithium niobate piezoelectric layer, an aluminum nitride piezoelectric layer, a lithium tantalate piezoelectric layer, a bismuth germanium oxide piezoelectric layer, a lead zirconium titanate layer piezoelectric, a polyvinyl difluoride piezoelectric layer, and a polymer piezoelectric layer.

The smart card can include circuitry within the card body; and contacts configured to couple to the circuitry to an external card reader. The circuitry within the card body can be configured to transmit the image data to the external card reader over the contacts. The smart card can include contacts configured to couple to the smart card to an external card reader. The ultrasonic fingerprint sensing device can be configured to draw power for operations from the external card reader over the contacts.

The ultrasonic fingerprint sensing device can include a dual-layer ultrasonic fingerprint sensing device.

The ultrasonic fingerprint sensing device can be configured to perform transmit focusing on a selected portion of the receiving surface.

Any of the above aspects can be combined with each other as suitable. The present disclosure contemplates combining one or more features of each of the above aspects in each and every suitable combination.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 26 illustrates a simulation of the one-way insertion loss.

FIG. 27 illustrates a circuit for IQ demodulation of an RF signal into I and Q channels.

FIG. 28 illustrates an example of the simulated demodulated in-phase and quadrature signals.

FIG. 29 illustrates the response of the low pass filter used for IQ demodulation for the process of FIG. 27.

FIG. 30 illustrates an IQ demodulated envelope for a signal demodulated by the circuit of FIG. 27.

FIG. 31 illustrates 100 MHz samples taken of the IQ demodulated envelope of FIG. 30.

FIG. 32 illustrates a circuit for IQ sampling of an IQ demodulated signal.

FIG. 33 illustrates sampled in-phase and quadrature signals of an IQ demodulated signal.

FIG. 34 illustrates graphs of the envelope of an IQ demodulated signal for IQ sampling rates of 200 MHz, 150 MHz, 100 MHz and 50 MHz.

DETAILED DESCRIPTION OF CERTAIN EMBODIMENTS

Figure 1:
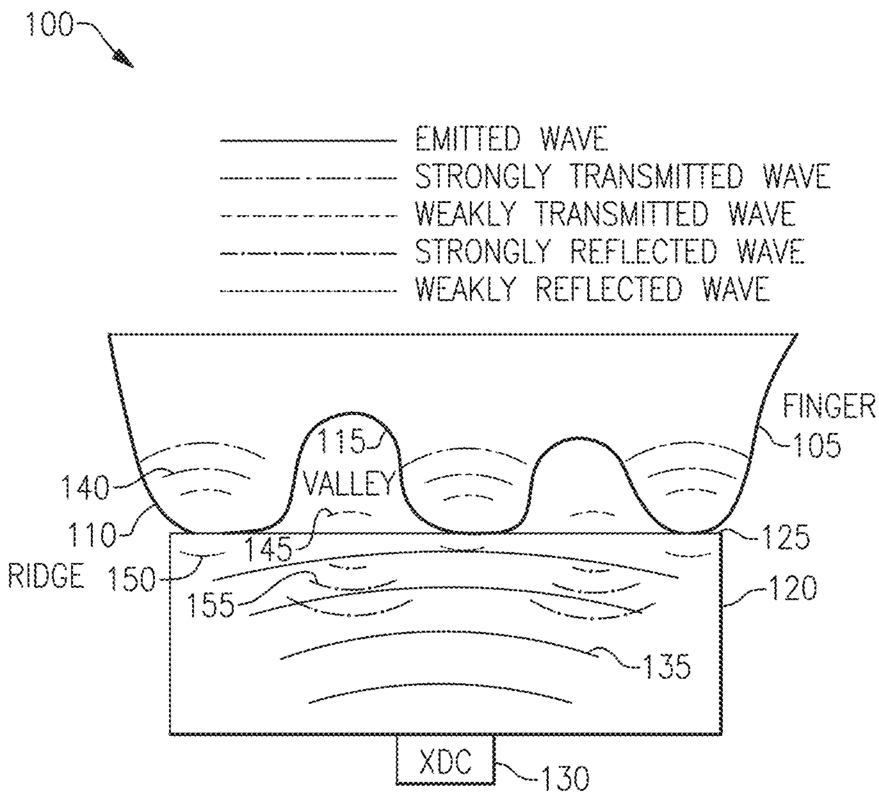
FIG. 1 illustrates acoustic fingerprint scanning, in which an ultrasound transducer emits an ultrasound wave which can be strongly reflected and weekly transmitted at the surface-finger interface and also from within the finger as shown.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Ultrasound-based fingerprint scanners can visualize not only the epidermal (superficial) layer of the fingerprint, but also the inner (dermis) layers, which makes them robust when dealing with wet hands, oil, grease, or dirt. This provides additional levels of security, and makes them harder to spoof, which is desirable for various applications. Ultrasound-based fingerprint scanner systems can acquire 2D maps of the epidermis layers and/or 3D volumetric images of finger dermis layers. Scanning methods include impediography, acoustic microscopy, echo and Doppler imaging. The fingerprint sensing systems discussed herein can achieve a scan resolution of 500 pixels per inch (PPI) to meet Federal Bureau of Investigation (FBI) and/or other standards. Such a resolution can translate to a lateral resolution of 50 micrometers at the focal depth, which typically depends on the center frequency, the acoustic aperture size, and the focal distance.

Other fingerprint sensing technologies can encounter challenges that may not be present with ultrasound-based finger print scanners. For instance, optical fingerprint scanners can encounter challenges with resolving fingerprints with contamination. As another example, capacitive fingerprint scanners which can be forged relatively easily via fake fingerprint molds.

Another type of sensors is based on the concept of impediography in which the fingerprint surface touches the transducer elements and alters their acoustic impedance depending whether the surface is tissue (ridge) or air (valley). Although this technique can be convenient as it does not involve generating and processing ultrasound pulses and echoes, it can be limited to acquiring the image of the fingerprint surface. Further, the impedance of a piezoceramic ultrasound transducer in some previous approaches can be relatively highly sensitive to frequency. For example, the impedance of an element loaded by a fingerprint valley can be approximately 800 Ohms at a frequency of 19.8 MHz and approximately 80,000 Ohms at a frequency of 20.2 MHz. Similarly, the impedance of an element loaded by a fingerprint ridge can be approximately 2,000 Ohms at a frequency of 19.8 MHz and approximately 20,000 Ohms at a frequency of 20.2 MHz. This can involve multiple impedance measurements at different frequencies to obtain reliable measurements, which could affect the frame acquisition time. Another inconvenience is such approaches is the contact between the finger and the transducers, which could contaminate or even permanently damage the transducer surface and can affect its performance.

Some other approaches involve ultrasonic transducers with acoustic waveguides made from material with acoustic impedance similar to the human tissue to couple the ultrasound waves from the transducer array to the finger, and using beamforming techniques to achieve the required resolution. Although using waveguides relaxes the frequency constraint, fabrication of waveguides typically involves additional lithography steps, which increase the complexity and cost of the transducer design. Such approaches have achieved results that have been undesirable in certain applications. In some instances, such approaches have encountered relatively high insertion loss that impacted the capability of this design even when beamforming is implemented and has increased the complexity of the electronics. Relatively high voltage bias and pulses, which are unsuitable for consumer electronics, have also been used in such approaches.

The disclosed technology includes acoustic biometric touch devices that when touched by naked skin scans both the outer skin layers (epidermis) and the underlying tissue (dermis and subcutis). Such sensors can be used to identify a person. The commonly used area to scan is the fingers, but any other area of the body could be scanned, for instance, soles of feet, toes, or palms. For brevity, the fingers are henceforth referred to as the area of interest to scan. Any suitable principles and advantages discussed herein can be applied to scanning any suitable area of interest of a human or other animal.

Biometric sensing systems discussed herein include a thin film piezoelectric device configured to transmit acoustic signals having a frequency in a range from 50 MHz to 500 MHz. With this frequency, an image with a desired resolution, such as 50 micrometers, can be generated even when using an acoustic coupling layer such as glass where the speed of sound is relatively high (e.g., 5760 m/s). A thin film transducer array can be fabricated using the sputtering processes. Piezoelectric material of the transducers can be zinc oxide, aluminum nitride, or lead zirconium titanate, for example. Simulations for specific transducer parameters show a relatively low insertion loss of approximately 3 dB, resulting in receiving about half the voltage signal back on the receive side. For example, in a simulation with a 4 Volt excitation, the output voltage was on the order of 2 Volts. The biometric sensing device can obtain 3D ultrasound images of fingerprint layers. The biometric sensing device can implement row column addressing and beamforming to increase the image quality and/or to reduce the complexity of integration and electronics design.

In combination with imaging a fingerprint, several other features are discussed herein such as (1) finger touch force detection by measuring the ridge widening and the fingerprint surface area, and (2) generating a temperature of a finger and detecting the ambient temperature by measuring the variation in the speed of the sound which is temperature dependent. Measuring the blood flow, heart beat/rate, and other structural features of biometric sensing devices are discussed herein.

The disclosed devices have the ability to scan through an intermediate medium between the finger and the scanner. The medium could for instance be a glass, a metal, plastic, or any suitable material that allows ultrasound propagation in a frequency range of interest. This could, for instance, be used to make any part or the entire part of the front glass on a cell phone into a fingerprint scanner.

Since the ultrasound also enters the finger and passes through the skin layers, a three-dimensional (3D) scan can be made of the finger surface and also of the internal finger tissue. Among other things, the blood veins and/or arteries could be scanned and their blood flow could be estimated. The measurement of the blood flow can be periodic with the heart rate. Hence, the sensor can also measure the heart rate of the individual touching the glass.

The finger print scanners discussed herein can detect one or more liveness parameters associated with an object, such as a finger, that is in contact with a surface of the fingerprint scanner. Detecting one or more liveness parameters can be done using an ultrasound-based sensing device that also generates an image of at least a portion of a fingerprint. The image can have an accuracy of 500 PPI. Based on a liveness parameter, the fingerprint scanner can provide an indication of whether the finger is part of a live human based on the liveness parameter. This can be used to prevent molds, prosthetic fingers, or other objects from being identified as matching a fingerprint associated with a particular finger. The liveness parameter can be determined based on a reflection of an acoustic wave transmitted by one or more transducers of the fingerprint scanner. The liveness parameter can be a temperature and/or a tissue stiffness, for example.

If the finger is at body temperature and the sensor is at room temperature, once touched, the temperature of the glass or other intermediate layer should typically get warm and generally decrease the speed of sound in the glass. In some instances, the device can be warmed to a temperature greater than body temperature (e.g., by sunlight), and heat can transfer from the device to the finger to cool the device. Hence, another objective of this disclosure is to determine the temperature of the finger. This can be done to ascertain that it is a live finger and not a prosthetic finger that is touching the glass. When the finger is not touching the glass, the ambient temperature can be determined by the device.

When a finger pushes harder on the glass, the contact area between the finger and a surface, such as glass, should increase. This can be used to detect a force at which the finger contacts a surface. Hence, another objective of this application is to measure pressure and/or force that is applied through a calculation of the contact density with the surface.

Pressure of the finger on the glass should increase with each heartbeat when the heart muscle contracts and arterial pressure increases. Between contractions, the heart fills with blood and pressure decreases. A time series of fingertip force measurements can follow a periodic, rhythmic pattern with a frequency corresponding to the person's pulse rate. Therefore, in addition to measuring temperature, the disclosed acoustic scanner can estimate a pulse rate and use it to confirm that the fingertip is not a prosthetic, and is attached to a live person with a measured pulse rate.

Further, the disclosed devices allow for tissue stiffness estimation by comparing the above-mentioned pressure estimation with that of a direct force or pressure measurement. This can increase the certainty that the object touching the sensor is a true finger and not a prosthetic.

The disclosed devices can be used to identify or authenticate a person for applications including logging in to a communications or computing device, logging into a software app, unlocking a door or antitheft device, authorizing an electronic payment, or unlocking a safety device, among other applications.

FIG. 1 illustrates an acoustic fingerprint scanning device 100, in which an ultrasound transducer 130 (XDC) emits an ultrasound wave 135 that is reflected at the surface-finger interface 125 and also from within the finger 105. The transducer 130 can transmit an ultrasound signal having a frequency in a range from 50 megahertz (MHz) to 500 MHz. An acoustic fingerprint scanner scans the interface between the finger 105 and the medium 120 it touches. The medium 120 can be rigid. Where the ridges 110 of the finger 105 touch the surface 125, part of the acoustic wave 140 will enter the finger 105 and less energy will be reflected via reflection 150. At locations where there is a valley 115 of the finger 105, relatively more (for example, practically all of) the acoustic energy is reflected back to the ultrasound transducer 130 as reflection 155. This contrast of reflection coefficients associated with ridges 110 and valleys 115 can be used by the device to scan the finger 105 surface. For instance, medical ultrasound imaging techniques can be implemented to scan the surface of the finger 105.

Since the ultrasound wave is entering the finger 105 via the ridges 110, the scanner can also image the internal features of the finger 105. This could be used for identification via pulse recognition and/or other biometric features such as tissue structure, ligaments, veins, and arteries. As an example, an acoustic scanning device can detect a pattern of blood vessels in a finger and/or a palm of hand and identify a person based on the pattern of blood vessels. This three-dimensional scan of the finger 105 can be used to generate two and/or three dimensional images of the finger 105. The two and/or three dimensional images can be processed using image processing and pattern recognition techniques.

In order to identify fingerprints, a finger print recognition device can resolve ridges in a finger with a resolution that is better than 50 μm. Ultrasound approaches can measure the impedance mismatch between a plate (e.g., a glass plate) and tissue, which can represent ridges, and the plate and air, which can represent valleys between ridges.

Some ultrasound scanners that use waveguides in a glass plate can guide ultrasound signals with a lower frequency than the frequency of the ultrasound signal from the transducer 130 (i.e., lower than 50 MHz) to allow the measurement of the impedance mismatch between a finger and the glass plate. Some ultrasound sensors can include posts of piezoelectric material that are narrower than 50 μm and such scanners can measure the impedance change due to surface contact between each post and the finger. In ultrasound scanners with waveguides and/or narrow posts of piezoelectric material, relatively complex construction can be involved to measure on a scale of 50 μm with ultrasound signals whose wavelength is much larger than 50 μm. Such a complex assembly can result in a relatively expensive and difficult to construct system for ultrasound fingerprint scanning. Other disadvantages of such an example can include opacity and difficulty engineering a receiving surface incorporating waveguides in certain metal and/or glass surfaces.

Some ultrasound scanners can generate ultrasound signals with a frequency of over 1 GHz (e.g., around 5 GHz) to avoid issues associated with diffraction. However, at such frequencies, the ultrasound signals may not penetrate tissue. Moreover, scanners with ultrasound signals at such frequencies can be constructed of materials that allow signals with such frequencies to propagate without significant attenuation. Furthermore, a two-dimensional (2D) array of 50 μm transducer elements could be prohibitively complex for addressing, and is further complicated by the electrical crosstalk while operating at frequencies over 1 GHz.

Figure 2:
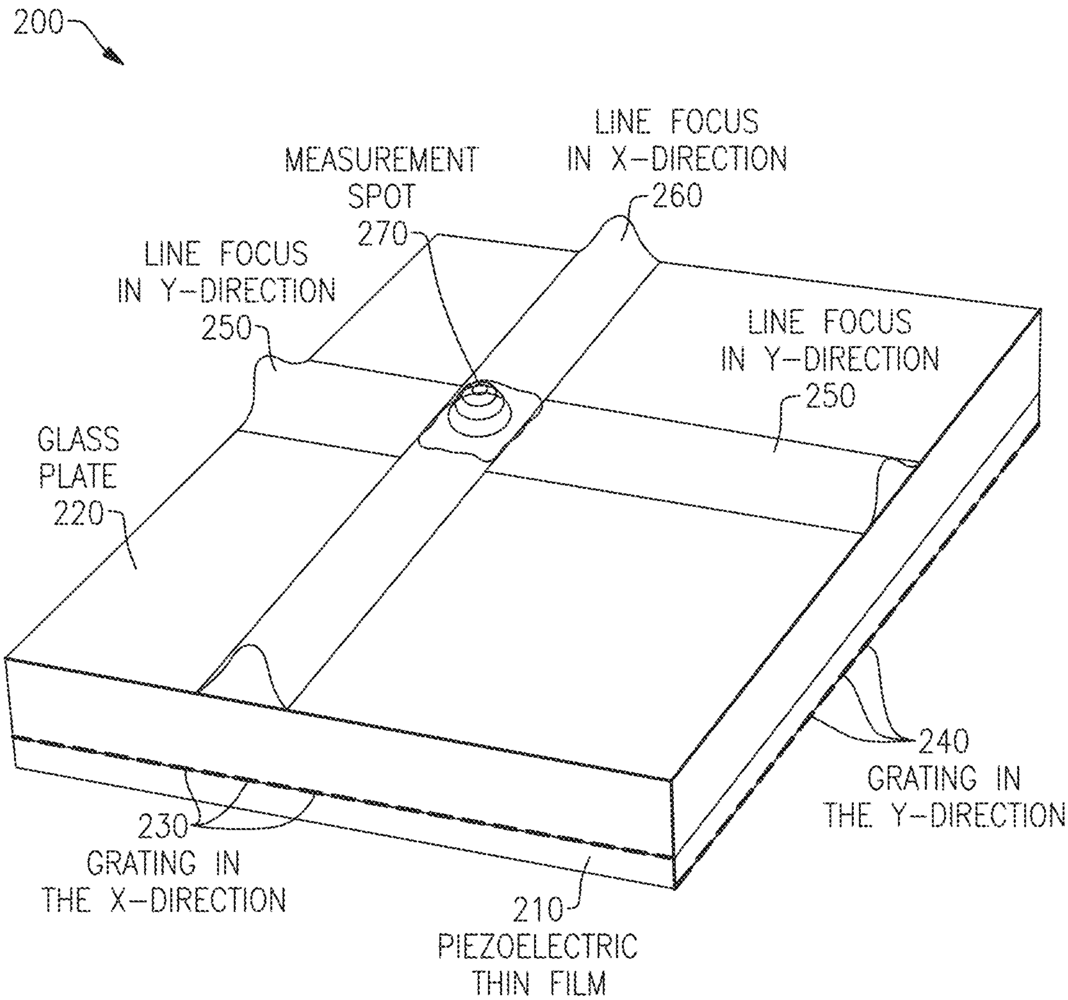
FIG. 2 illustrates a device for focusing sound waves with a row-column addressed two-dimensional (2D) array. Only one focal line can be active at a time for each of transmit focus and receive focus, perpendicular to each other and intersecting at a measurement spot with a compact focal spot size.

The disclosed technology, as exemplified in the device in FIG. 2, can overcome the above-mentioned deficiencies, among others, of ultrasound scanners that operate at lower and higher frequencies.

FIG. 2 illustrates a device 200 for focusing sound waves with a row-column addressed 2D array of ultrasound transducers. The device 200 includes piezoelectric thin film 210, glass plate 220, a grating in the x-direction 230, and a grating in the y-direction 240. As shown in FIG. 2, the device 200 can operate so as to have a line of focus in the x-direction 250, a line of focus in the y-direction 260, and a measurement spot 270 where the line of focus in the x-direction 250 intersects with the line of focus in the y-direction 260. Only one focal line 250 and 260 can be active at a time for each of transmit focus and receive focus. For example, the focal lines 250 and 260 may be used for transmit and receive focus, respectively. Alternatively, the focal lines 250 and 260 may be used for receive and transmit focus, respectively.

The device 200 uses ultrasound imaging at a sufficiently high frequency (e.g., in a range from 50 MHz to 500 MHz, such as approximately 150 MHz) in order to achieve a 50 μm resolution using beamforming. Thus, the device 200 can achieve a desired 50 μm resolution without waveguides. Accordingly, the device 200 can have a simpler construction relative to ultrasonic scanner devices that include waveguides. Additionally, there can be less constraint on the type of touch material and/or thickness of this material.

The piezoelectric layer 210 can generate an acoustic signal having a frequency in range from 50 MHz to 500 MHz. A transducer array arranged to transmit such acoustic signals can be implemented efficiently and achieve a desired image resolution without waveguides between the transducers and a receiving surface of the device 200, in which the receiving surface is configured to receive and make physical contact with the finger. In some applications, the piezoelectric layer 210 can generate an acoustic signal having a frequency in range from 125 MHz to 250 MHz. According to certain implementations, the piezoelectric layer 210 can generate an acoustic signal having a frequency in range from 50 MHz to 100 MHz. For example, an acoustic signal in the range of 50 MHz to 100 MHz may be used for a device implemented in a credit card.

The piezoelectric layer 210 can include any suitable piezoelectric material. For example, the piezoelectric layer 210 can be a zinc oxide layer, an aluminum nitride layer, a lithium niobate layer, a lithium tantalate layer, bismuth germanium oxide, lead zirconium titanate, or even a polymer piezoelectric such as a polyvinyl difluoride layer. The thickness of the piezoelectric layer 210 can be suitable for generating an acoustic signal having a frequency in a range from 50 MHz to 500 MHz. The piezoelectric layer can have a thickness in a range from 3 micrometers to 75 micrometers. In some applications, a zinc oxide piezoelectric layer can have a thickness of in a range from about 10 to 20 micrometers. A zinc oxide piezoelectric layer is an example of a piezoelectric layer that can be sputtered onto a substrate, such as a glass substrate. According to certain applications, a lithium niobate piezoelectric layer can have a thickness in a range from about 5 to 10 micrometers. Such a lithium niobate piezoelectric layer can be bonded to a substrate, such as a glass substrate, by an epoxy.

As illustrated, the device 200 includes a glass plate 220. The glass plate 220 is an example substrate on which a piezoelectric layer can be disposed. Any of the acoustic sensing devices discussed herein can include other substrates as suitable. For example, a metal layer or a plastic substrate can be a suitable substrate in certain applications.

In an embodiment, the glass plate 220 can be about 500 μm thick. This thickness can be any suitable thickness based on the piezoelectric material used, ultrasound frequency, and application. Such a thickness can be nominal for portable communication and computing device. In other instances, the glass plate 220 can be thinner and attached to thicker plates of any suitable material. Accordingly, the finger print device could be on the metal housing of a phone or any such system. The arrangement can be any suitable size. Accordingly, the device 200 can cover most or all of a whole plate to make a touch screen and finger print recognition at the same time.

In operation, the device 200 can measure the reflection coefficient at the location of the focus, that is at the measurement spot 270 at the intersection of the lines of focus 250 and 260 in x and y directions. The size of the measurement spot 270 can be determined by the diffraction resolution of the device. For instance, for ultrasonic transducers providing 150 MHz acoustic signals in glass, this spot size 270 can be about 40 micrometers. The change in reflection coefficient at the glass finger interface would be either 1 or about 0.85 depending on the type of glass used in the finger print device. By adding a matching layer on the glass, between the glass and the finger, it is possible to enhance the coupling into the tissue and end up with a contrast in the reflection coefficient of approximately 1 to 0. The thickness of the matching layer can be chosen to be a quarter of a wavelength of the ultrasound signal in the matching layer material. As an example, a matching layer can include epoxy with a thickness of about 5 μm for a device 200 that transmits acoustic signals in of around 150 MHz.

The device 200 can include electronics for linear array imaging. Such linear imaging can be similar to linear imaging in medical ultrasound imaging systems. In such operation, a number of elements in the array are grouped together and excited with different phased signals such that the arrival times at the plate-finger interface occur at the same time from all the array elements. The receiver array elements, similar in number to the transmit array elements, would then receive the reflected signals, and electronic phase delays are added to each element to make their arrival times be the same for dynamic active focusing of tissue.

Once a measurement is made at one spot, the receiving array elements can be shifted by one element to enable a measurement of the next adjacent resolution spot. The process can be repeated to image a whole line by scanning the receive array. Next, the transmit array can be moved by one element, and the process can be repeated for receiving on another line. Overall, this process can be repeated to image the whole area or any desired portion of the finger.

In the above description, the imaging is done at the plane of the plate finger interface 125. However, at the locations where the finger is in touch with the plate, ultrasound energy can penetrate into the finger and reflections would occur from tissue inside the finger. Hence, information can be gathered from within the finger, such as information on blood flow in capillary blood vessels in the finger. From such information, the device 200 can derive information such as heart rate, indicating the subject is alive, or even some measure of capillary vessel health based on pulse wave velocity in the vessel.

The fingerprint scanner can scan the surface and possibly the volume of a finger. The device 200 can perform such imaging with a two-dimensional (2D) array of ultrasound transducers and no moving parts. Addressing a full 2D transducer array quickly can be a challenge due to a relatively large number of interconnects.

Figure 3:
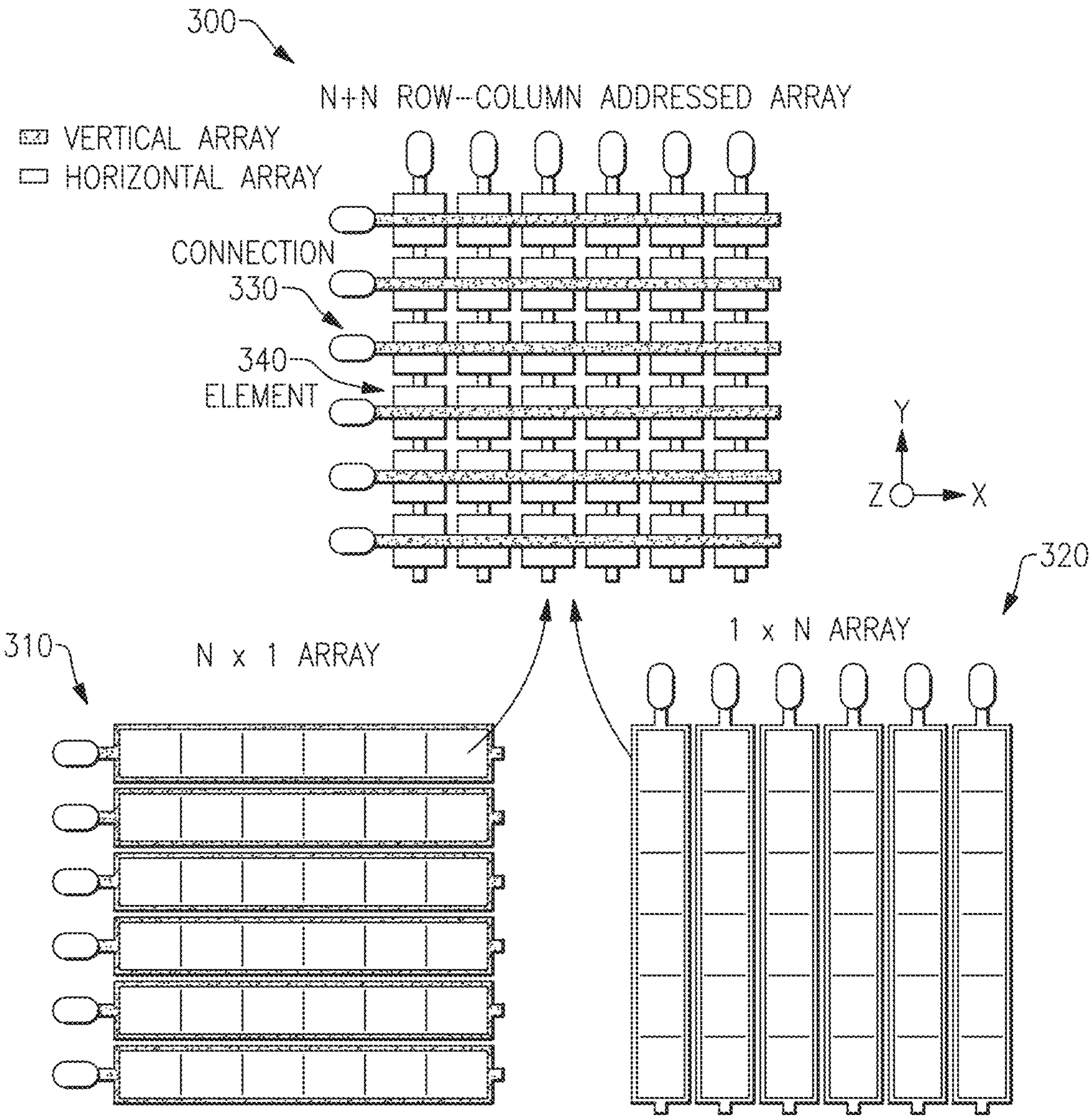
FIG. 3 illustrates a two-dimensional row-column addressed array of transducer elements addressed by a vertical array of row electrodes and a horizontal array of column electrodes, the vertical and horizontal arrays orthogonal to each other.

An alternative to full addressing is row-column addressing where an entire row of elements or an entire column of elements are addressed at a time. This can be achieved by having elements in the same row share the top (or bottom) electrode and elements in the same column share the bottom (or top) electrode. Accordingly, the transmit and receive electrodes can be on different sides of the array (top or bottom), and the transmit and receive apertures can be in two different directions (row or column). This can reduce the number of interconnections that fan out from the transducer array. FIG. 3 illustrates a two-dimensional N×N row-column addressed array 300 of transducer elements 340 addressed by a horizontal array of row electrodes 310 and a vertical array of column electrodes 320, the horizontal and vertical arrays 310 and 320, respectively, orthogonal to each other. While FIG. 3 illustrates a square N×N array, any suitable M×N rectangular array with M rows and N columns can alternatively be implemented in which N and M are different positive integers. FIG. 3 includes connections 330 at the ends of each horizontal array 310 of N×1 row arrays and each vertical array 320 of 1×N column arrays.

One way of using the row-column addressed array 300 has already been discussed with reference to FIG. 2. One receive focus is generated per transmit-receive event. A 512×512 2D array that uses 13 active elements in both the transmit and receive aperture can use about 500×500=250,000 transmit-receive events to make one scan. That would take approximately 43 ms to complete one scan, when the coupling medium is glass with a speed of sound of 5760 m/s and a thickness of 0.5 mm. If the receive electronics are expanded to record all receive elements in parallel, the scan can be completed in 500 transmit-receive events. This would about take about 87 μs for a full scan.

To further increase the scanning speed, parallelization can also be introduced in the transmit stage such that multiple transmit waves are emitted at a time. To parallelize the transmit beams for row-column addressed arrays, the transmit beams can be separated in the frequency domain and then received by different filters to separate them. The different filters can then pass the data to the receive beamformers. Any combination of transmit and receive parallelization can be utilized. The ultrasound beams can also be angle steered instead of translating the active aperture, or a combination of the two can be used. The scan can also be synthetically focused by using synthetic transmit focusing, synthetic receive focusing, or both.

This can effectively utilize the 2D transducer array as two 1D transducer arrays, which are orthogonal to each other. When one array is used for transmission and the other for reception, then full 3D imaging is achievable. One interconnect and beamformer-channel can be used per row and per column.

As an example, a fully addressed 256×256 element array can involve 65536 interconnections, whereas if it is row-column addressed 512 interconnections 330 can be implemented.

In operation, one set of electrodes, e.g., x-axis electrodes, can be used to transmit a line-focused beam of ultrasound. The focus can be at the location of the surface-finger interface. Once a pulse is transmitted by the x-axis aligned electrodes, the y-axis aligned electrodes can be used to detect a line focus in the x-direction as also shown schematically in the FIG. 2. The total response of the system is the intersection of the two focal lines and results in a resolution spot commensurate with diffraction limited resolution.

Transmit beamforming can be used for both fully addressed arrays and row-column addressed arrays to focus the emitted ultrasound beam at a chosen focal depth in the medium. This maximizes the acoustic pressure at the area of interest, which improves the SNR and image quality at that focal area. The pulse characteristics, such as length, amplitude level, and center frequency can also be varied to obtain the required imaging performance.

Figure 4:
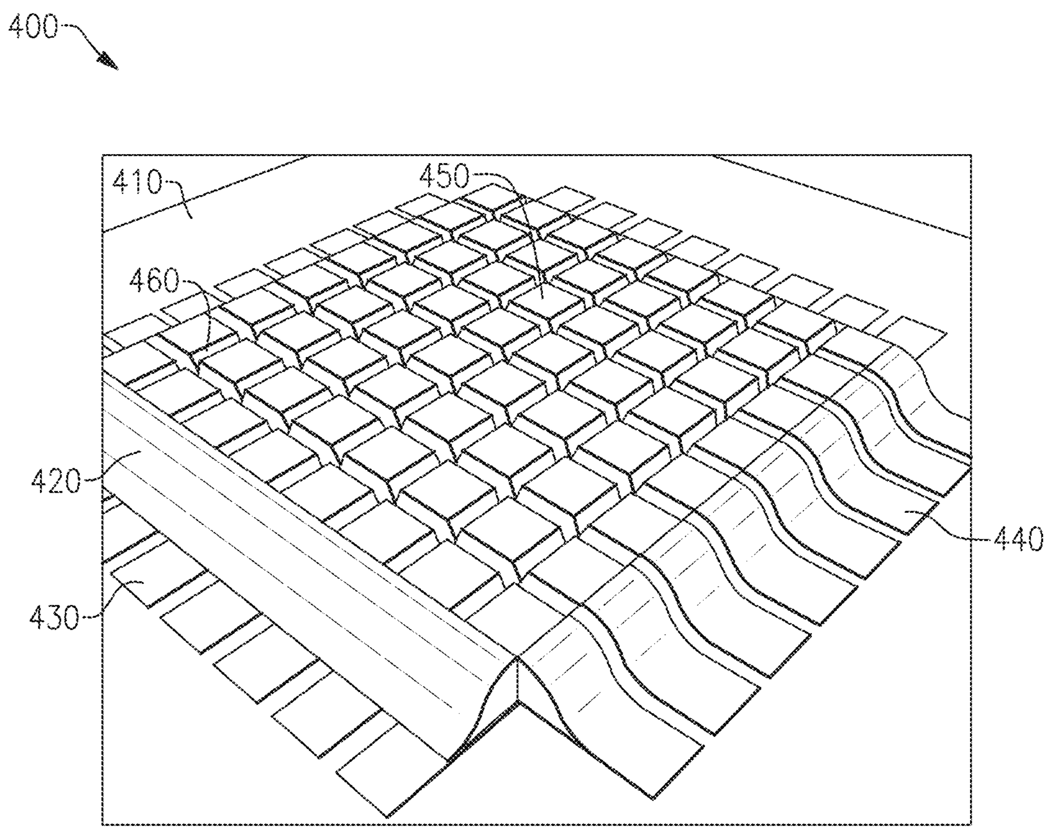
FIG. 4 illustrates a perspective view of an example ultrasound transducer array mounted on a substrate.

FIG. 4 illustrates a perspective view of a schematic of an example ultrasound transducer array 400 on glass 410. The ultrasound transducer array 400 includes bottom electrodes 430 on top of the glass substrate 410. The bottom electrodes 430 form a vertical array of lines in a horizontal direction. A piezoelectric thin film 420, such as zinc oxide, is on top of the bottom electrodes 430 and glass substrate 410. The piezoelectric thin film 420 can be square or rectangular in shape. The piezoelectric thin film 420 overlaps the array of bottom electrodes, but end portions of each bottom electrode 430 are not overlapped by the piezoelectric thin film 420 as illustrated to allow for creating metallic contacts. The piezoelectric thin film 420 is etched with trenches or grooves, such as v-shaped etchings 460 in both vertical and horizontal direction to reduce crosstalk for both receiving and transmitting in the array of transducer elements 450. The v-shaped etchings 460 are one example of trenches or grooves. Other embodiments can include trenches or grooves that are not v-shaped and have another suitable shape.

The top of each transducer element 450 is substantially square as illustrated. The top of one or more transducer elements 450 can have a different shape, such as a rectangular shape, in some other instances. Top electrodes 440 form a horizontal array of lines in a vertical direction. The top electrodes 440 are orthogonal to the bottom electrodes 430. The top electrodes 440 conform to the shape of the transducer elements 450, including the tops of and sides of transducer elements 450 formed by v-shaped etches 460. The width of each of the bottom electrodes 430 and the top electrodes 440 substantially corresponds to the length of the corresponding edges of the transducer elements 450. For example, the bottom electrodes 430 each have a width substantially the same as the width of the top electrodes 440, which is substantially equal in length to each side of the square tops of each transducer element 450 of the two-dimensional ultrasound transducer array 400.

The ultrasound transducer array 400 can be fabricated using a piezoelectric thin film 420 that is deposited on the surface by one of many thin film deposition techniques such as and not limited to: evaporation, DC or AC sputtering, sol-gel deposition, chemical vapor deposition, etc. Any suitable deposition method can provide a properly oriented thin film that would provide a reasonable electro-mechanical coupling coefficient to enable the excitation and detection of ultrasound signals. In order to reach a frequency in the mid-high range frequencies above 50 MHz and below 500 MHz piezoelectric transducers (e.g., zinc oxide based transducers) can be fabricated using sputtering technology or with a relatively thin piezoelectric plate (e.g., of lithium niobate or lithium tantalate). Assuming a speed of sound of a 36° rotated Y-cut lithium niobate piezoelectric layer, the plate can have a thickness in a range from about 7.4 micrometers to 74 micrometers. With a lithium niobate or lithium tantalate piezoelectric layer, a thin bonding layer can be included between the piezoelectric and the substrate.

The frequency of operation of an ultrasonic sensor device can depend on the material of the sensor plate or substrate to generate an image with a desired resolution. If the sensor plate is made of sapphire, the speed of sound in sapphire is relatively high at 11,100 m/sec. so a wavelength (resolution) of 50 μm involves a frequency of operation of 222 MHz. And, because sapphire has a higher mechanical impedance than most piezoelectric materials, the piezoelectric would operate in the so-called quarter-wavelength mode thus involving a thinner piezoelectric film. For instance, if zinc oxide (ZnO) is being used, the thickness can be about 7.1 μm. A similar exercise shows that for operation in quartz with a speed of sound of 6,320 m/sec, a wavelength of 50 μm is obtained by operating at 126.4 MHz, and a ZnO film that is about 25 μm thick. For operation in polypropylene with a speed of sound of 2,740 m/sec, a wavelength of 50 μm is obtained by operation at 55 MHz, and ZnO film thickness of about 57 μm. In the situations where the thickness of the particular piezoelectric film is too large for simple deposition, other alternative manufacturing methods such as epoxy bonding can be utilized.

The wavelength in the plate can be roughly equal to the resolution which for finger print recognition is 50 μm. Hence once a material is chosen, the frequency of operation is given by f=speed of sound/50 μm. The thickness of the piezoelectric is about half a wavelength for the cases where the plate has a lower impedance than the piezoelectric material. Hence, the thickness of the piezoelectric is given by t=speed of sound/twice the frequency of operation.

In an embodiment, the piezoelectric film is a ZnO thin film with a thickness of about 16 μm, a transducer size of 20 μm×20 μm to 30 μm×30 μm for a single sub-element, a line spacing (kerf) of 10-20 μm, a line width of 10-20 μm, and a pitch of 40-50 μm. The line width, line spacing, pitch, or any combination thereof can be within these ranges when the piezoelectric film includes a different material.

The device 400 can be made by first depositing a pattern of lines in one direction along the glass substrate. For example, the lines and spaces can be of the order of 25 μm and can be followed by the deposition of a piezoelectric thin film about 15 μm in thickness. Another set of lines and spaces can be formed along an orthogonal direction to the previous lines and spaces between the lines. Manufacturing such a device can be relatively simple compared to other ultrasound finger print solutions. The lithography of the lines and spaces is well within the capabilities of current semiconductor manufacturing capabilities, and the deposition of the piezoelectric thin film (15 μm) can be done by either physical vapor deposition (sputtering) or sol-gel manufacturing methods. Either way, a number of choices of piezoelectric materials are available for this purpose. These three manufacturing steps can be used to manufacture the device. Next, the x- and y-electrodes can be connected to electronic circuitry for the operation of the finger print recognition.

Figure 5:
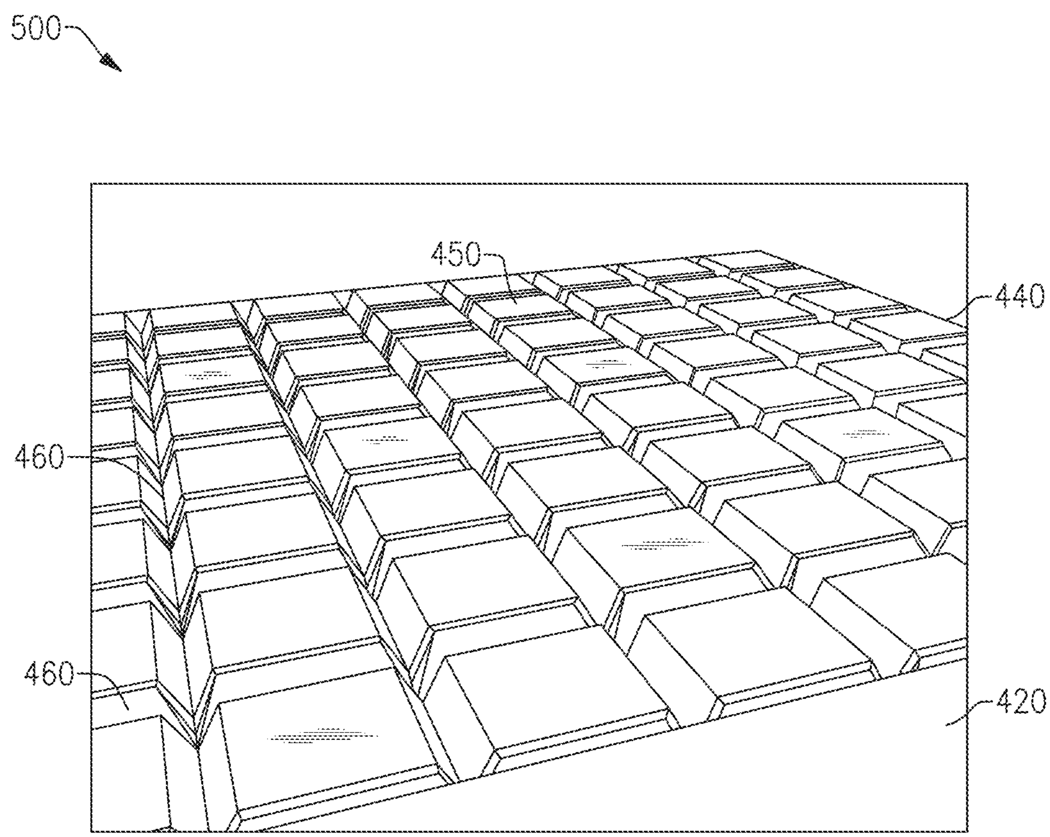
FIG. 5 illustrates a perspective view of a portion of an ultrasound transducer array mounted on a substrate.

FIG. 5 illustrates a perspective view of a portion of an ultrasound transducer array on a substrate. FIG. 5 illustrates a portion of the acoustic biometric touch scanner of FIG. 4, including piezoelectric thin film 420, top electrodes 440, transducer elements 450, and v-shaped etchings 460. FIG. 5 illustrates the v-shaped etchings 460 between transducer elements 450, in both horizontal and vertical directions. The top electrodes 440 conform to the v-shaped etchings 460 in the direction of the top electrodes 440, but do not cover or conform to the v-shaped etchings 460 in the direction orthogonal to the top electrodes 440. As noted above, an embodiment may include etched trenches or grooves that are not v-shaped.

Figure 6:
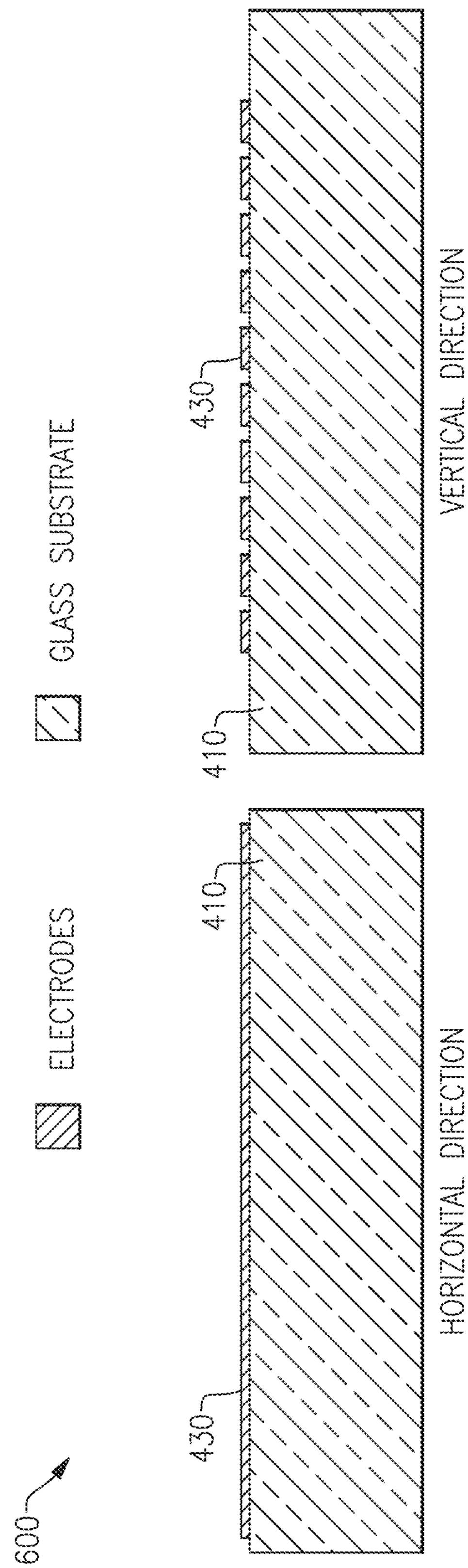
FIG. 6 illustrates an intermediate step of manufacturing an ultrasound transducer array by depositing bottom electrodes on top of a glass substrate.

FIG. 6 illustrates an intermediate step 600 of manufacturing an ultrasound transducer array, such as the scanner of FIGS. 4 and 5, by depositing bottom electrodes on top of a glass substrate. FIG. 6 includes horizontal and vertical direction views of bottom metal electrodes 430 deposited on glass substrate 410. The bottom electrodes 430 form a vertical array of horizontal elements.

Figure 7:
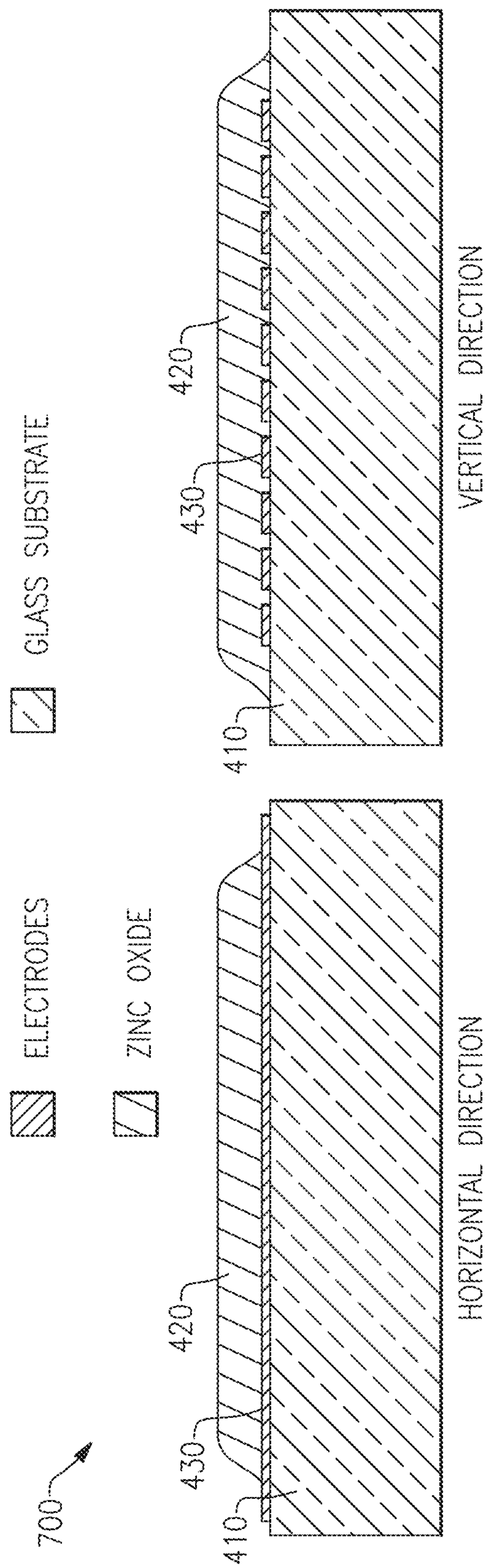
FIG. 7 illustrates an intermediate step of manufacturing an ultrasound transducer array by depositing piezoelectric film over the bottom electrodes.

FIG. 7 illustrates an intermediate step 700 of manufacturing an ultrasound transducer array, such as the array of FIGS. 4 and 5, by depositing a piezoelectric thin film 420, such as zinc oxide, over the bottom electrodes 430. The piezoelectric thin film 420 is adjacent to the bottom electrodes 430 in areas where the bottom electrodes 430 are present, and is adjacent to the glass substrate 410 in areas where the bottom electrodes 430 are absent, such as between the bottom electrodes 430. The piezoelectric thin film 420 may be deposited through magnetron sputtering. Parts of the bottom electrodes 430 are left uncovered at the edges on both sides to allow creation of contacts in a subsequent step.

Figure 8:
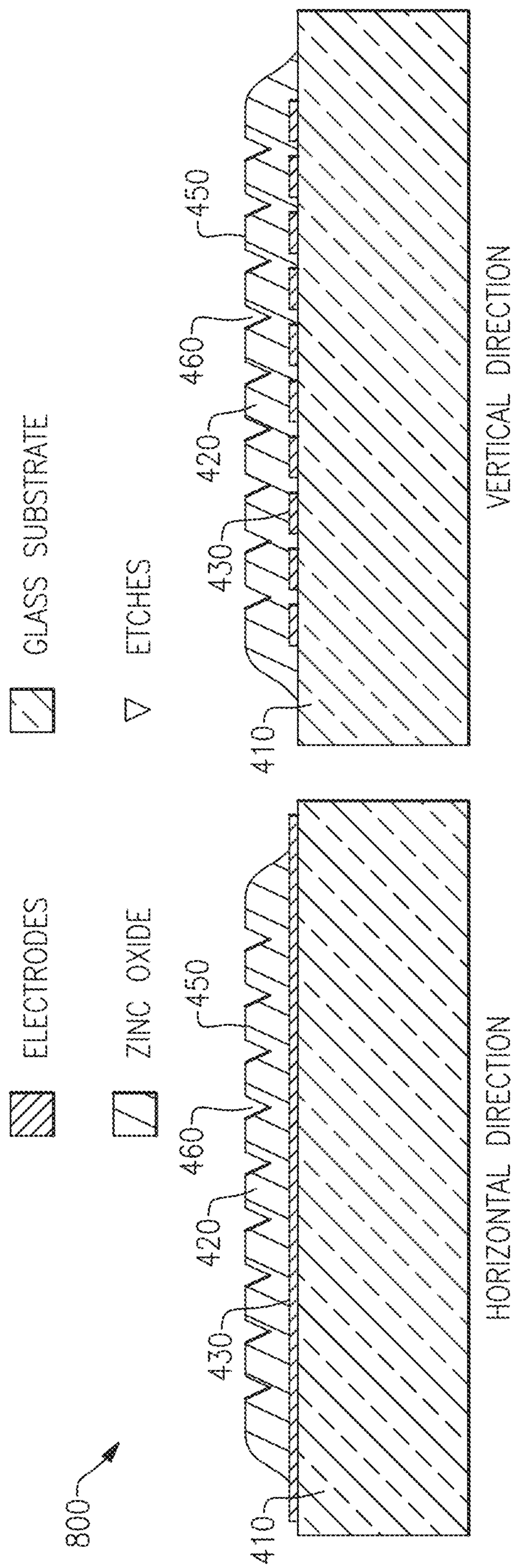
FIG. 8 illustrates an intermediate step of manufacturing an ultrasound transducer array by etching trenches or grooves in two directions on the top side of the film to reduce crosstalk between elements.

FIG. 8 illustrates an intermediate step of manufacturing an ultrasound transducer array, such as the array of FIGS. 4 and 5, by etching v-shaped etches 460 in horizontal and vertical directions on the top side of the film 420 to reduce crosstalk between elements 450. While v-shaped etches 460 are illustrated, any other suitably shaped etch can be implemented. The v-shaped etches 460 form top boundaries of a two-dimensional array of transducer elements 450 in horizontal and vertical directions. The tops of the transducer elements 450 are substantially square in the example of FIG. 8. The v-shaped etches 460 can reduce crosstalk between different transducer elements 450 of the array.

Figure 9:
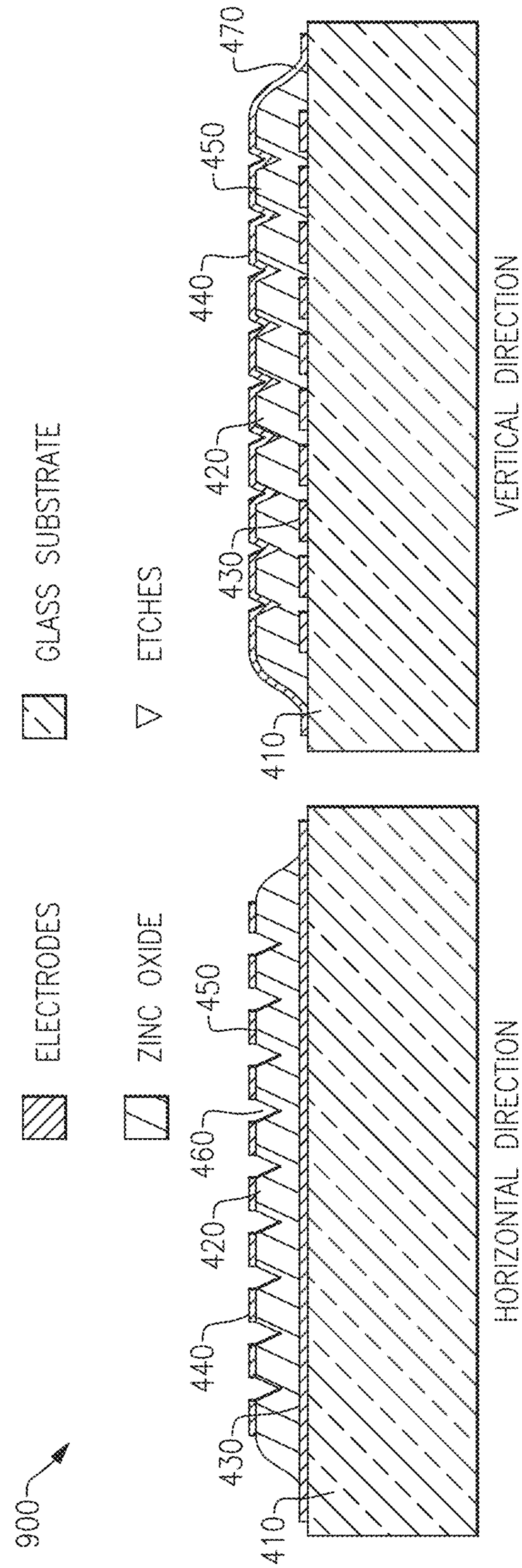
FIG. 9 illustrates an intermediate step of manufacturing an ultrasound transducer array by depositing top electrodes in a perpendicular direction relative to the bottom electrodes.

FIG. 9 illustrates an intermediate step of manufacturing an ultrasound transducer array, such as the array of FIGS. 4 and 5, by depositing top electrodes 440 in a perpendicular direction relative to the bottom electrodes 430. At the edges 470, the top electrodes 440 drop to the same plane as the bottom electrodes 430 from both sides to allow making contacts.

In an embodiment (not shown), absorbing layers, such as rubber or epoxy loaded with particles of tungsten or silicon carbide or any such material, are placed at the edge of the plate to reduce reflections from the edges of the plate that may come back an interfere with the signals of interest. Such edge reflections could also have the effect of reducing the repetition rate at which the finger is interrogated and hence the image frame rate.

Figure 10:
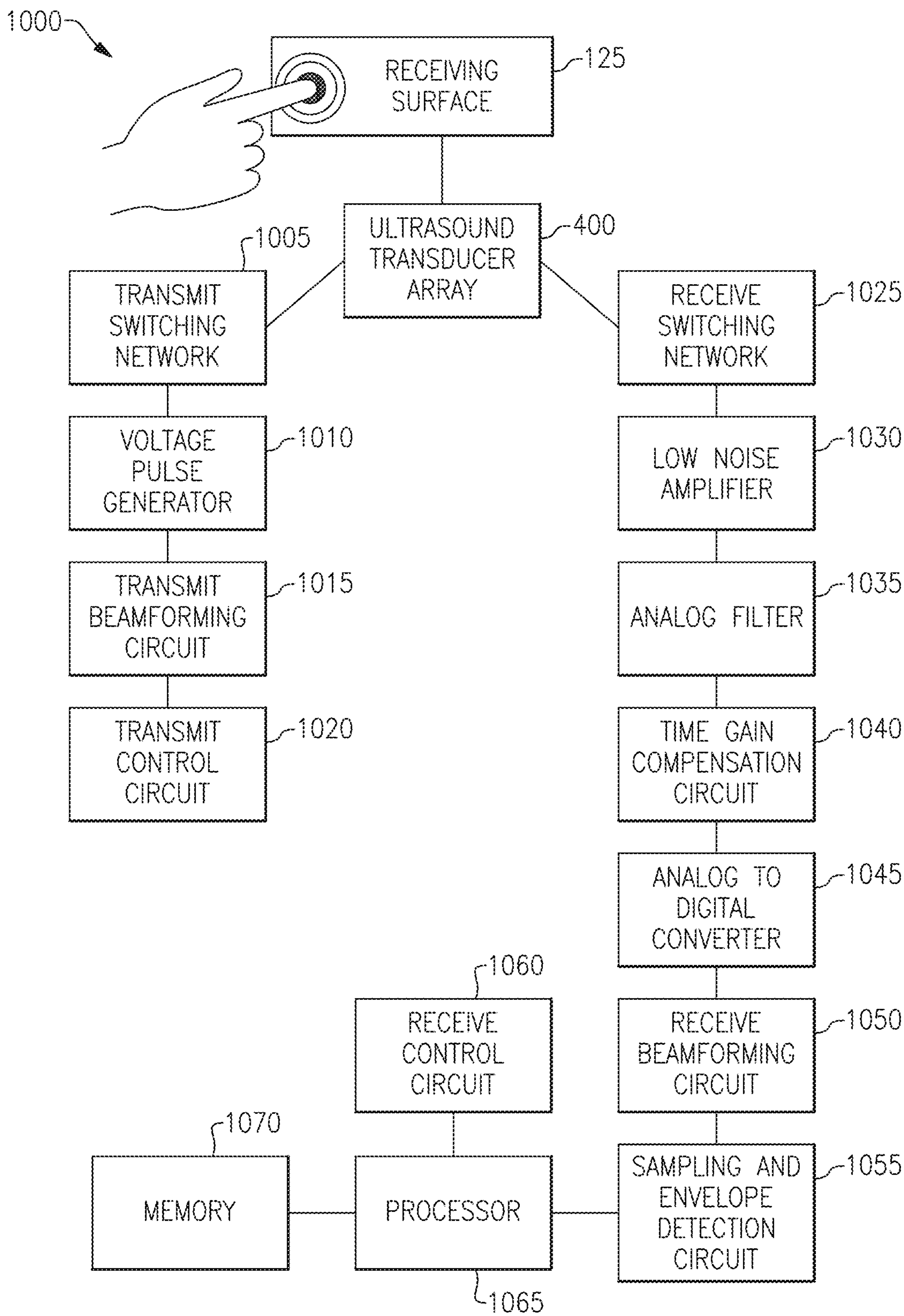
FIG. 10 illustrates an example acoustic biometric touch scanner, including an ultrasound transducer array, transmit electronics, and receive electronics.

FIG. 10 illustrates an example acoustic biometric touch scanner 1000 that includes an ultrasound transducer array 400 as described above with reference to FIGS. 2-9. The acoustic biometric touch scanner 1000 includes a receiving surface 125 to receive the touch of a person. The illustrated ultrasound transducer array 400 is interfaced with electronics that control its operation. These electronics include transmit and receive circuits.

The transmit circuits excite the ultrasound transducer array 400 to emit an ultrasound beam toward the imaging area of interest. The excitation can be created by applying an electric voltage pulse across the electrodes of a set of transducer elements within the transducer array. The bottom electrodes can be grounded when the pulse is applied to the top electrodes, and the top electrodes can be grounded when the pulse is applied to the bottom electrodes. The size and shape of a transmit aperture can be varied depending on the imaging area of interest. The illustrated transmit electronics include a transmit switching network 1005, a voltage pulse generator 1010, a transmit beamforming circuit 1015, and a transmit control circuit 1020.

The ultrasound transducer array includes multiple transmit channels, each associated with at least one electrode and ultrasound transducer elements. Each transmit channel can include at least a voltage pulse generator 1010 that generates the pulses, and a transmit control circuit 1020 to provide the inter-channel phase delays when used when triggering the pulses. Each transmit electrode may be connected to a dedicated transmit channel, or multiple electrodes can be grouped together and assigned to one transmit channel.

A transmit switching network 1005 can be a multiplexer that reduces the number of transmit channels by directing the pulses to the required active elements. During row-column addressing operation, when one side of the electrodes can operate in the transmit or receive mode, the other side is connected to ground. This can be achieved using switches that connect the electrodes to ground/transmit channels, or receive channels/ground.

The transmit beamforming circuit 1015 can implement beamforming to focus the emitted ultrasound beam at a chosen acoustic focal depth in the medium. This can produce the smallest spot size (diffraction limited resolution) and maximum acoustic pressure at the focal line, thus providing optimum performance at that focal area. In order to focus on a particular focal area, beamforming circuit 1015 can include delay elements to delay channels relative to each other. For example, the ultrasound transducer array 400 may transmit on multiple bottom electrodes, for example 14 electrodes, at a time. Ultrasound transducer array 400 may transmit over an aperture of, for example, 20 electrodes, and then shift by one or more electrodes, and transmit again. By transmitting over, for example, 20 electrodes at a time is a stronger signal with better signal to noise ratio than would result from transmitting over one electrode at a time. Beamforming circuit 1015 can adjust delays between electrodes. The voltage pulse generator 1010 (pulser) can generate the pulses with a shape, length, level, frequency and bandwidth to obtain a desired imaging performance.

Figure 11:
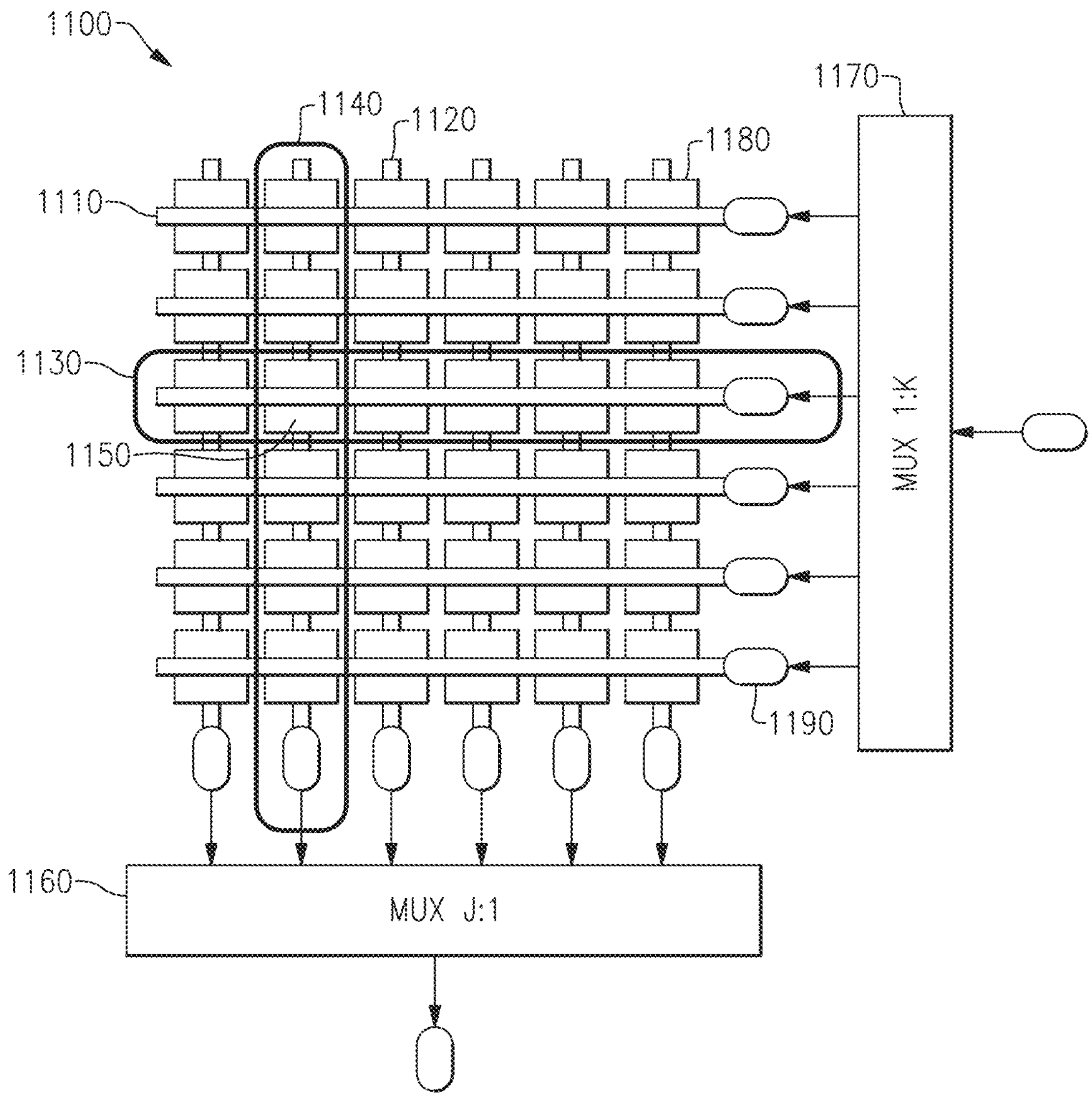
FIG. 11 illustrates a multiplexed single channel row-column addressed transducer array with an intersection of a single active row and a single active column.

As noted above, the size and shape of the transmit aperture can be varied depending on the imaging area of interest. For example, FIG. 11 illustrates a multiplexed single channel row-column addressed array 1100 with an intersection 1150 of a single active row and a single active column. The array 1100 includes rows 1110 and columns 1120 of transducer elements 1180, and contacts 1190. Switching network 1160 is selecting active column 1140, and switching network 1170 is selecting active row 1130. The active column 1140 and active row 1130 intersect at intersection 1150. The active aperture is the full length of line elements. As illustrated in FIG. 11, there are two active apertures, one for transmit and one for receive. This array can focus on a point—the intersection of the two line foci. In FIG. 11 there may be no focusing at all. Instead, the focusing can be performed as a post-processing step of synthetic aperture focusing.

Figure 12:
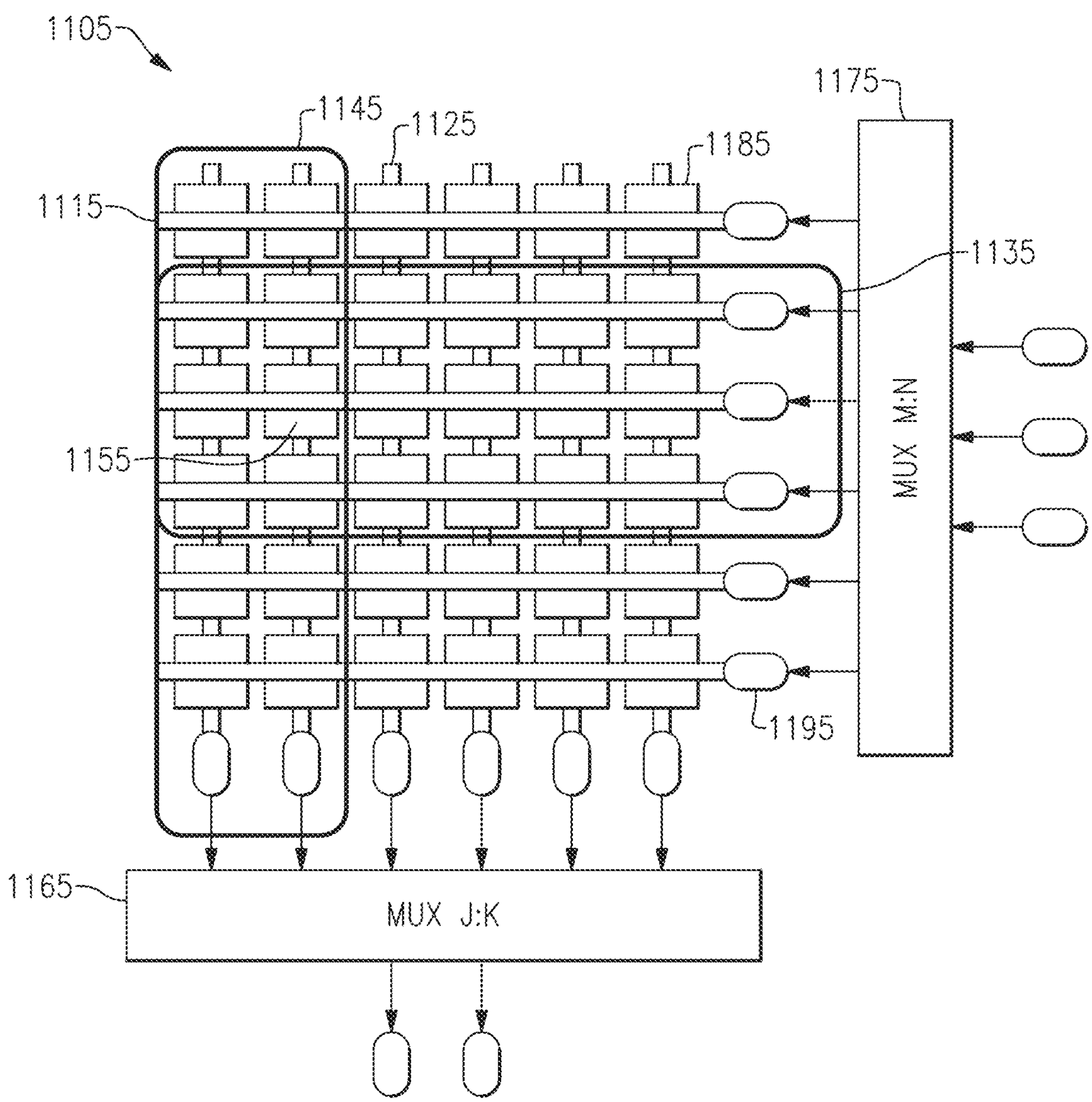
FIG. 12 illustrates a multiplexed single channel row-column addressed transducer array with an intersection of three rows and two columns.

In FIG. 12, the device can include hardware beamformers without implementing a post processing step of synthetic aperture focusing. The array 1105 includes rows 1115 and columns 1125 of transducer elements 1185, and contacts 1195. Switching network 1165 is selecting two active columns 1145, and switching network 1175 is selecting three active rows 1135. The active columns 1145 and active rows 1135 intersect at intersection 1155. Any suitable combination of one or more rows and one or more columns of the transducer array can be controlled so as to be concurrently active.

Referring back to FIG. 10, the receive circuits can process the electric radio frequency (RF) signals that are generated by the transducers in response to receiving the ultrasound echo signals from the medium. The receive circuits can then sample the signals, and digital data can be provided to a processor 1065 that is configured to generate an ultrasound image.

The illustrated receive circuits include a receive switching network 1025, a low noise amplifier 1030, an analog filter 1035, a time gain compensation circuit 1040, an analog to digital converter 1045, a receive beamforming circuit 1050, a sampling and envelope detection circuit 1055, and a receive control circuit 1060.

The receive switching network 1025 can be a multiplexer that reduces the number of receive channels by switching to the required receive electrodes. During row-column addressing operation, when one side of the electrodes can operate in the transmit or receive mode, the other side can be connected to ground. This can be achieved using switches that connect the electrodes to ground/transmit channels, or receive channels/ground.

The received ultrasound signals can be particularly noise sensitive and at low power. The low noise amplifier 1030 can amplify the received ultrasound signals. This first stage can influence the noise levels in the signal, which should be sufficiently low to allow for the scan to achieve the required signal-to-noise level. The subsequent stages can vary in functionality depending on the implementation. These functions include sampling and receive-beamforming. It should be noted that the subsequent stage is the ultrasound image reconstruction processor, and the receive circuity can provide the processor with the sampled data representing the received ultrasound echoes.

The analog filter 1035 can remove unwanted frequency components (e.g., the analog filter 1035 can be a bandpass filter to remove unwanted frequency components outside of a pass band). In some other instances, the analog filter 1035 can be coupled between the time gain compensation circuit 1040 and the analog-to-digital converter 1045 and/or an additional filter can be included between the time gain compensation circuit 1040 and the analog-to-digital converter 1045. The time gain compensation circuit 1040 can compensate for the increased attenuation of ultrasound signals that traveled longer distances. For example, reflections from a farther structure within a finger will attenuate more than reflections from a surface structure of a finger. The time gain compensation circuit 1040 can compensate by increasing the gain of the reflection from the farther structure relative to the gain of the reflection from the near structure, traveled for a shorter period of time.

After time gain compensation, the resultant signal can be digitized by analog to digital converter (ADC) 1045, to for subsequent digital processing of the signal. In an embodiment, the analog to digital conversion may occur at a different stage of the processing. For example, in an embodiment with beamforming in the analog domain, analog to digital conversion may be deferred until after receive beamforming.

The receive beamforming circuit 1050 can combine the received signals from multiple receive electrodes that were amplified, filtered, and compensated for by the low noise amplifier 103, analog filter 1035, and time gain compensation circuit 1040, respectively. The receive beamforming circuit 1050 can apply delays to combine the reflections received by the active receive electrodes, using delays for focus.

The receive control circuit 1060 can switch off the ADC 1045 or put it in standby mode so that the receive side circuits are inactive, in order to make the ADC 1045 idle when waiting for reflections to subside between consecutive measurements. This can make the acoustic biometric touch scanner 1000 more efficient from a power consumption standpoint.

The receive control circuit 1060 can also control the timing and operation of the receive beamforming circuit 1050. For example, receive control circuit 1020 can provide the inter-channel phase delays when required for received reflections of pulses by different electrodes. In the analog domain, beamforming could be achieved by using analog delay lines and an analog summing circuitry. The analog delay lines can provide a desired relative phase delay between the channels, and the analog summing circuitry will sum all analog signals to generate the beamformed signal. That single beamformed signal can then be sampled, digitized, and sent to the processing unit for reconstruction of the ultrasound image.

In some instances, the single beamformed signal can be envelope detected in the analog domain to reduce the sampling rate requirement. The envelope detected, single beamformed signal can then be sampled, digitized and sent to the processor 1065 for reconstruction of the ultrasound image.

Beamforming can alternatively or additionally be implemented in the digital domain, where the individual signals of the receive channels are sampled and digitized before they are delayed and summed. The digital data can be relatively delayed using digital delay circuitry and summed using a digital summing circuity. Another approach is to acquire and store only the samples at glass-finger interface, instead of gathering temporal samples along the axial direction. This can reduce the complexity of the hardware and could be done using similar circuitry to the analog beamforming implementation, but instead of using a sampling circuitry to sample all the signal at full speed, a peak detection and a single-sample sampling circuitry can be used to detect the signal level only at the interface, and then use the digital data from different active apertures locations to generate the image of the full scan.

Sampling and envelope detection circuits 1055 can detect the envelope of the beamformed signal to reduce the required sampling rate, and then sample the beamformed signal.

Figure 13:
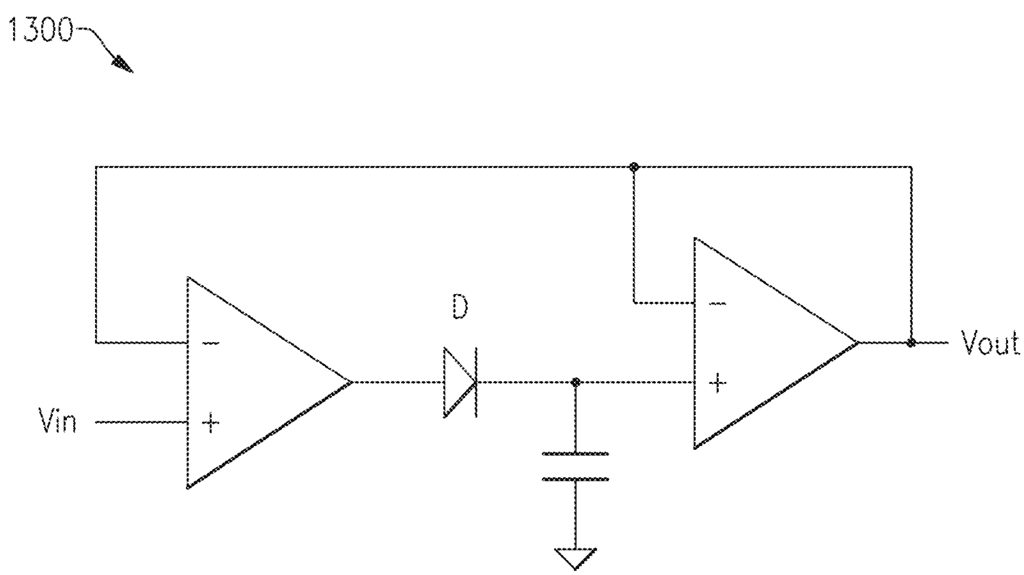
FIG. 13 illustrates peak detection circuitry using op-amps to detect a peak in an ultrasound signal.

There are multiple options for how to implement the signal sampling and envelope detection, including peak detection using op-amps. One option is shown in FIG. 13, which illustrates peak detection circuitry 1300 using op-amps to detect a peak in an ultrasound signal. This analog-hardware peak detector can be implemented with reduced hardware complexity and cost compared to some other options. The peak detector is a relatively inexpensive version of an envelope detector and the resulting signal is therefore similar to the baseband signal, which can be sampled at a reduced sampling frequency.

Figure 14:
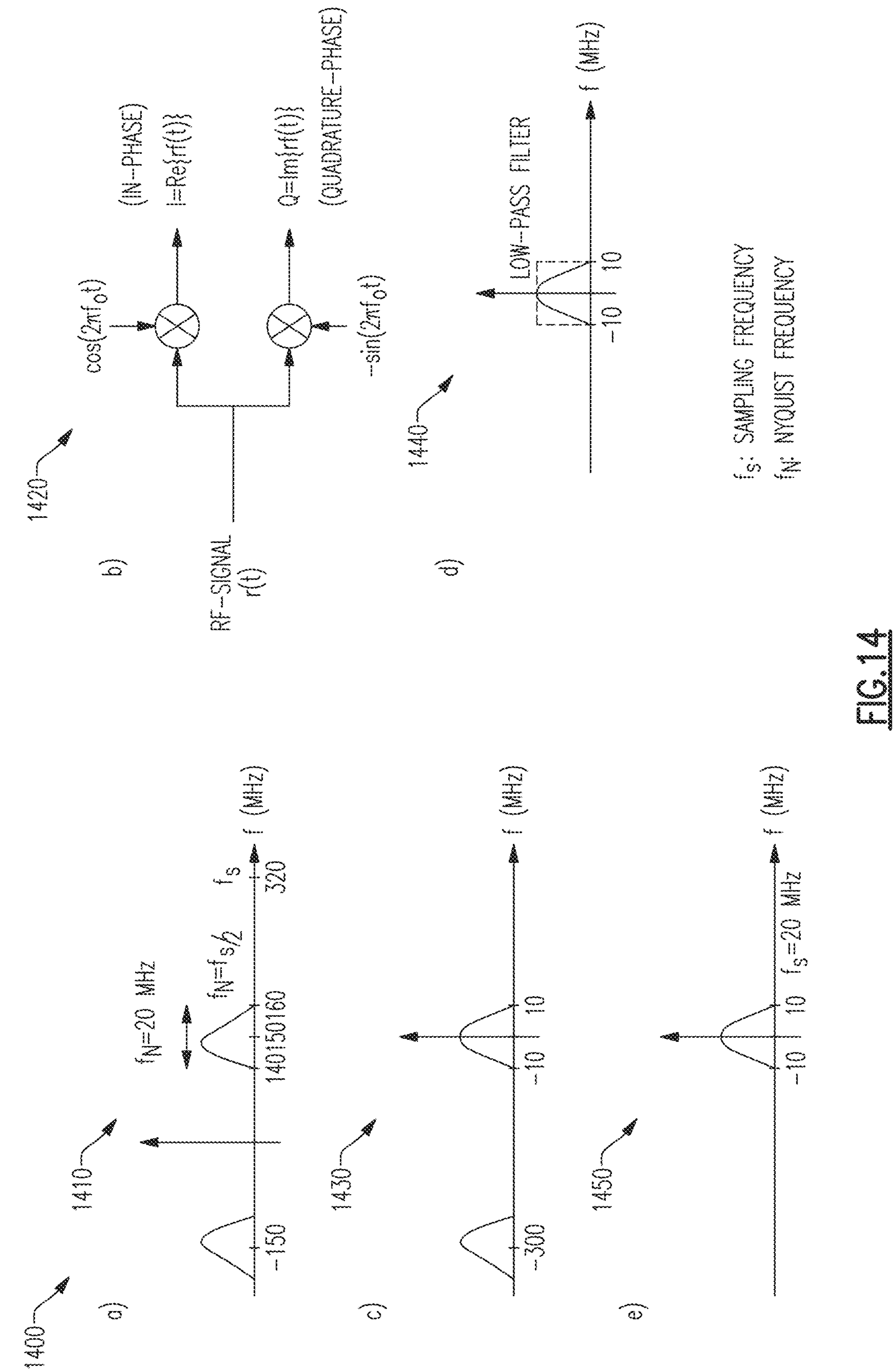
FIG. 14 illustrates frequency domain plots associated with signals in receive circuitry in communication with an ultrasound transducer array.

A second option is shown in FIG. 14, in which an IQ demodulator is used to down mix the RF signal down to base band where it can be sampled with a lower sampling frequency. FIG. 14 illustrates frequency domain plots and signal mixing for in-phase and quadrature demodulation of a signal. Graph 1410 illustrates a signal in the frequency domain centered at 150 MHz with a bandwidth of 20 MHz, sampled at 320 MHz. Block diagram 1420 illustrates mixers to down mix the signal of graph 1410. Graph 1430 illustrates the downmixed signal in the frequency domain, with the baseband signal centered at 0 Hz and an image at higher (negative) frequencies. In graph 1440, the downmixed signal of 1430 is low passed filtered, leaving the baseband signal. Graph 1450 illustrates that the baseband signal can now be sampled at a reduced frequency.

Figure 15:
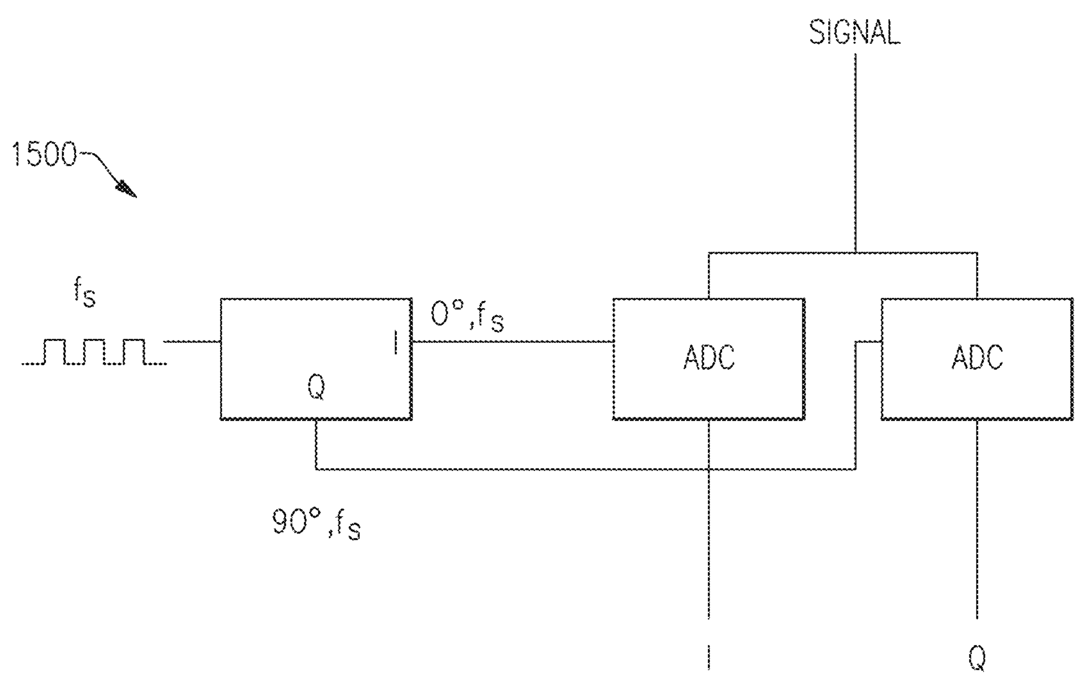
FIG. 15 illustrates a functional block diagram for direct in-phase and quadrature (IQ) sampling in receive circuitry in communication with an ultrasound transducer array.

A third option is shown in FIG. 15, which illustrates a functional block diagram 1500 for direct in-phase and quadrature (IQ) sub-sampling. This approach can be useful if the received signal is narrow band. IQ sub-sampling circuitry combines the functionality of a demodulator followed by a sampling circuitry. The more narrow band the signal is, the lower the sampling rate can be while preserving the image quality. The quadrature signal is only at 90° phase shift for one single frequency, hence it can perform better for narrow band signals than for wide band signals.

Figure 16:
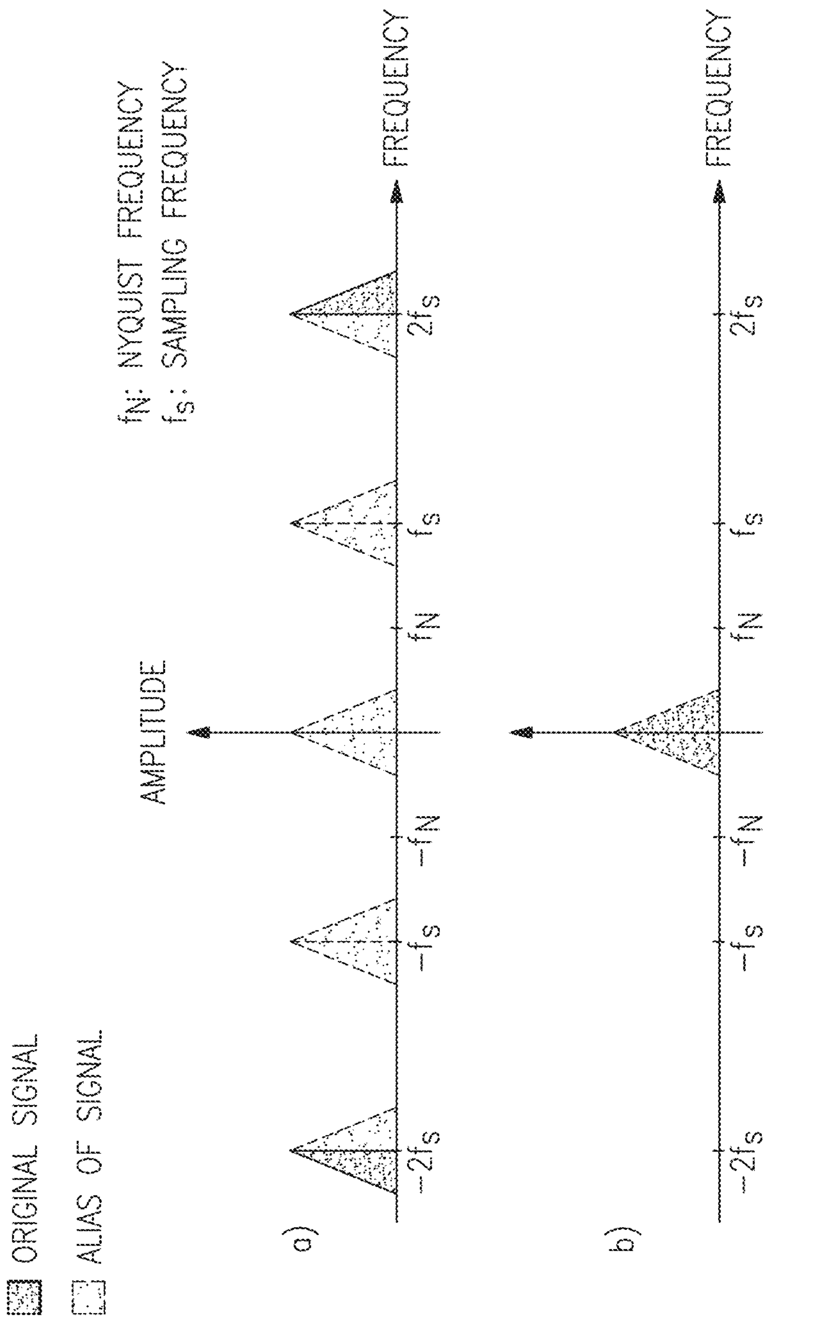
FIG. 16 illustrates an original high frequency signal and its spectral aliases when undersampled, and the baseband alias after undersampling.

A fourth option to reduce the data rate but still keep signal information is under-sampling of a band-limited signal. When sampling a continuous time signal, its frequency content is determined by the discrete time Fourier transform, which has images of the original signal at multiples of the sampling frequency, $f_s$. FIG. 16, illustrates an original high frequency signal and its spectral aliases when it is under-sampled, as well as the baseband alias of the signal after undersampling.

A fifth option is to sample the radio frequency signals at twice the frequency of the highest frequency content in the signal. This option involves a relatively high sampling rate.

Referring back to FIG. 10, the acoustic biometric touch scanner 1000 includes a processor 1065 and memory 1070. The processor 1065 reconstructs images from the reflected ultrasound signals that were amplified, filtered, compensated, digitized, beamformed, sampled and envelope detected, as discussed above. The images reconstructed by processor 1065 may be three dimensional images, or in two dimensions. Images may be reconstructed at different times, or in a time series, to enable change detection or video processing of the finger in two or three dimensions.

The processor 1065 can apply image processing techniques to the reconstructed images to, for example, reduce speckle, highlight blood vessels, measure pulse rate, estimate temperature. Memory 1070 stores reconstructed images, processing results, transmit and receive control instructions, beamforming parameters, and software instructions. Memory 1070 can also store an image, such as a fingerprint image, that the biometric touch scanner 1000 uses to determine if a scanned image is a match.

Accordingly, the processor 1065 can generate an image of at least a portion of a fingerprint based on a reflection of an ultrasound signal from the ultrasound transducer array 400 that is reflected from a finger at the receiving surface 125. The reflection can be received by the ultrasound transducer array 400 and processed by the receive circuit. The processor 1065 can also generate additional information based on a reflection of an ultrasound signal from the ultrasound transducer array 400. Such additional information can include one or more liveness parameters, such a temperature associated with a finger and/or a force at which the finger contacts the device. Based on one or more liveness parameters, the processor 1065 can provide an indication of whether the detected image is associated with a live finger. The liveness parameter together with the fingerprint image can be used for any suitable identification and/or authentication applications. The processor 1065 can cause this indication to be output in any suitable visual, aural, or other manner.

Figure 17:
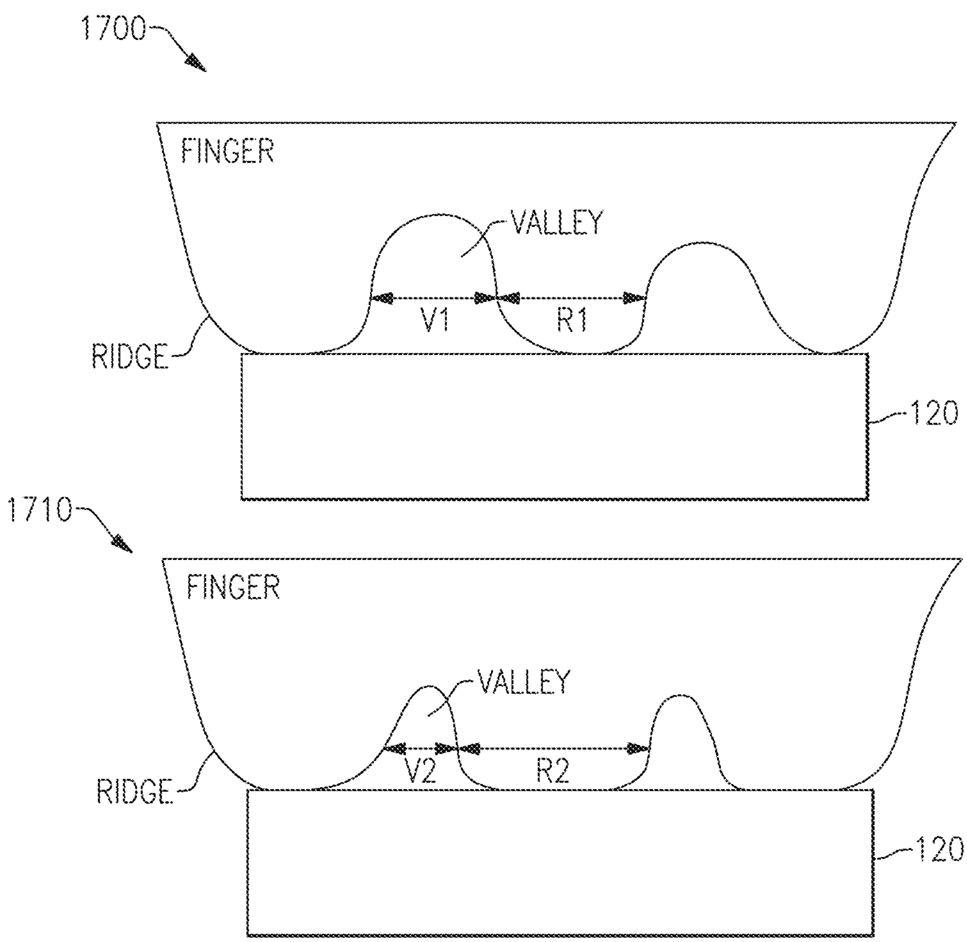
FIG. 17 illustrates that as the force with which a finger is pushed against a receive surface increases, fingerprint ridges widen and the total finger surface in contact with the receiver surface increases.

FIG. 17 illustrates that as the force with which a finger is pushed against a scanner increases, fingerprint ridges widen and the total finger surface in contact with the scanner increases. At lower force 1700, the width of a ridge and a valley in contact with the receiving surface is R1 and V1, respectively. At higher force, the width of the ridge and valley in contact with the receiving surface is R2 and V2, respectively. The width of the ridges can be dependent on the force with which the finger is pushed against the scanner. At higher forces the ridges widen (R2>R1) and the valleys narrow (V2<V1). For example, the width of the valley at lower force and the total surface in contact with the scanner increases. In the example of FIG. 17, as force increases, the surface area of the ridge in contact with the receiving surface increases. This total area, or contact density, can be measured and from this the applied force estimated by assuming a tissue stiffness. The stiffer the tissue is the less it should deform under pressure.

The tissue stiffness itself can also be estimated by measuring the applied force from the finger and comparing it with the estimated force based on the assumed tissue stiffness. The estimated tissue stiffness, α, is value which renders the following equation true:

$$F_{meas}=F_{est}(\alpha)$$

where $F_{meas}$ is the measured force and $F_{est}$ is the estimated force.

Any of the biometric sensing devices discussed herein can implement force detection. A biometric sensing device with force detection can include a processor and transducers configured to transmit an acoustic signal through a receiving surface to a finger. The processor can generate an image of at least a portion of a fingerprint of the finger based on a reflection of the acoustic signal from the finger, detect a surface area of ridges of the finger in contact with the receiving surface based on the reflection, and estimate a force at which the finger contacts the receiving surface based on the detected surface area. The processor can generate an indication of whether the finger is part of a live human based on the estimated force. The image of at least a portion of the fingerprint can have a resolution of 500 pixels per inch or greater.

Sound speed though a medium can change with temperature. In some materials, the speed of sound can increase with temperature. For various materials (e.g., solids such as glass, sapphire, metal, and the like), we expect the speed of sound to decrease with temperature. Accordingly, the dependence of the speed of sound in a material based on temperature can be used to evaluate temperature from a measurement of the speed of sound propagating through the material.

Figure 18:
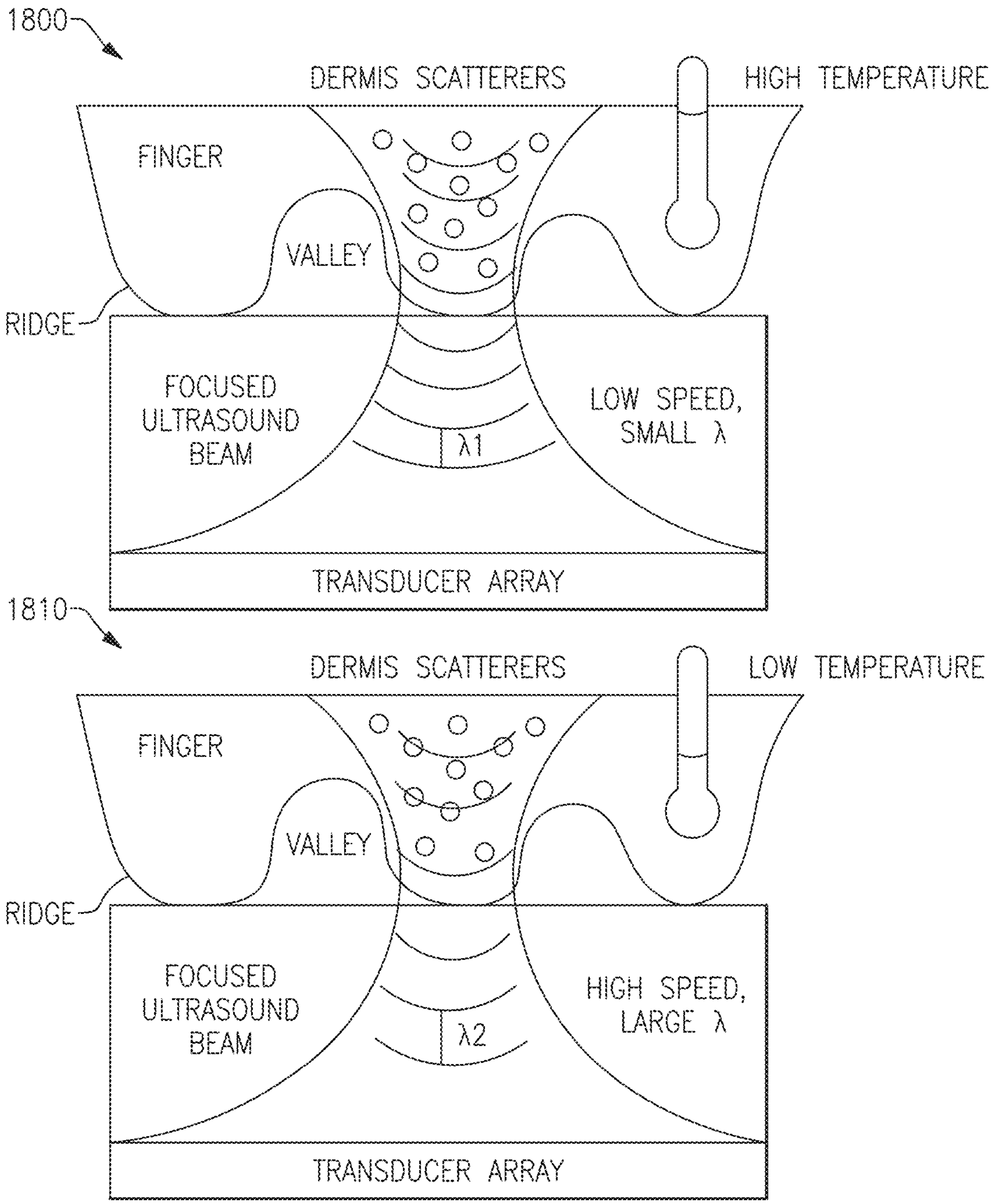
FIG. 18 illustrates the speed of a sound wave through a medium can change with a change in temperature in the medium.

FIG. 18 illustrates that the speed of a sound wave through a medium can decrease with an increase in temperature. The speed of sound propagating through a material is typically dependent on the material temperature. The speed of sound in solids typically decreases with higher temperatures. Within the normal operating range of temperatures of a biometric sensing device, there is an approximate linear relationship between the temperature and the speed of sound:

$$c(T)\propto T\times\phi \quad (1),$$

where c(T) is a temperature dependent sound speed through a material, T is temperature, and ϕ is a sound speed slope that is based on the material. The sign of ϕ can be negative or positive, but is negative in various materials of the mediums discussed herein (e.g., glass, sapphire, and metal).

The distance between the ultrasound transducer and an acoustically reflecting object, like the opposite glass-air interface on a smart phone, can also increases with temperature due to thermal expansion. However, the elastic constant change which results in lowering the speed of sound is typically about an order of magnitude larger than the thermal expansion coefficient and should dominate the effect of increasing the delay of the pulse. The speed of sound can be estimated by the time it takes for the ultrasound signal to travel from the transducer to the acoustically reflecting object and back again. The shorter the time it takes, the faster the speed of sound and the warmer the material should be. In the example of FIG. 18, spacing between wavefronts corresponds to wavelength. The wavelength of the reflected ultrasound beam at high temperature 1800 and low temperature 1810 is λ1 and λ2, respectively, with λ2 being greater than λ1. From the speed of sound, the material temperature can be determined based on the equation above, analytically and/or numerically. The material temperature can be a temperature associated with the finger that can be used to generate an indication of whether the finger is part of a live human.

Any of the biometric sensing devices discussed herein can implement temperature detection. A biometric sensing device with temperature detection can include a processor and transducers configured to transmit an acoustic signal through a receiving surface to a finger. The processor can detect a temperature of the finger based on a sound speed associated with the acoustic signal and generate an image of at least a portion of a fingerprint of the finger based on a reflection of the acoustic signal from the finger. The processor can generate an indication of whether the finger is part of a live human based on the detected temperature. The processor can detect an ambient temperature based on a second sound speed associated with the acoustic signal when the finger is not in contact with the receiving surface. The processor can detect the temperature of the finger based on a difference in sound speed associated with the acoustic signal between when the finger is in contact with the receiving surface and when the receiving surface is uncontacted by the finger.

Figure 19:
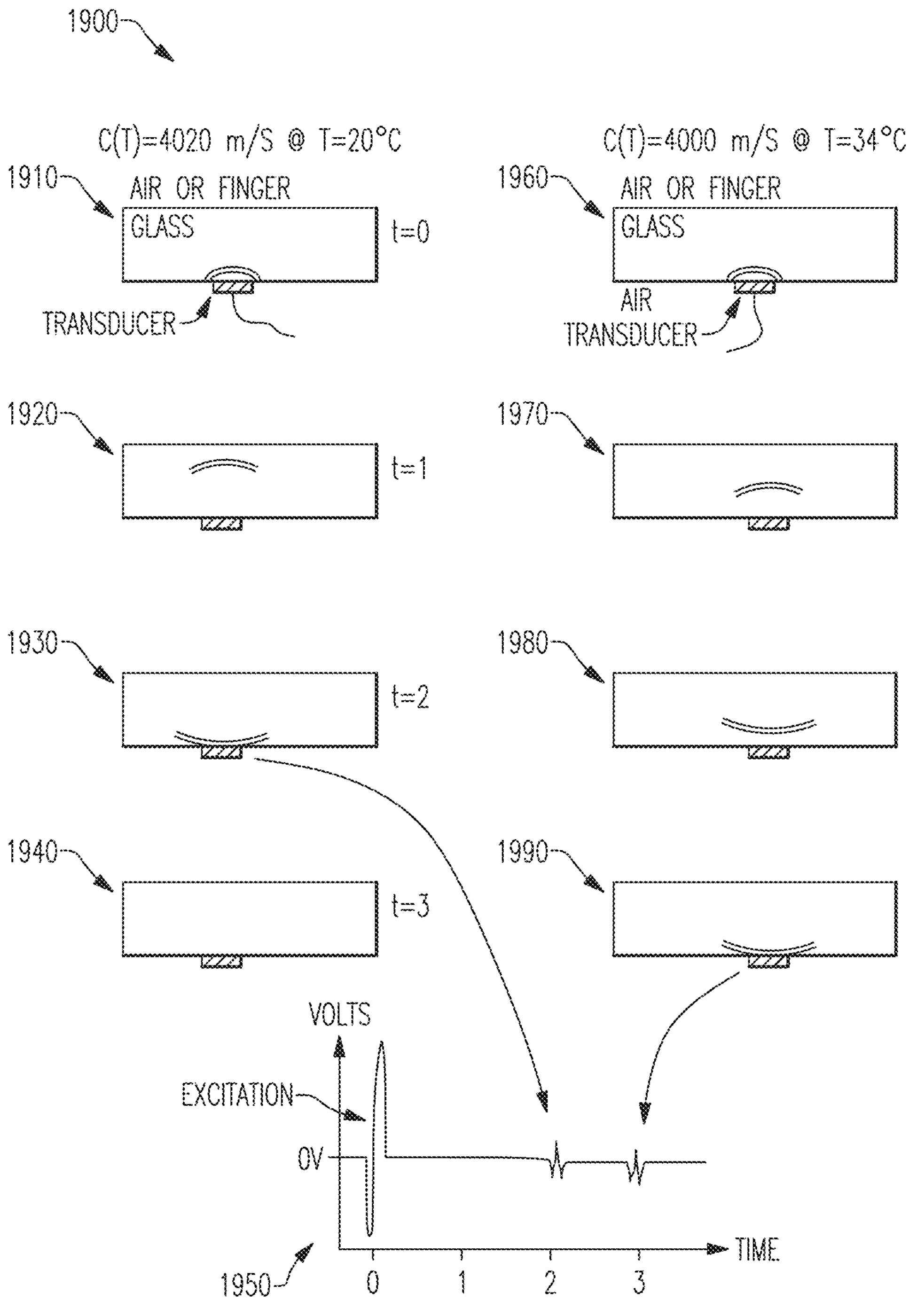
FIG. 19 illustrates that the time of flight from excitation until the reflected wavefront is recorded can change with temperature.

FIG. 19 illustrates that the time of flight from excitation until the reflected wavefront is shorter for higher temperatures. In particular, FIG. 19 shows that the time of flight from excitation until the reflected wavefront is recorded is shorter at 34° C. than at 20° C., because the speed of a sound wave increases with an increase in temperature. Since the finger is at body temperature and the sensor at room temperature, once touched, the temperature of the glass or other intermediate layer would get warm and generally increase the speed of sound in the glass. Therefore, biometric devices discussed herein can determine the temperature of the finger based on sound speed. This can ascertain that it is not a prosthetic finger that is touching the glass. When the finger is not touching the glass, the ambient temperature can be determined by the device.

FIG. 19 compares the time of travel of ultrasound at a higher temperature of 34° C. with the travel of ultrasound at a lower temperature of 20° C. As illustrated, the speed of sound is 4020 m/s at the lower temperature and 4000 m/s at the higher temperature. The time intervals are not drawn to scale to emphasize the difference in time of travel.

At time t=0, in graphic 1910, at the lower temperature, the pulse is transmitted by the transducer towards the air/glass interface. At time t=1, in graphic 1920, the pulse nears the air/glass interface. At time t=2, in graphic 1930, a reflection of the pulse reaches the transducer. There is not activity at time t=4, in graphic 1940, since the reflected pulse previously reached the transducer. Therefore, the time of flight from excitation to recording of the reflected wavefront is approximately two time intervals, as illustrated in the graph 1950, at the higher temperature.

At time t=0, in graphic 1960, at the higher temperature, the pulse is transmitted by the transducer towards the air/glass interface. At time t=1, in graphic 1970, the pulse approaches the air/glass interface, but is not yet near it. At time t=2, in graphic 1970, the reflection of the pulse approaches, but has not yet reached, the transducer. At time t=3, in graphic 1970, the reflection has reached the transducer. For the higher temperature, the time of flight from excitation to recording of the reflected wavefront is approximately three time intervals, as illustrated in the graph 1950. Therefore, the time of flight is shorter at the lower temperature. As time of flight varies with temperature, the time of flight can be used to estimate relative temperatures, and once calibrated, can be used to estimate absolute temperature.

Figure 20:
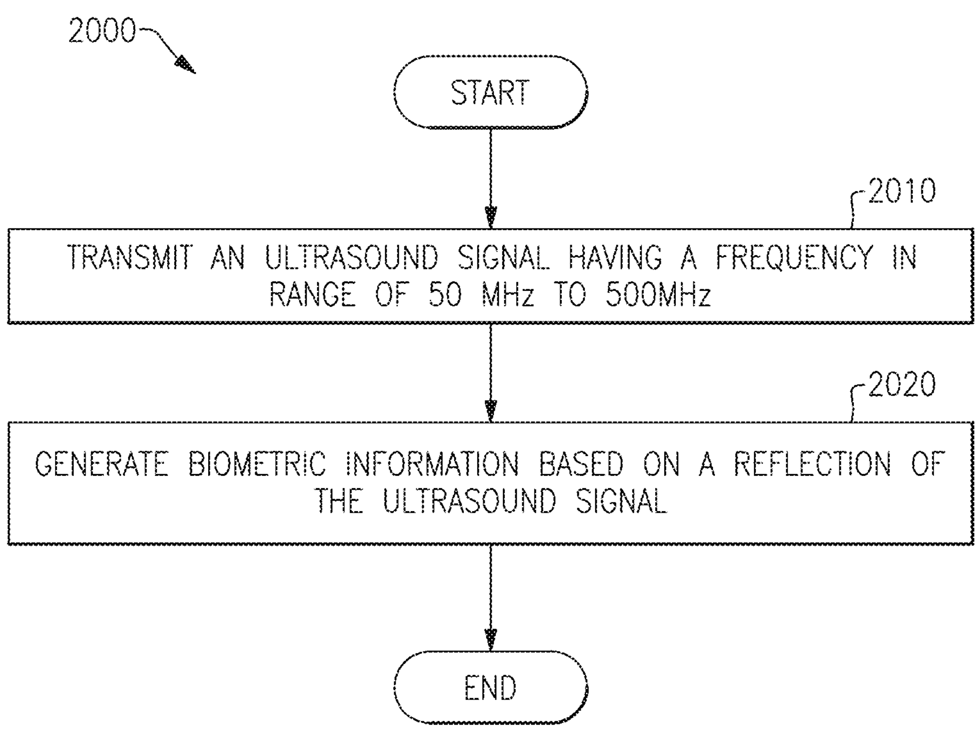
FIG. 20 is a flowchart of a method of generating biometric information according to an embodiment of the disclosed technology.

FIG. 20 is a flowchart of method 2000 of generating biometric information according to an embodiment of the disclosed technology. In block 2010, method 2000 transmits an ultrasound signal having a frequency in a range from 50 MHz to 500 MHz. In block 2020, method 2000 generates biometric information based on a reflection of the ultrasound system.

Figure 21:
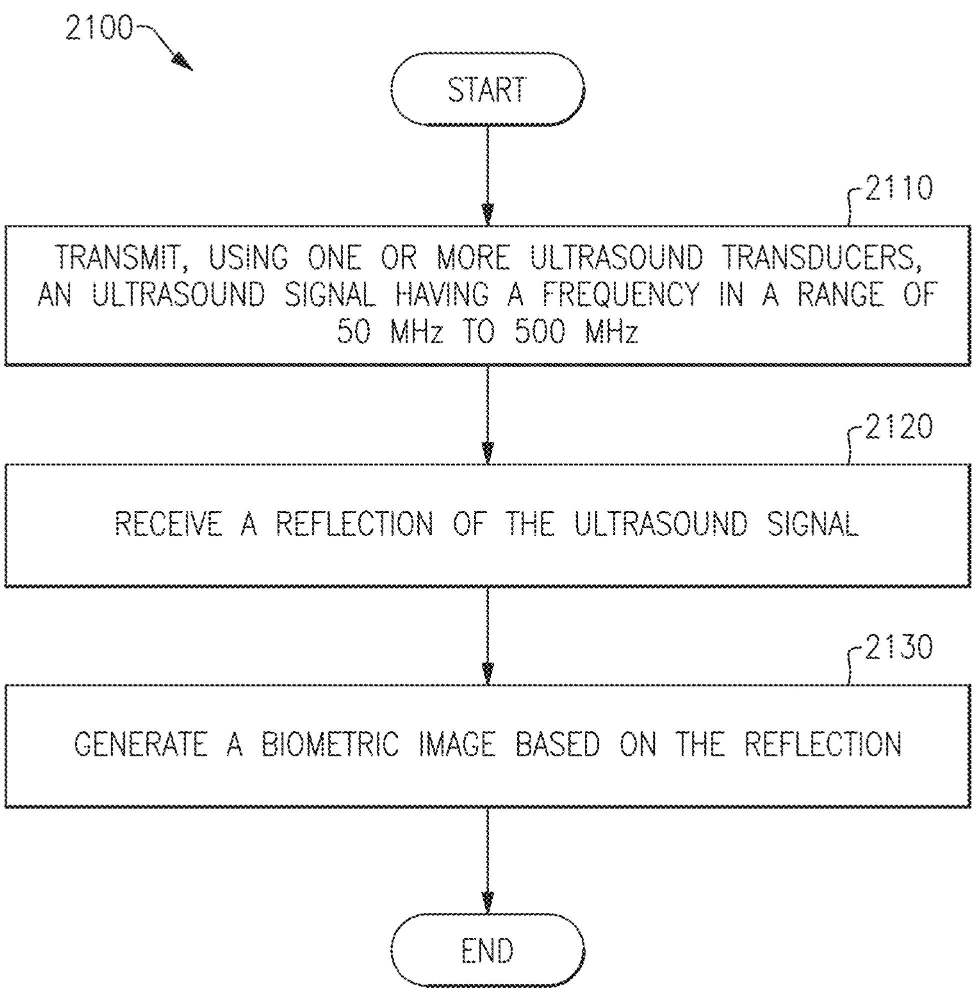
FIG. 21 is a flowchart of a method of generating a biometric image according to an embodiment of the disclosed technology.

FIG. 21 is a flowchart of method 2100 of generating a biometric image. In block 2110, method 2000 transmits, using one or more ultrasound transducers, an ultrasound signal having a frequency in a range of 50 MHz to 500 MHz. In block 2120, method 2100 receives a reflection of the ultrasound signal. In block 2130, method 2000 generates a biometric image based on the reflection.

Figure 22:
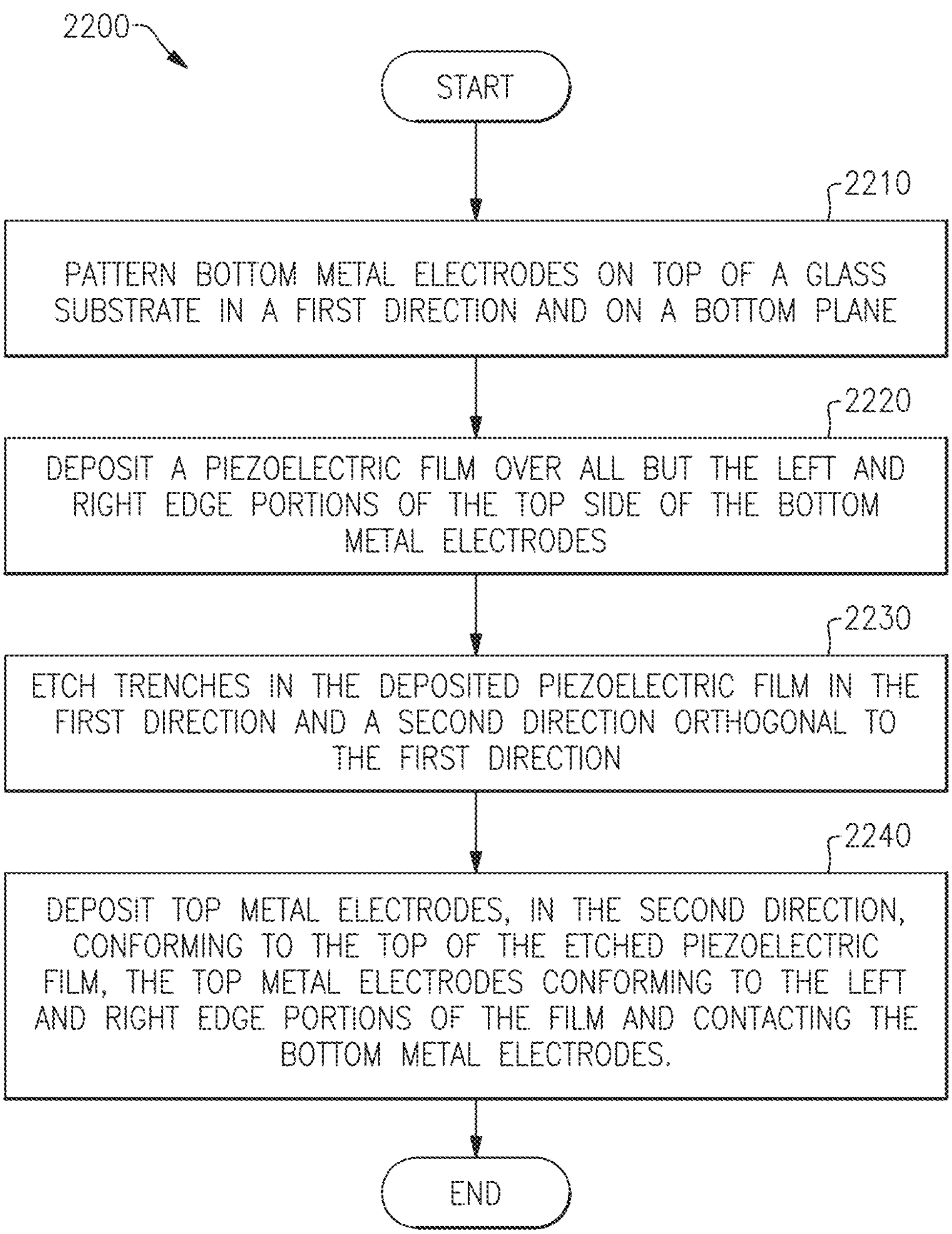
FIG. 22 is a flowchart of a method of manufacturing an acoustic biometric touch scanner according to an embodiment of the disclosed technology.

FIG. 22 is a flowchart of a method 2200 of manufacturing an acoustic biometric touch scanner according to an embodiment of the disclosed technology. In block 2210, method 2200 patterns bottom metal electrodes on top of a glass substrate in a first direction and on a bottom plane. In block 2220, method 2200 deposits a piezoelectric film over all but the left and right edge portions of the top side of the bottom metal electrodes. In block 2230, method 2200 etches trenches or grooves in the deposited piezoelectric film in the first direction and a second direction orthogonal to the first direction. In block 2240, method 2200 deposits top metal electrodes, in the second direction, conforming to the top of the etched piezoelectric film, the top metal electrodes conforming to the left and right edge portions of the film and contacting the bottom metal electrodes.

Figure 23:
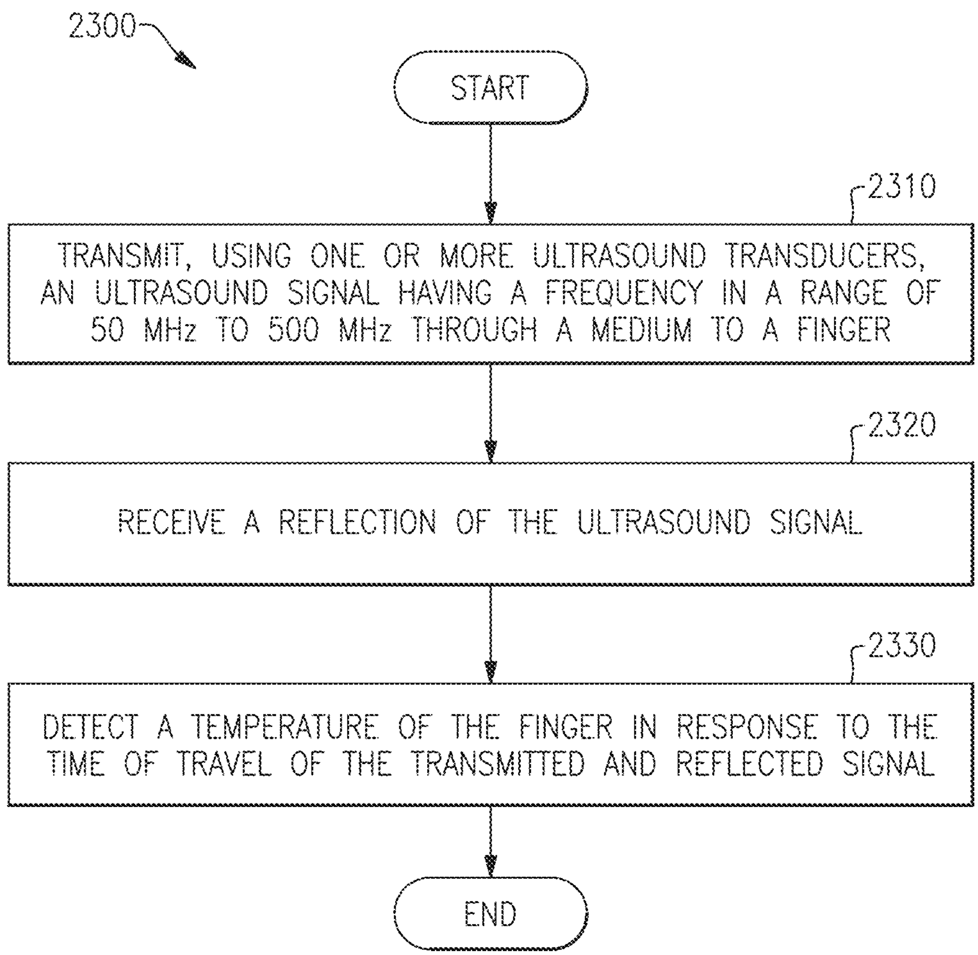
FIG. 23 is a flowchart of a method of detecting a temperature of a finger according to an embodiment of the disclosed technology.

FIG. 23 is a flowchart of a method 2300 of detecting a temperature of a finger according to an embodiment of the disclosed technology. In block 2310, method 2300 transmits, using one or more ultrasound transducers, an ultrasound signal having a frequency in a range of 50 MHz to 500 MHz through a medium to a finger. In block 2320, method 2300 receives a reflection of the ultrasound signal. In block 2330, method 2300 detects a temperature of the finger in response to the time of travel of the transmitted and reflected signal.

Figure 24:
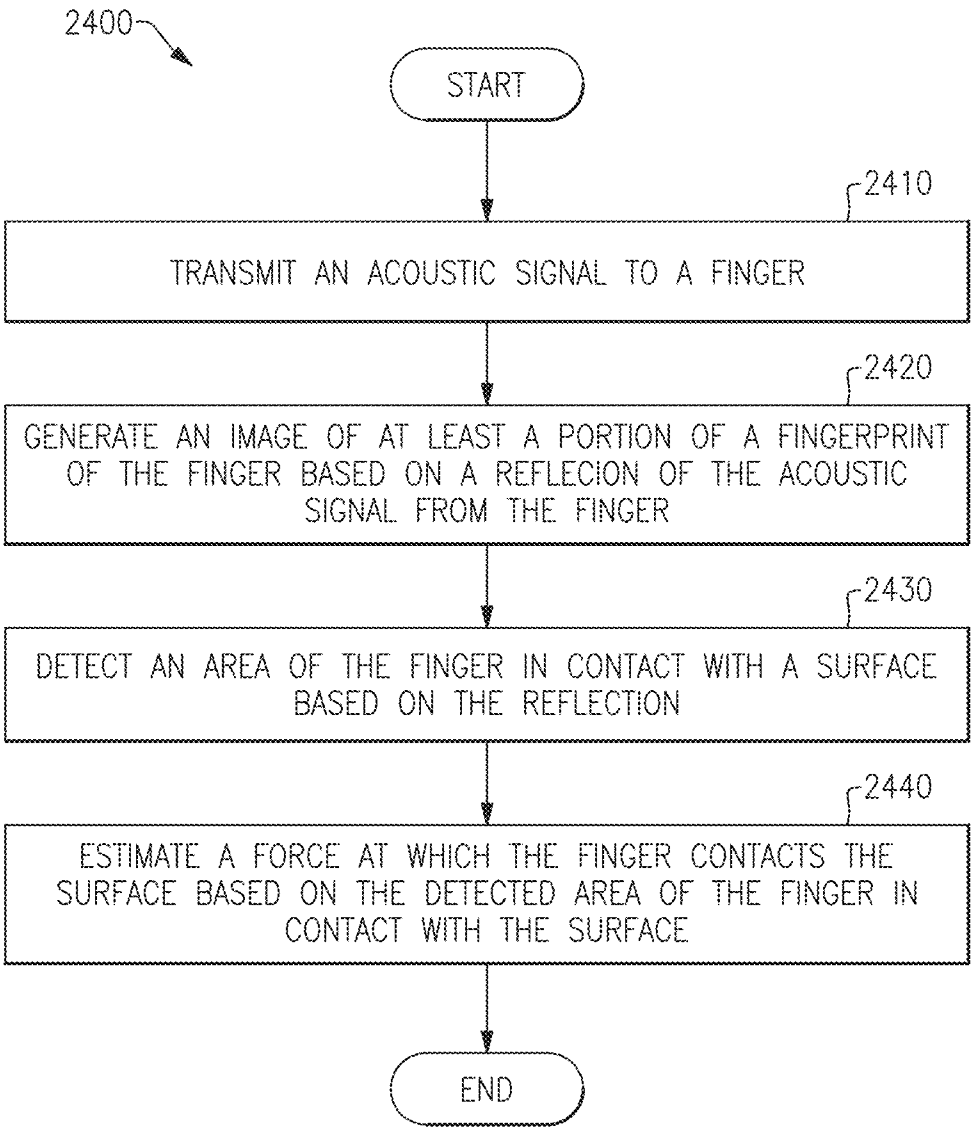
FIG. 24 is a flowchart of a method of estimating a force at which a finger contacts a surface according to an embodiment of the disclosed technology.

FIG. 24 is a flowchart of a method 2400 of estimating a force at which a finger contacts a surface according to an embodiment of the disclosed technology. In block 2410, method 2400 transmits an acoustic signal to a finger. In block 2420, method 2400 generates an image of at least a portion of a fingerprint of the finger based on a reflection of the acoustic signal from the finger. In block 2430, method 2400 detects an area of the finger in contact with a surface based on the reflection. In block 2440, method 2400 estimates a force at which the finger contacts the surface based on the detected area of the finger in contact with the surface.

Figure 25:
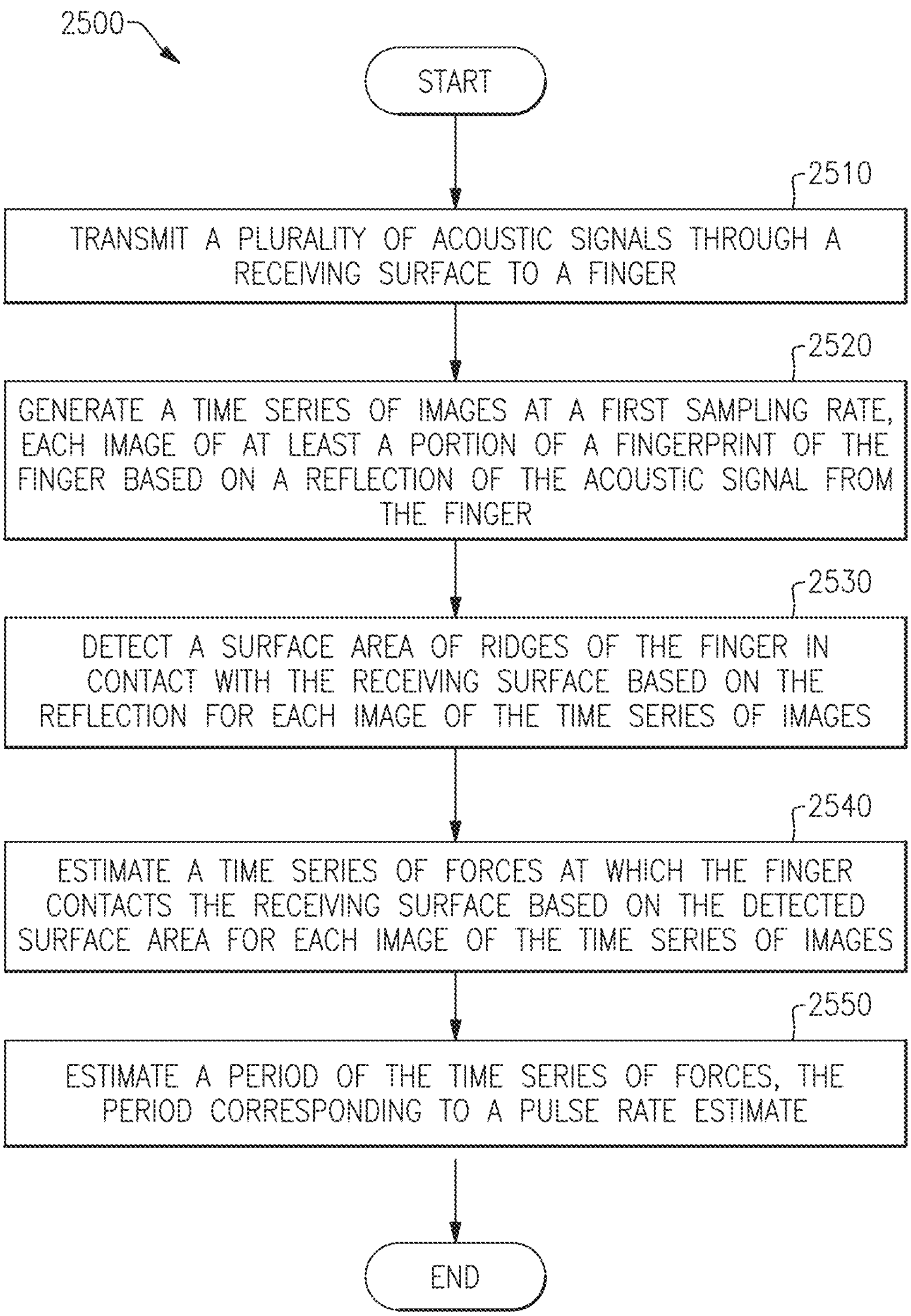
FIG. 25 is a flowchart of a method of estimating period of a time series of force measurements, the period corresponding to a pulse rate estimate, according to an embodiment of the disclosed technology.

FIG. 25 is a flowchart of a method 2500 of estimating period of a time series of force measurements, the period corresponding to a pulse rate estimate, according to an embodiment of the disclosed technology. In block 2510, method 2500 transmits a plurality of acoustic signals through a receiving surface to a finger. In block 2520, method 2500 generates a time series of images at a first sampling rate, each image of at least a portion of a fingerprint of the finger based on a reflection of the acoustic signal from the finger. In block 2520, method 2500 detects a surface area of ridges of the finger in contact with the receiving surface based on the reflection for each image of the time series of images. In block 2530, method 2500 estimates a time series of forces at which the finger contacts the receiving surface based on the detected surface area for each image of the time series of images. In block 2540, method 2500 estimates a period of the time series of forces, the period corresponding to a pulse rate estimate.

FIGS. 26-34 illustrate circuits and results of simulations of sampling and envelope detection methods for ultrasound fingerprint scanning. The simulation assumes an element width of 20 μm, a line spacing (kerf) of 20 μm, an element height of 10 mm, and an ultrasound bandwidth of 43:8%. Excitation is a 5 cycle sinusoid at 150 MHz. Fourteen active elements are used with an effective f #=0.893, where f #is the f-number and is defined as the focal distance divided by the diameter of the active aperture.

Figure 26:
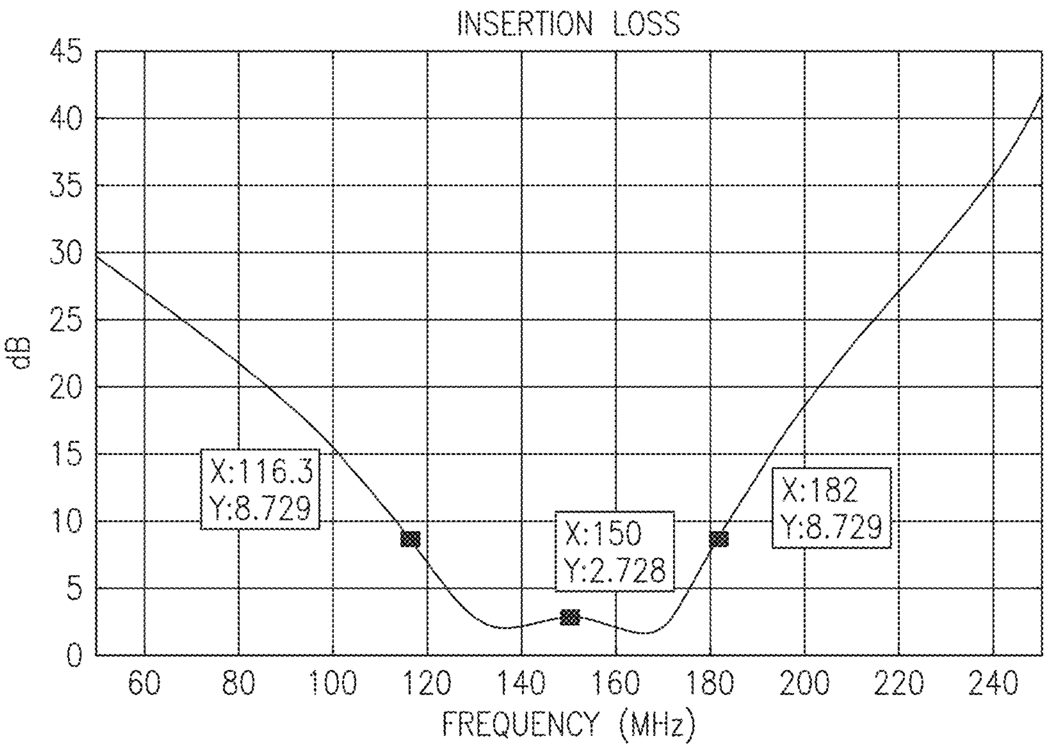
FIGS. 26-34 illustrate circuits and results of simulations of sampling and envelope detection methods for ultrasound finger print scanning.

FIG. 26 illustrates a simulation of the one-way insertion loss.

Figure 27:
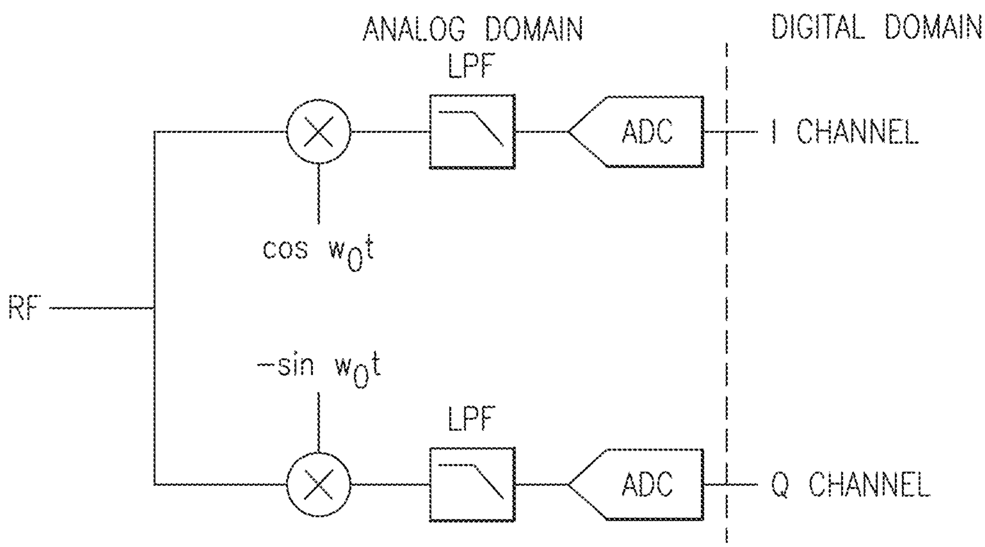

FIG. 27 illustrates a circuit for IQ demodulation of an RF signal into I and Q channels.

Figure 28:
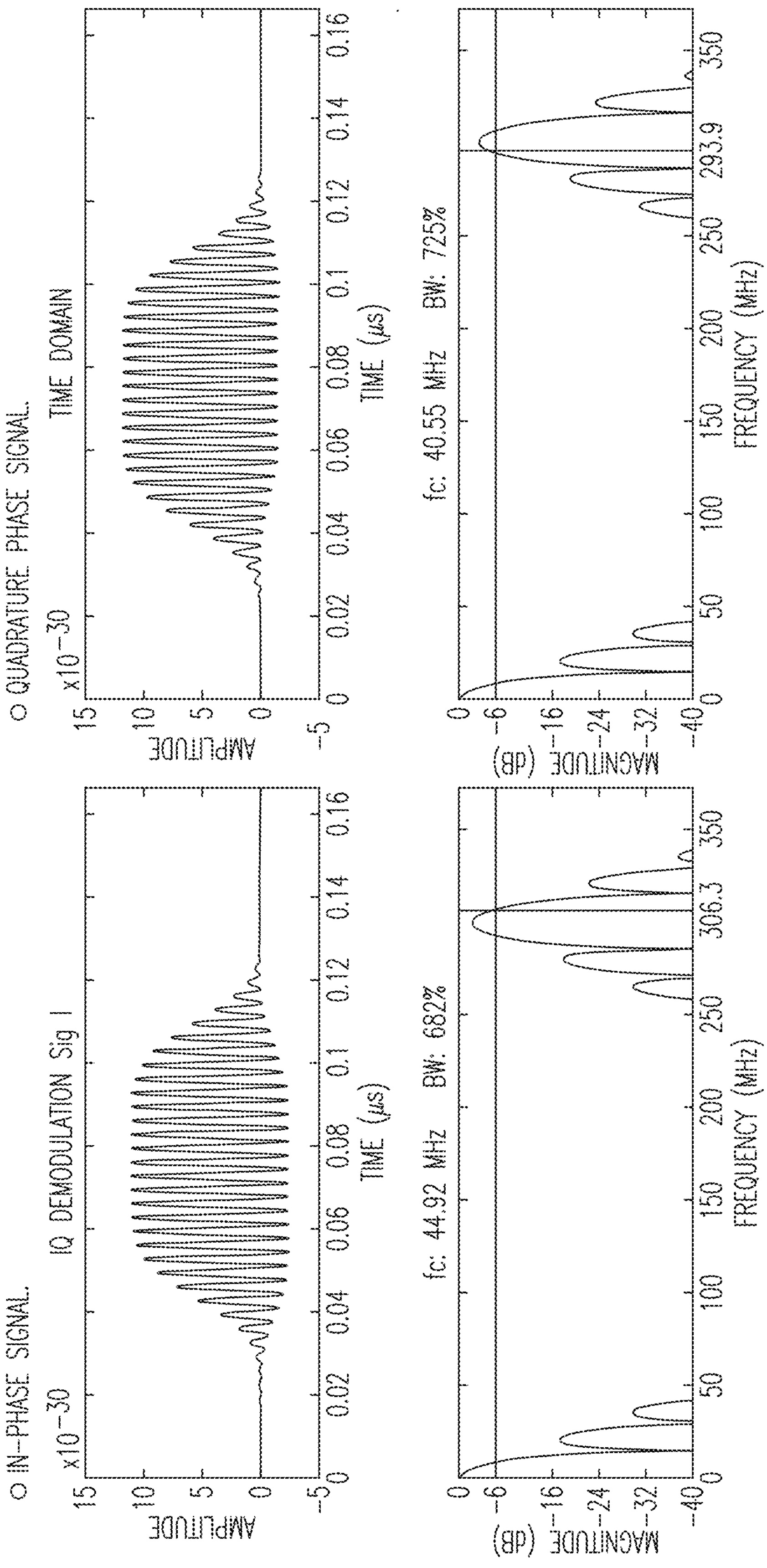

FIG. 28 illustrates an example of the simulated demodulated in-phase and quadrature signals.

Figure 29:
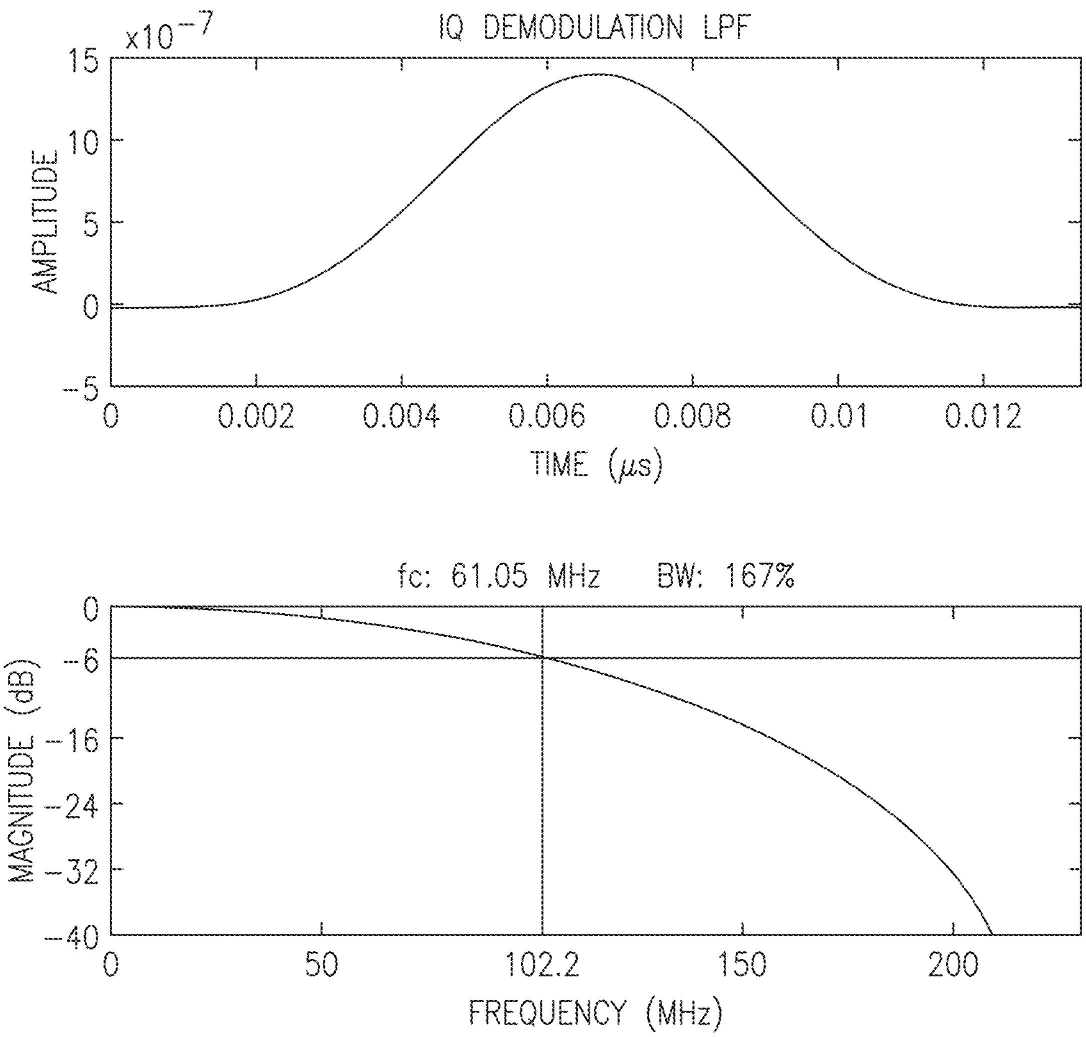

FIG. 29 illustrates the response of the low pass filter used for IQ demodulation for the process of FIG. 27.

Figure 30:
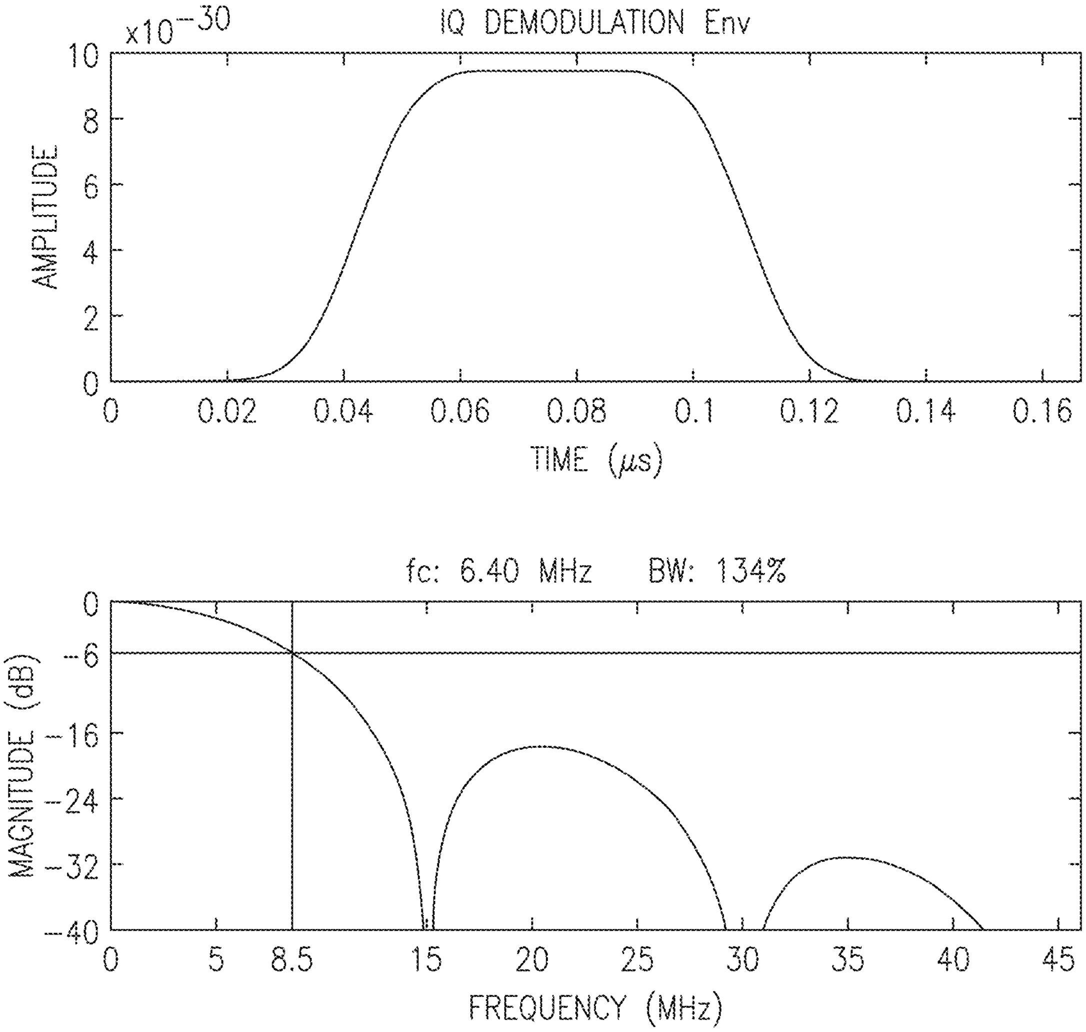

FIG. 30 illustrates an IQ demodulated envelope for a signal demodulated by the circuit of FIG. 27.

Figure 31:
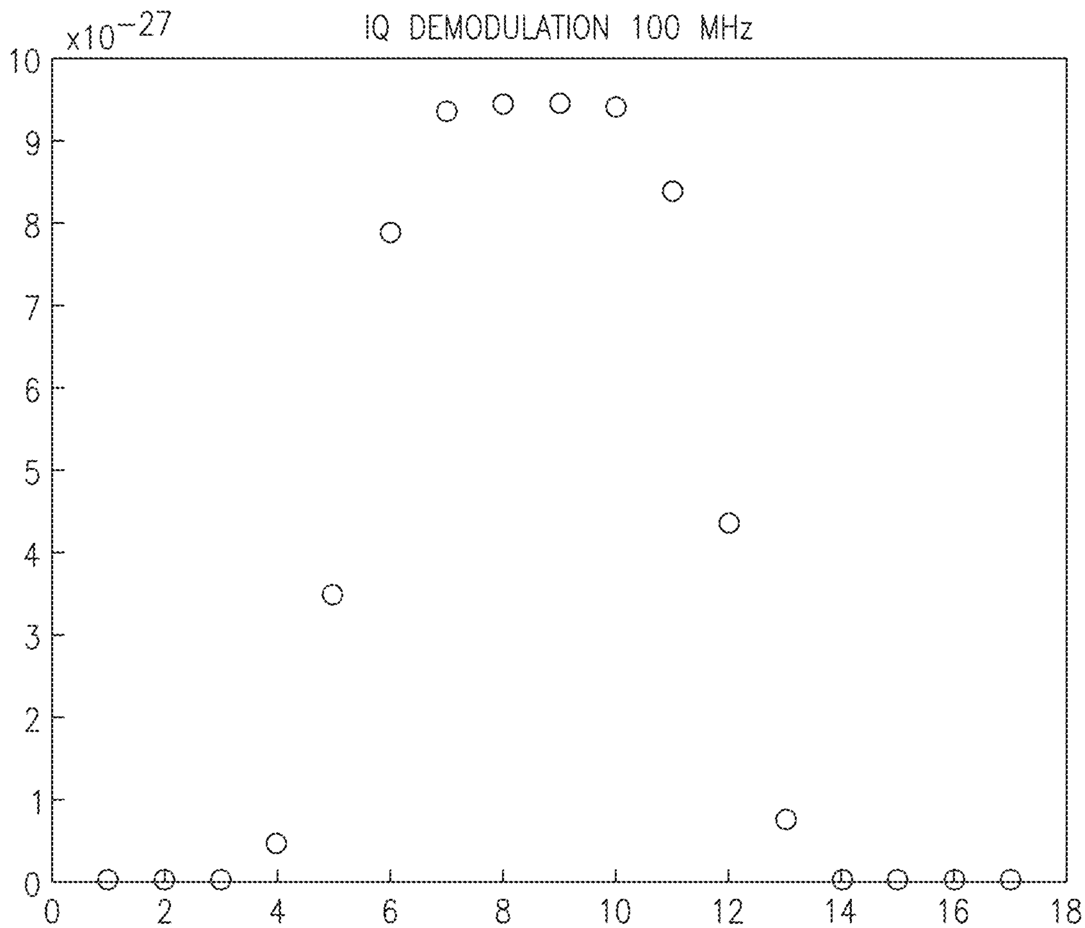

FIG. 31 illustrates 100 MHz samples taken of the IQ demodulated envelope of FIG. 30.

Figure 32:
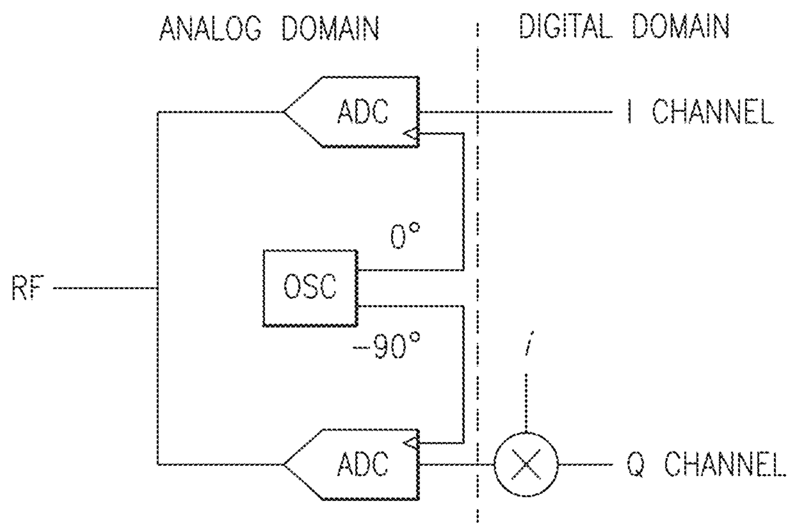

FIG. 32 illustrates a circuit for IQ sampling of an IQ demodulated signal.

Figure 33:
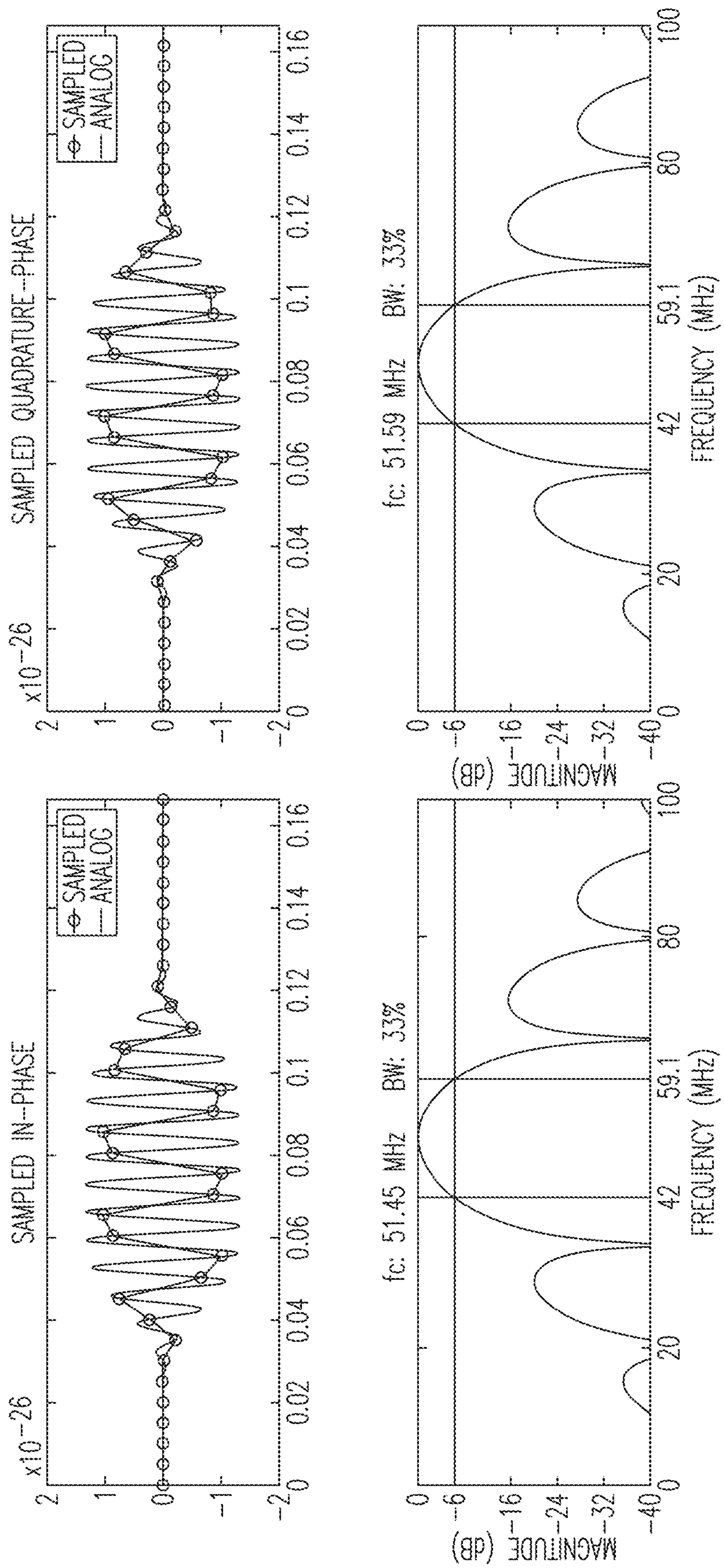

FIG. 33 illustrates sampled in-phase and quadrature signals of an IQ demodulated signal.

Figure 34:
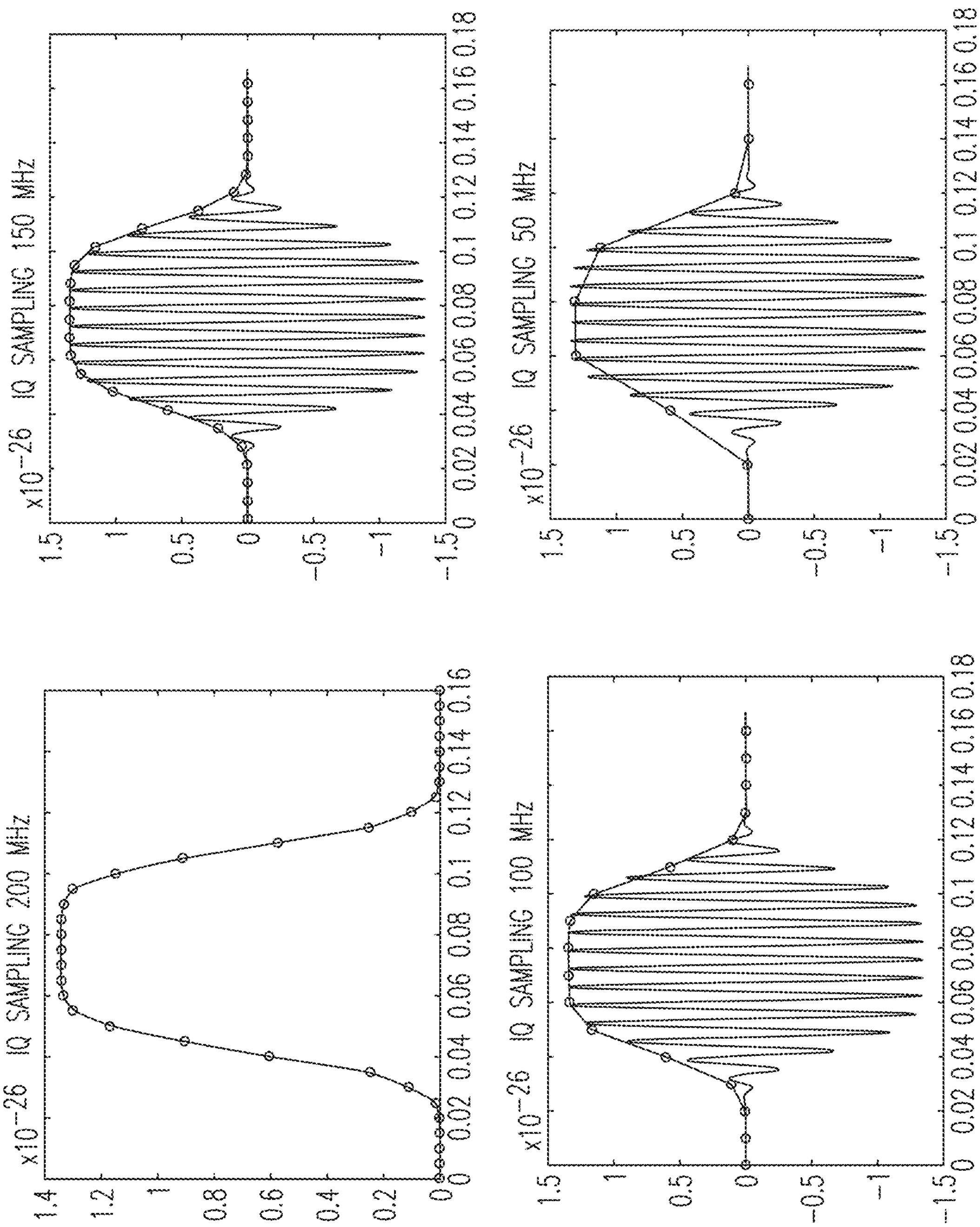

FIG. 34 illustrates graphs of the envelope of an IQ demodulated signal for IQ sampling rates of 200 MHz, 150 MHz, 100 MHz and 50 MHz.

Ultrasonic fingerprint scanners can be included in smart cards. The ultrasonic fingerprint scanners in smart cards can be implemented in accordance with any suitable principles and advantages discussed herein. A smart card can include an ultrasonic fingerprint sensor and/or other circuitry, such as a chip that can be read to authorize payment. Some smart cards can include a magnetic strip, which may be provided on a card body. Including an ultrasonic fingerprint scanner in a smart card can provide an additional factor for authentication. Accordingly, such smart cards can implement multi-factor authentication. As an example, a smart card can authorize a transaction based on authentication with a security chip in the smart card and, separately, using the ultrasonic fingerprint scanner to authenticate a fingerprint. The ultrasonic fingerprint scanner can generate image data with a resolution of at least 500 pixels per inch. A smart card can be a credit card, a debit card, an identification card, an insurance card, or the like.

Smart cards with ultrasonic biometric sensing and associated methods are disclosed. In one aspect, a smart card with a card body and an ultrasonic fingerprint sensing device is configured to transmit an ultrasound signal at a frequency that, together with a sound speed of the material of the card body, provides a resolution of at least 500 pixels per inch. The ultrasonic fingerprint sensing device is configured to generate an image of at least a portion of a fingerprint of a user's finger based on a reflection of the ultrasound signal from the finger. In certain embodiments, the ultrasonic fingerprint sensing device can include a pair of piezoelectric layers separated by a metallic layer.

Figure 35:
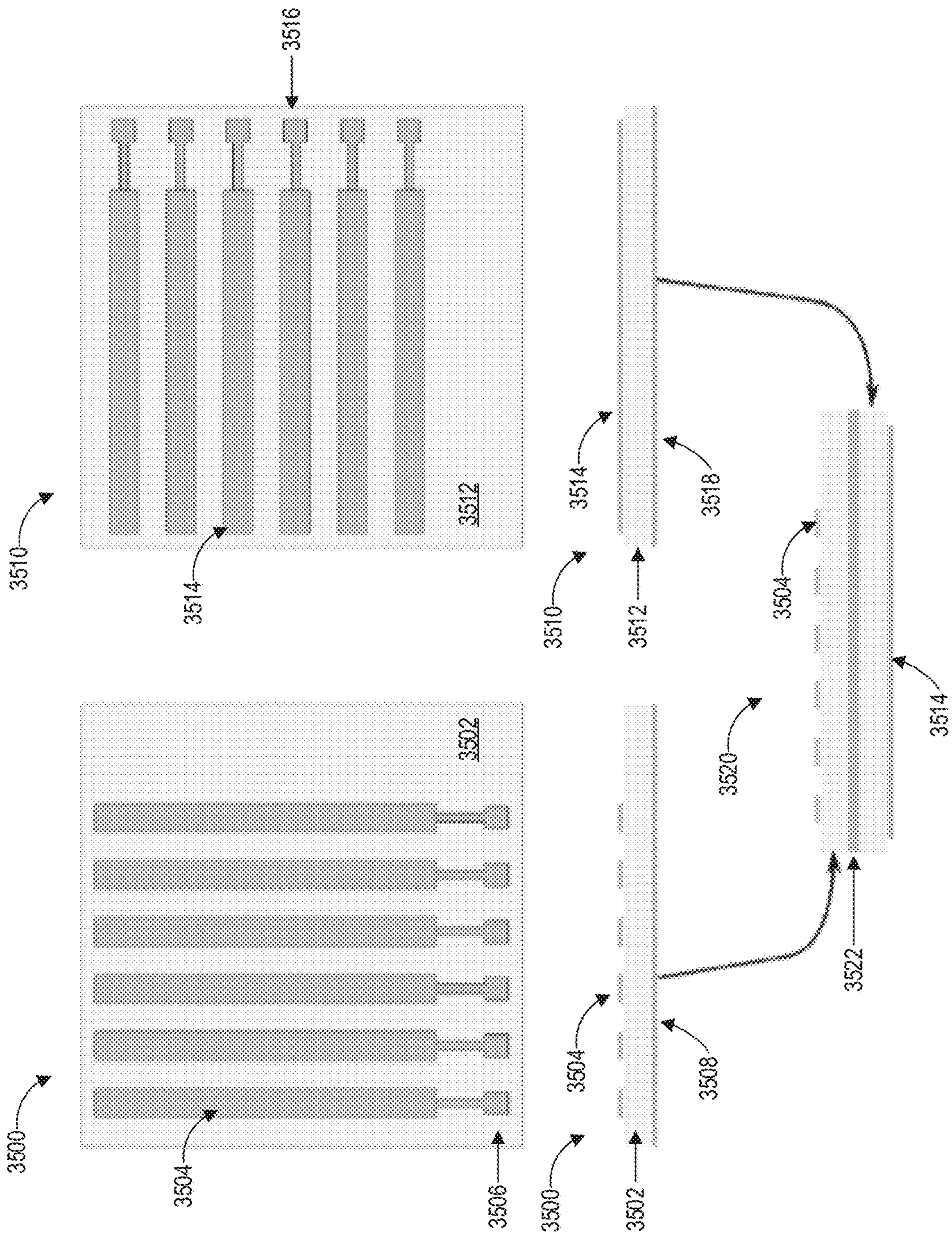
FIG. 35 illustrates a dual-layer row-column addressed transducer array that includes two one-dimensional transducer arrays stacked together.

FIG. 35 illustrates dual-layer row-column addressed transducer array 3520 that includes two one-dimensional transducer arrays 3500, 3510 stacked with each other. The dual-layer row-column addressed transducer arrays 3500, 3510 can be implemented in a smart card. The dual-layer row-column addressed transducer arrays 3500, 3510 can be implemented in any other suitable application. The dual-layer row-column addressed transducer arrays 3500, 3510 can be used to generate image data for a fingerprint. The dual-layer row-column addressed transducer arrays 3500, 3510 can be used to generated image data for a larger portion of a hand, such as several fingerprints, a palm, or a whole hand. A first transducer array 3500 can include piezoelectric layer 3502, column (or row) lines 3504, metallic contacts 3506, and ground layer 3508. Similarly, a second transducer array 3510 can include piezoelectric material 3512, row (or column) lines 3514, metallic contacts 3516, and ground layer 3518. Metallic layer(s) connected to a fixed voltage or any other suitable metallic layer(s) can be implemented in place of ground layers 3508 and/or 3518 in various applications.

Piezoelectric layers 3502, 3512 in arrays 3500, 3510 can include any suitable piezoelectric material. For example, the piezoelectric material 3502, 3512 can be a polymer such as polyvinyl difluoride, polyvinylidene fluoride or polyvinylidene difluoride (sometimes referred to as PVDF). As other examples, the piezoelectric material 3502, 3512 can include other suitable piezoelectric materials, such as zinc oxide, aluminum nitride, lithium niobate, lithium tantalate, bismuth germanium oxide, or lead zirconium titanate and can include thin-film piezoelectric materials.

Metallization lines 3504, 3514 in one-dimensional transducer arrays 3500, 3510 may form row and column lines in the stacked array 3520. The column lines 3504 and the row lines 3514 can be oriented substantially orthogonal to each other. In certain embodiments, the stacked array 3520 can be configured for row-column addressing whereby an entire row of the array or an entire column of the array is addressed at a time. In some other embodiments, the stack array 3502 can address one or more rows or columns of the array when transmitting ultrasonic waves and can address one or more rows or columns, respectively, when receiving ultrasonic waves.

Metallization lines 3504, 3514 can implement electrodes 3506, 3516 in transducer arrays 3500, 3510 and can provide connections between interconnections that fan out from stacked array 3520. In some embodiments, the electrodes 3506, 3516 may be staggered (e.g., extend out from the stacked array 3520 in a staggered manner) to facilitate connections between the electrodes and interconnections.

In certain embodiments, the first transducer array 3500 can be stacked together with the second transducer array 3510 to form dual-layer row-column addressed transducer array 3520 from two one-dimensional arrays. The transducer arrays 3500 and 3510 can be stacked back-to-back, such that the ground planes 3508 and 3518 are in the middle of the dual-layer array 3520 while the metallization lines 3504 and 3514 are on the outside faces of the dual-layer array 3520, as shown in FIG. 35. The metallization lines 3504 and 3514 may be generally perpendicular to each other in the dual-layer array 3520. In certain embodiments, the ground planes 3508 and 3518 may be integrated as a single ground plane 3522. In some other embodiments, the ground planes 3508 and 3518 may be shorted together to provide a common ground plane between the two transducer arrays 3510, 3520. While referred to herein as ground plane 3522, plane 3522 need not be grounded in all embodiments. The plane 3522 can be any suitable metallic plane disposed between the two transducer arrays 3510, 3520 and at any suitable fixed or floating potential.

Dual-layer row-column addressed transducer arrays such as the stacked array 3520 of FIG. 35 differs in various respects from single-layer arrays, such as transducer array 400 of FIG. 4. As an example, receive electrodes in a single-layer array may be grounded for exciting the piezoelectric layer across a full transmission line element (e.g., one of metallization lines 3504 or 3514) during a transmission. Similarly, during receiving operations, the transmission electrodes in the single-layer array may be grounded for proper read out of the return signal. In some embodiments, the piezoelectric layer may be excited across multiple metallization lines and/or multiple metallization lines may be used for receiving the return signal. A switching scheme that switches the transmission and receiving electrodes between ground and transmission and reception circuits can implement such grounding in a single-layer transducer array.

In contrast, a dual-layer transducer array such as array 3520 of FIG. 35 may have a ground plane center layer such as ground plane 3522. As such, any voltage on one of metallization lines 3504 and 3514 may create an electric field to the ground plane 3522 that passes through a piezoelectric layer (e.g., one of layers 3502 or 3512 depending on whether the voltage is on one of lines 3504 or one of lines 3514, respectively) and that excites that piezoelectric layer. Similarly, transmission electrodes need not be grounded during receiving operations, since ground plane 3522 is already provided. Ground plane 3522 can also provide additional benefits, such as reducing RF-feedthrough between the transmission and receiving electrodes, by providing shielding between the transmission and receiving sides of the stacked array 3520. This can facilitate operation without switching electrodes between ground, transmission, and reception circuits.

In operation, dual-layer transducer array 3520 of FIG. 35 may transmit ultrasonic waves using one or more of the metallization lines 3504 (or 3514) and then receive reflections of those ultrasonic waves using one or more of the more of the perpendicular metallization lines 3514 (or 3504). Additionally, the dual-layer transducer array 3520 may focus sound waves and enable transmit and/or receive focusing using the techniques described herein, for example, in connection with at least FIG. 2.

Figure 36:
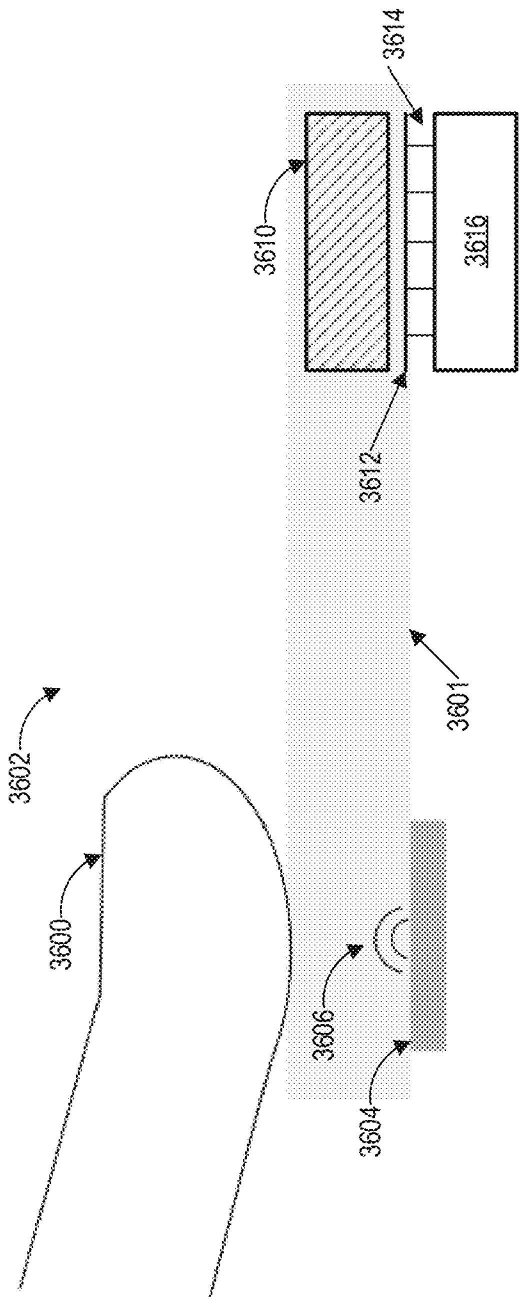
FIG. 36 illustrates a smart card device with a fingerprint scanner mounted on a surface of the smart card device.
Figure 37A:
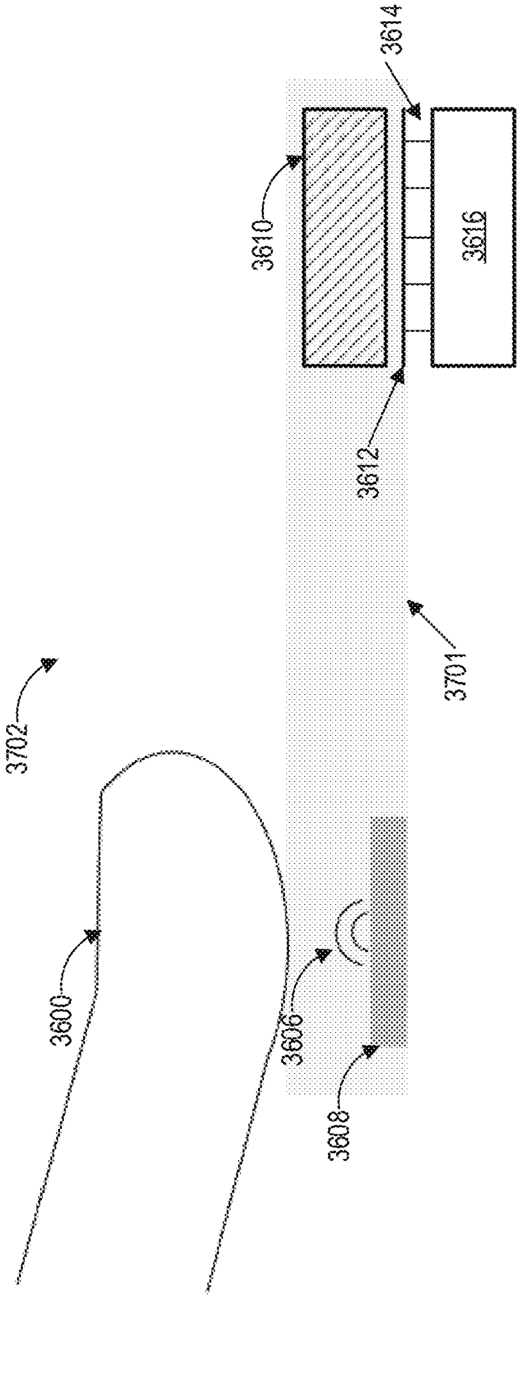
FIGS. 37A and 37B illustrate a smart card device with a fingerprint scanner embedded in the smart card device.
Figure 37B:
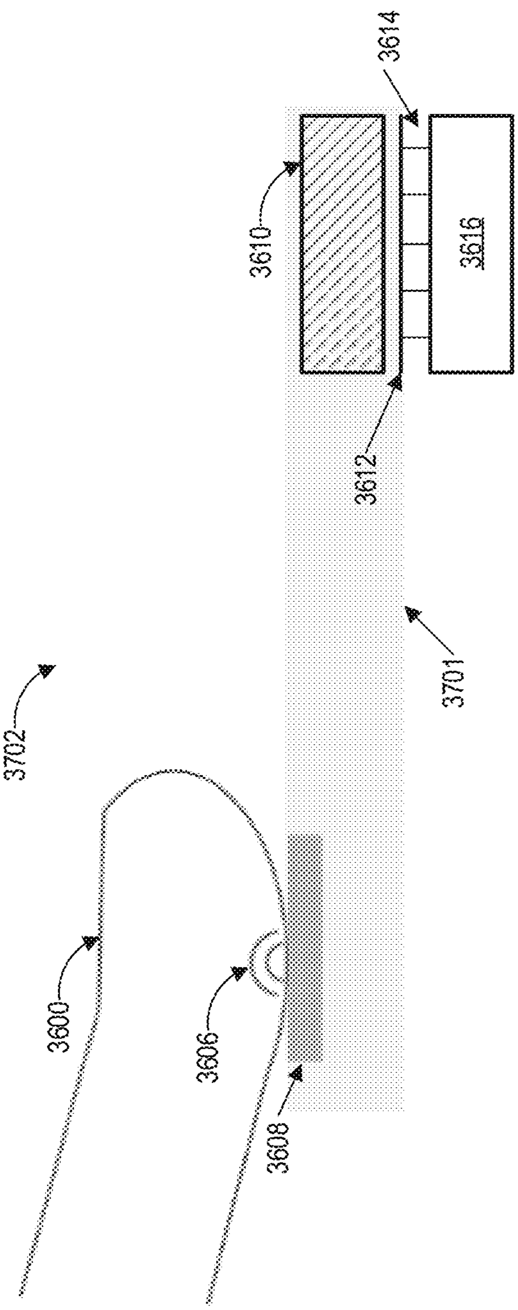

As shown in FIGS. 36, 37A, and 37B, a smart card 3602 may be provided with an ultrasonic fingerprint scanner 3604 or 3608. The ultrasonic fingerprint scanner 3604 and/or 3608 can be implemented in accordance with any suitable principles and advantages discussed with reference to FIG. 35. Smart card 3602 may be any suitable card and, in general, can be a card used for payment purposes and/or for other purposes. As examples, smart card 3602 may be a credit card, a debit card, a membership card, a rewards card, an identification card, a security card, a clearance card, a security card, an access card, a medical card, an insurance card, etc. Smart card 3602 includes a card body 3601. The card body 3601 can have a size suitable to fit in a wallet. The smart card 3602 can have a thickness in a range from 400 μm to 1000 μm. For example, the smart card 3602 can have a thickness of about 760 μm. The smart card 3602 can be approximately 85.60 mm by 53.98 mm. The smart card 3602 can have rounded corners in certain instances.

The ultrasonic fingerprint scanner in the smart card 3602 may be used to authenticate users presenting the smart card 3602 for authentication. The fingerprint scanner 3604 or 3608 may serve to make it less likely that a card could be used by an unauthorized person. As an example, a user may desire to purchase goods using a smart card 3602 and a payment system may be configured to authorize the purchase only upon contemporaneous detection of the user's fingerprint using the fingerprint scanner 3604.

In certain embodiments, smart card 3602 may include circuitry 3610 that assists in the detection of the user's fingerprint, stores the user's fingerprint (in a secure manner), otherwise assists in the operation of the smart card 3602 and/or the fingerprint scanners, the like, or any suitable combination thereof. The circuitry 3610 may include a power source such as a photovoltaic cell, a battery, a capacitor, an RF harvesting circuit, etc. in certain instances.

In various embodiments, the smart card 3602 may include one or more contacts 3612 that connect with an external device 3616 over one or more electrical paths 3614. As an example, contacts 3612 may engage with a card reader 3616 when smart card 3602 is inserted into the card reader 3616. In such embodiments, signals may be routed between the card reader 3616 and the fingerprint scanner 3604 or 3608 and/or the circuitry 3610. These signals can include power signals for powering the fingerprint scanner 3604 or 3608 and/or the circuitry 3610 and can include fingerprint scans (e.g., where the user's fingerprint is stored remotely), verification results (e.g., where the user's fingerprint is stored locally on the smart card 3602). In some embodiments, some or all of the transmission and readout circuitry for fingerprint scanner 3604 or 3608 may be omitted from the card 3602 and provided within external circuitry 3616. This can reduce the cost and complexity of the smart card 3602.

In some other embodiments, the smart card 3602 may include wireless communication circuitry (including an antenna) in the circuitry 3610 and may convey data associated with scans of the user's fingerprint and/or fingerprint verification results wirelessly to external circuitry such as card reader 3616. As examples, the circuits 3610 may transmit signals using near-field frequencies or other radio frequency signals.

In the example illustrated in FIG. 36, an ultrasonic fingerprint scanner 3604 can be provided on surface of the smart card 3602. While FIG. 36 illustrates scanner 3604 disposed on an opposite side of the smart card 3602 as the side that receives user's finger 3600 (and thus having ultrasonic waves 3606 pass through card 3602), this is merely illustrative. In some other embodiments, the user's finger 3600 may be received directly by scanner 3604.

As illustrated in FIGS. 37A and 37B, the scanner 3608 can be embedded within a card body 3701 of the smart card 3702. The scanner 3608 can be flush with a surface opposite to a surface that receives the user's finger 3600 as in FIG. 37A and ultrasonic waves 3706 may be transmitted by scanner 3608 through the smart card 3702 and ultrasonic reflections may similarly travel through the card body 3701 of the smart card 3702. In some other embodiments, the scanner 3608 can be embedded flush with a surface that receives the user's finger 3600 as in FIG. 37B (such that no ultrasonic waves have to travel through the smart card 3702 when detecting the user's fingerprint). In various embodiments, the scanner 3608 can be embedded within the volume of smart card 3702 (e.g., not flush with any surface of the smart card 3702) and can be completely or nearly completely surrounded by the material forming the card body 3701. The scanner 3608 may be formed materials similar to those that form card body 3701 or may be formed from different materials.

As previously noted and in some embodiments such as those illustrated in FIG. 37B, the scanner 3608 can be embedded flush with a surface that receives the user's finger 3600. In those and other embodiments, the scanner 3608 may be formed from a piezoelectric material such as a zinc oxide (ZnO) thin film, may be formed from fused quartz, glass, another glass-like material, or other desired materials. In such embodiments, the scanner 3608 may be covered by glass or metal or another suitable material that lies flush with the top side of the card body 3701. In other words, there may be a glass or metal layer formed on the scanner 3608 and flush with the card body 3701 and the user's finger may be received by that glass or metal layer. In some embodiments, the card body 3701 may be flexible, while in other embodiments the card body 3701 may be rigid.

The smart cards 3602 and 3702 and, in particular, the card bodies 3601 and 3701, may be formed from one or more materials that provide suitable properties for ultrasonic signal propagation. As an example, it may be desirable to provide fingerprint scanners 3604 or 3608 configured to generate image data having a desired resolution (e.g., 50 micrometers). As examples, the card bodies 3601 and 3701 may be formed from one or more plastics, one or more metals, Nylon, polyvinyl chloride (PVC), Mylar, Glass, Aluminum, other materials, or combinations or these and other materials.

The resolution of an image generated using the fingerprint sensors may be proportional to the speed of sound within the material forming the card body 3601 (or body 3701) and inversely proportional to the operating frequency. It may also be desirable to operate at relatively lower frequencies, as more complex sampling circuits and additional numbers of transducers can be desired for relatively higher frequencies. There may also be less attenuation of ultrasonic waves passing through card body 3601, 3701 for relatively lower frequencies. As an example, if the card body 3601 is 700 micrometers thick and formed from Nylon, obtaining a given resolution at 25 MHz can involve 22 receive elements, while at 50 MHz the number of receive elements to obtain the same resolution may double to 44 receive elements. In certain embodiments, the smart card fingerprint sensing systems discussed herein can achieve a scan resolution of 500 pixels per inch (PPI) to meet Federal Bureau of Investigation (FBI) and/or other standards. Such a resolution can translate to a lateral resolution of 50 micrometers.

Table 1 below provides an approximate resolution (in micrometers) for different materials that can form the card body 3601 and for different operating frequencies, for cards having an approximate thickness of 760 μm. Such a thickness compares similarly to the typical thicknesses of credit cards and similar cards.

TABLE 1

Approximate scanning resolution in units of for different materials at different ultrasound frequencies.

| Material | Speed of Sound (m/s) | At 12 MHz (μm) | At 25 MHz (μm) | At 50 MHz (μm) | At 100 MHz (μm) | At 150 MHz (μm) | At 200 MHz (μm) |
|---|---|---|---|---|---|---|---|
| Nylon | 1150 | 92 | 46 | 23 | 12 | 8 | 5 |
| PVC | 2400 | 192 | 96 | 48 | 24 | 16 | 12 |
| Mylar | 2500 | 200 | 100 | 50 | 25 | 17 | 12 |
| Gold | 3200 | 256 | 128 | 64 | 32 | 21 | 16 |
| Glass | 6000 | 480 | 240 | 120 | 60 | 40 | 30 |
| Aluminum | 6400 | 512 | 256 | 128 | 64 | 43 | 32 |
| Sapphire | 11000 | 880 | 440 | 220 | 110 | 73 | 55 |

As illustrated by Table 1, the scanning resolution of smart card ultrasonic fingerprint systems can depend upon a combination of the card body material and the operating frequency of the ultrasonic fingerprinting system. As an example, a smart card ultrasonic fingerprint system can provide a resolution of 500 pixels per inch (PPI) with a nylon card body and a scanner operating at about 25 MHz (or higher). As other examples, the system could provide a 500 PPI resolution with a PVC card body and a scanner operating at about 50 MHz (or higher), with a Mylar card body and a scanner operating at about 50 MHz (or higher), with a glass card body and a scanner operating at about 150 MHz (or higher), or with an Aluminum card body and a scanner operating at about 150 MHz (or higher). A 500 PPI resolution may correspond to a scanning resolution of approximately 50 μm. As such, the minimum operating frequency associated with a 500 PPI resolution, for the various materials listed in Table 1, may be between the data points of Table 1.

The scanning resolution of smart card ultrasonic fingerprint systems may be dependent on both the main-lobe size and the size of the side-lobes. The main-lobe may be measured as the full width at half maximum (FWHM), which can be estimated by the following equation:

$$FWHM \approx \frac{w}{d}\lambda = F_{\#}\lambda$$

In this equation, w is the width of the active aperture, d is the thickness of the smart card, λ is the wavelength at the operating frequency (e.g., the wavelength of the ultrasonic waves), and $F_{\#}$ is the f-number. The f-number may be defined as the focal distance divided by the diameter of the active aperture. The influence of the side-lobes can be estimated using the cystic resolution. However, the scanning resolution is often well approximated by the FWHM alone. The active aperture can be selected to be relatively large to achieve good focusing and an f-number around or a little below 1. For simplicity, it may be reasonable to assume $F_{\#}$ is 1 and then simplify the preceding equation such that the resolution is approximately equal to the wavelength.

The wavelength may then be estimated by the following equation:

$$FWHM \approx \lambda = \frac{c}{f}$$

In this equation, c is the speed of sound in the card body material and f is the center frequency of the ultrasonic wave. Examples of scanning resolutions for different materials at different ultrasonic frequencies are shown above in Table 1. As shown in Table 1 and the preceding equation, materials having a higher speed of sound generally result in higher scanning resolutions.

The scanning resolution of smart card ultrasonic fingerprint systems may be based on the point spread function (PSF). This metric takes both the detail resolution, measured by the PSF width at half the maximum amplitude, and the contrast resolution, measured by the cystic resolution (CR). The PSF and FWHM are shown and explained in FIGS. 38, 39A, and 39B.

Figure 38:
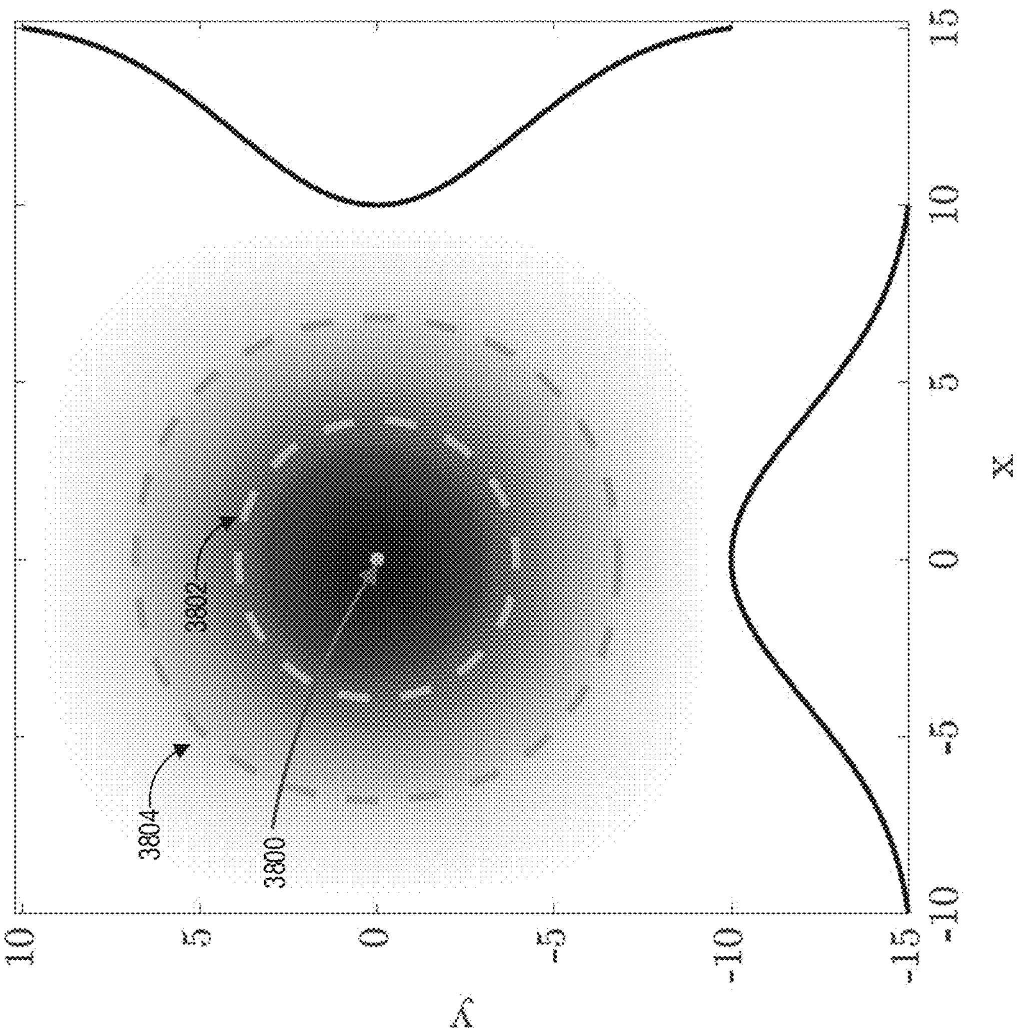
FIG. 38 is a graph of a reflected ultrasonic signal showing a point spread function and the full-width at half maximum of the signal.

As shown in FIG. 38, an ultrasonic system imaging a reflective point 3800 may receive reflected ultrasonic signals that are highest at the reflective point 3800, but that taper off with increased distance (in the x and y axis). In other words, a point source fails to produce an infinitely sharp signal. The fall-off of the reflected signal is referred to as a point spread function (PSF). As shown in FIG. 38, the signal maintains half its maximum strength inside area 3802 and is measurable in area 3804. Twice the distance from point 3800 to the edge of area 3802 may be referred to as the full-width at half the maximum amplitude (FWHM) or the PSF width at half the maximum amplitude. In other words, the diameter of area 3802 may be the FWHM of the reflected signal.

Figure 39A:
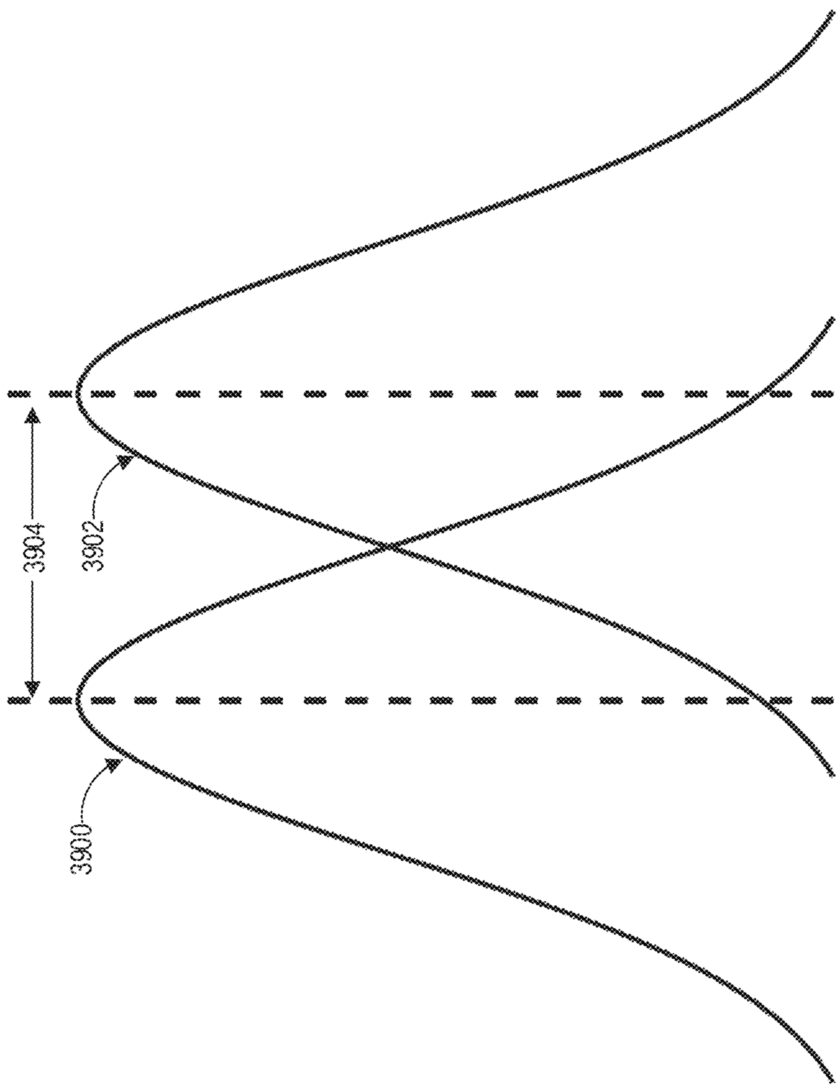
FIG. 39A illustrates how the width of the point spread function of a reflected ultrasonic signal relates to how closely two objects can be while still being separately resolvable.
Figure 39B:
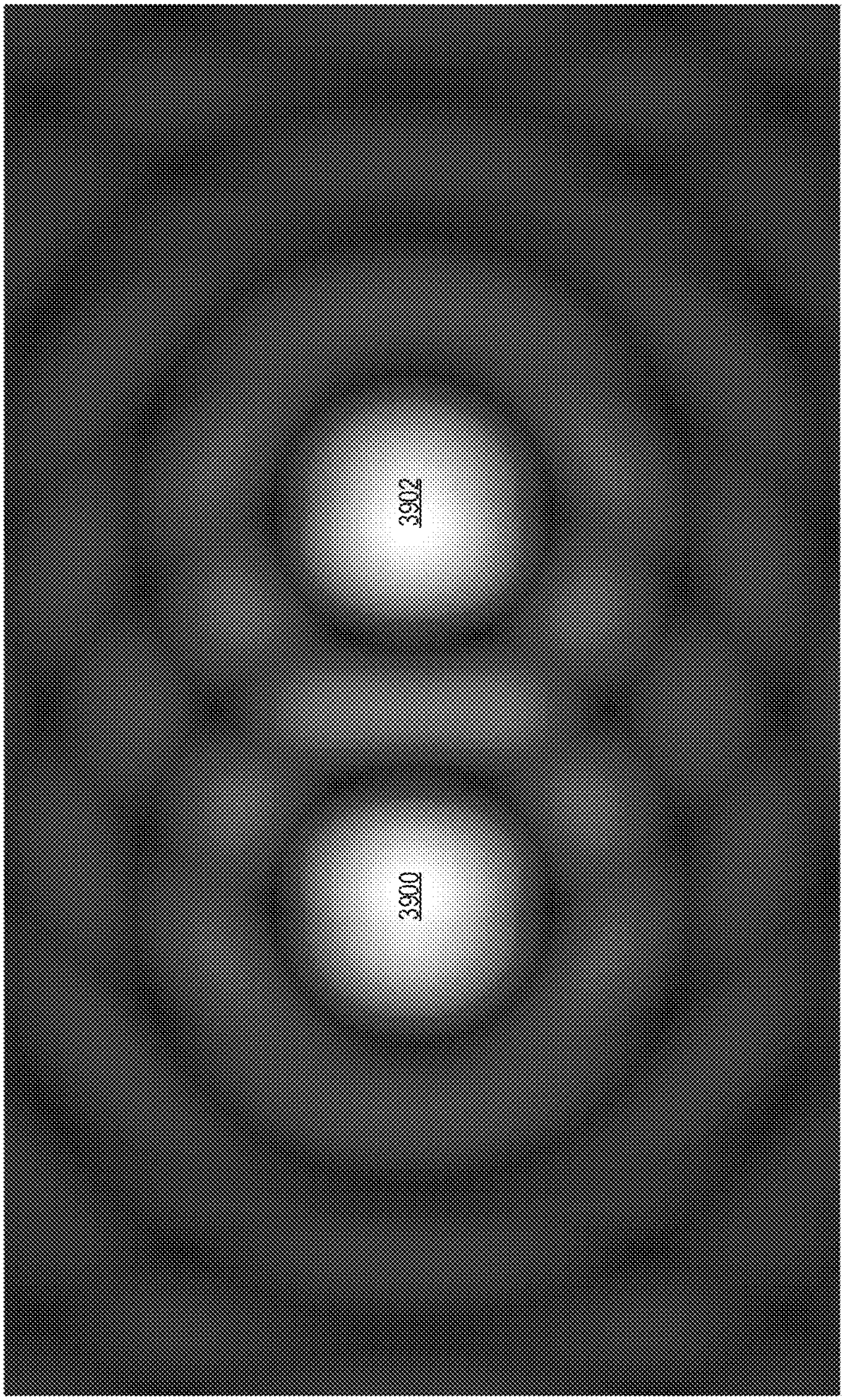
FIG. 39B illustrates reflected ultrasonic signals from two closely-spaced objects.

As shown in FIGS. 39A and 39B, the width of the PSF (or the FWHM) determines how closely (as shown by distance 3904) two small objects 3900 and 3902 can be placed to each other and still be separately resolved. In FIG. 39B, objects 3900 and 3902 are far enough apart to be separately resolvable, but are beginning to merge creating various imaging artifacts.

Cystic resolution of an ultrasonic fingerprint system is a measure of the ability to detect an anechoic, or non-reflective, region in a uniformly scattering medium. Specifically, the cystic resolution gives the relative intensity (RI) at the center of an anechoic cyst of a given size relative to its surrounding uniformly back-scattering medium. The lower the intensity at the center of the cyst, i.e. the darker it appears in the image for a given cyst size, the better the contrast of the system.

Figure 40:
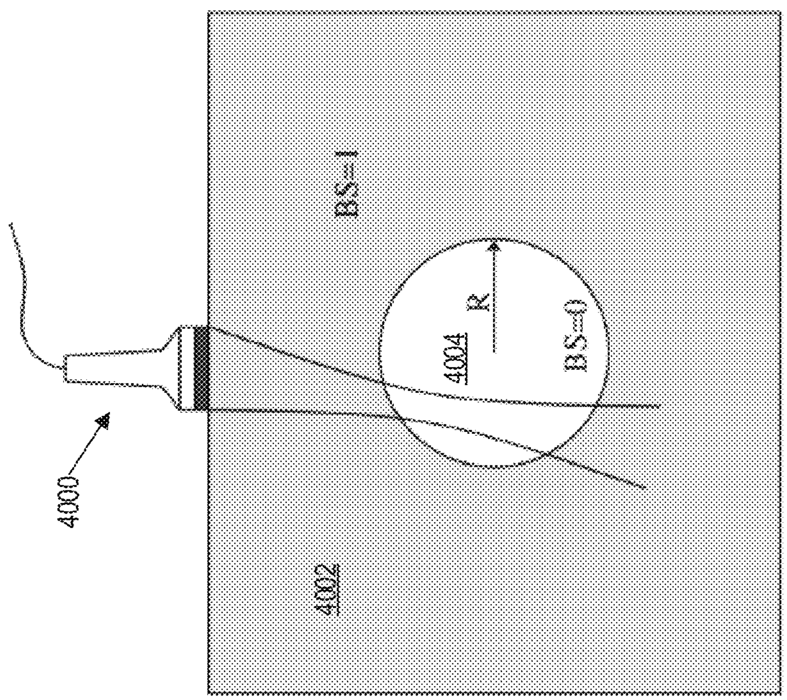
FIG. 40 illustrates ultrasonic images of an anechoic, or non-reflective, region within a uniform medium.

FIG. 40 illustrates ultrasonic device 4000 imaging a uniformly back-scattering medium 4002 that includes an anechoic, or non-reflective, region 4004.

The relative intensity (RI), of the anechoic cyst can be estimated by the clutter energy to total energy ratio, given by the following equation:

$$RI(R) = \sqrt{\frac{E_{out}(R)}{E_{tot}}} = \sqrt{1 - \frac{E_{in}(R)}{E_{tot}}}$$

In this equation, $E_{in}$ is the signal energy inside a circular region with radius, R, centered on the peak of the point spread function and where $E_{tot}$ is the total energy in the point spread function.

If the intensity of the surrounding medium is normalized to have the value 1, then the cyst may be detectable if it has an RI of 0.5. The radius of the anechoic region that results in an RI of 0.5 may be referred to as the 'R0.5' and the equivalent diameter may be referred to as the D0.5. The radius and diameter of the smallest anechoic region that is resolvable may be dependent on the side-lobes in the PSF.

Figure 41:
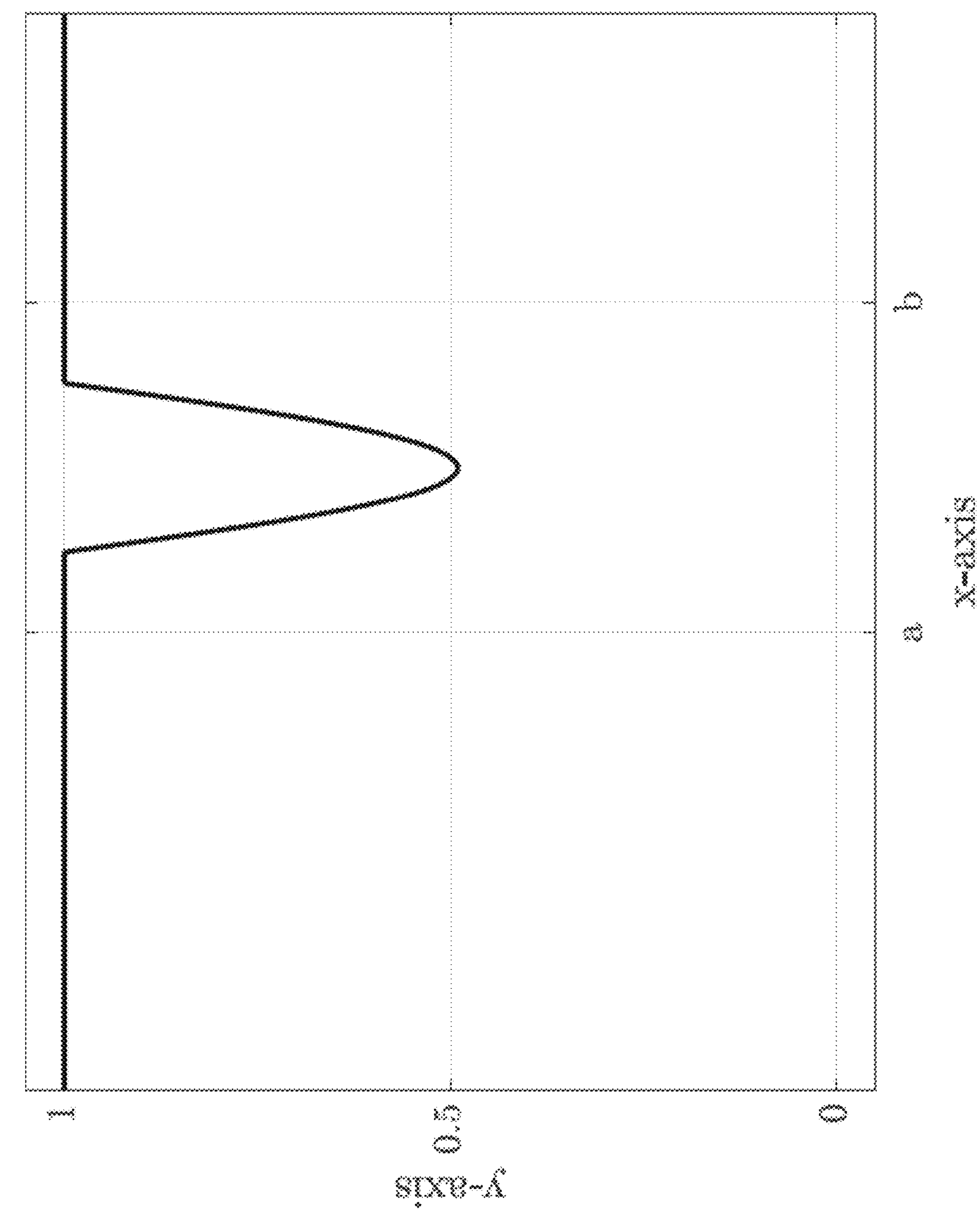
FIG. 41 is a graph of reflected ultrasonic signals of a region with little or no signal surrounded by strongly reflecting regions.

FIG. 41 shows a graph of reflected ultrasonic signals of a region with little or no signal surrounded by strongly reflecting regions. For a fingerprint scanner, it may be important to resolve regions with little or no signal surrounded by regions with strong signals (e.g., a non-reflective region surrounded by highly-reflective regions). This may be referred to as the contrast-width of the fingerprint scanner. The contrast-width may be the smallest distance between two strongly reflecting regions with an intervening weakly-reflecting region which at the center has a signal amplitude of no more than half (e.g., 0.5) of the amplitude at the strongly-reflecting regions. This contrast-width may be equivalent to the D0.5 previously discussed.

The resolution of a given imaging fingerprint scanner may be the lowest (e.g., worst) of the FWHM resolution and the contrast-width resolution.

Some of the embodiments described above have provided examples in connection with ultrasound-based fingerprint sensors. However, the principles and advantages of the embodiments can be used for any other suitable devices, systems, apparatuses, and/or methods that could benefit from such principles and advantages. Although described in the context of fingerprints, one or more features described herein can also be utilized in detecting any other suitable part of a human or animal.

The various features and processes described herein may be implemented independently of one another, or may be combined in various ways. All possible combinations and sub combinations are intended to fall within the scope of this disclosure. In addition, certain methods or process blocks may be omitted in some implementations. The methods and processes disclosed herein are also not limited to any particular sequence, and the blocks or states relating thereto can be performed in any other sequences that are appropriate. For example, described blocks or states may be performed in an order other than that specifically disclosed, or multiple blocks or states may be combined in a single block or state. The example blocks or states may be performed in serial, in parallel, or in some other manner as appropriate. Blocks or states may be added to or removed from the disclosed example embodiments as suitable. The example systems and components described herein may be configured differently than described. For example, elements may be added to, removed from, or rearranged compared to the disclosed example embodiments. Various embodiments can apply different techniques for fabricating different types of electronic devices.

Aspects of this disclosure can be implemented in various devices. For example, the acoustic biometric sensing devices discussed herein can be implemented in a mobile phone such as a smart phone, a tablet computer, a steering wheel, a gun, a door, a door handle, a wall, an elevator, or any other suitable application that could benefit from any of the principles and advantages discussed herein.

While certain embodiments have been described, these embodiments have been presented by way of example only, and are not intended to limit the scope of the disclosure. Indeed, the novel devices, systems, apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments.

What is claimed is:

1. A smart card with ultrasonic biometric sensing, the smart card comprising:
- a card body; and
- an acoustic biometric sensing device integrated with the card body, the acoustic biometric sensing device comprising:
  - a first array of ultrasonic transducers configured to transmit an ultrasound signal;
  - a second array of ultrasonic transducers configured to receive a reflection of the ultrasound signal, the second array of ultrasonic transducers being stacked with the first array of ultrasonic transducers; and
  - a metallic conductive layer positioned between the first array of ultrasonic transducers and the second array of ultrasonic transducers, wherein the metallic conductive layer is configured to provide shielding between the first array of ultrasonic transducers and the second array of transducers,
- wherein the first array of ultrasonic transducers comprises a first piezoelectric layer and first metal lines on a side of the first piezoelectric layer that is opposite to the metallic conductive layer; and
- wherein the second array of ultrasonic transducers comprises a second piezoelectric layer and second metal lines on a side of the second piezoelectric layer that is opposite to the metallic conductive layer.

2. The smart card of claim 1, wherein the first array of ultrasonic transducers comprises a polymer piezoelectric layer.

3. The smart card of claim 1, further comprising a security chip configured to authenticate the smart card, wherein the smart card is configured to output information associated with (a) a biometric image and (b) the security chip.

4. The smart card of claim 1, wherein the card body has rounded corners, the card body is approximately 85.60 millimeters by 53.98 millimeters, and the card body has a thickness of about 0.76 millimeters.

5. The smart card of claim 1, wherein the acoustic biometric sensing device is flush with a surface of the card body.

6. The smart card of claim 1, wherein the acoustic biometric sensing device is at least partly embedded within the card body.

7. The smart card of claim 1, wherein the card body is formed primarily of at least one material selected from a group consisting of nylon, polyvinyl chloride (PVC), mylar, and combinations thereof.

8. A smart card with ultrasonic biometric sensing, the smart card comprising:
- a card body; and
- an acoustic biometric sensing device integrated with the card body, the acoustic biometric sensing device comprising:
  - a first array of ultrasonic transducers configured to transmit an ultrasound signal, wherein the ultrasound signal has a frequency in a range from about 12.5 megahertz to about 100 megahertz;

a second array of ultrasonic transducers configured to receive a reflection of the ultrasound signal, the second array of ultrasonic transducers being stacked with the first array of ultrasonic transducers; and a metallic conductive layer positioned between the first array of ultrasonic transducers and the second array of ultrasonic transducers, wherein the metallic conductive layer is configured to provide shielding between the first array of ultrasonic transducers and the second array of transducers.

9. The smart card of claim 8, wherein:

the first array of ultrasonic transducers comprises a first piezoelectric layer and first metal lines on a side of the first piezoelectric layer that is opposite to the metallic conductive layer; and the second array of ultrasonic transducers comprises a second piezoelectric layer and second metal lines on a side of the second piezoelectric layer that is opposite to the metallic conductive layer.

10. An acoustic sensing device comprising:

a first array of ultrasonic transducers configured to transmit an ultrasound signal;

a second array of ultrasonic transducers configured to receive a reflection of the ultrasound signal, the second array of ultrasonic transducers being stacked with the first array of ultrasonic transducers; and a metallic conductive layer positioned between the first array of ultrasonic transducers and the second array of ultrasonic transducers, wherein the metallic conductive layer is configured to provide shielding between the first array of ultrasonic transducers and the second array of transducers, wherein the first array of ultrasonic transducers comprises a first piezoelectric layer and first metal lines on a side of the first piezoelectric layer that is opposite to the metallic conductive layer; and wherein the second array of ultrasonic transducers comprises a second piezoelectric layer and second metal lines on a side of the second piezoelectric layer that is opposite to the metallic conductive layer.

11. The acoustic sensing device of claim 10, wherein the first array of ultrasonic transducers comprises a polymer piezoelectric layer.

12. The acoustic sensing device of claim 10, wherein the first array of ultrasonic transducers comprises a polyvinylidene difluoride piezoelectric layer.

13. The acoustic sensing device of claim 10, wherein the ultrasound signal has a frequency in a range from about 12.5 megahertz to about 100 megahertz.

14. The acoustic sensing device of claim 10, wherein the acoustic sensing device is configured to perform at least one of transmit focusing or receive focusing.

15. The acoustic sensing device of claim 10, wherein the ultrasound signal has a frequency in a range from about 12.5 megahertz to about 50 megahertz.

16. A method of authentication using a smart card, the method comprising:

transmitting, with a first array of ultrasonic transducers of the smart card, an ultrasound signal to an object;

receiving, with a second array of ultrasonic transducers of the smart card, a reflection of the ultrasound signal, wherein the first array of ultrasonic transducers and the second array of ultrasonic transducers are stacked with each other and included in an acoustic biometric sensing device that is integrated with a card body of the smart card, and wherein a metallic conductive layer provides shielding between the first array of ultrasonic transducers and the second array of ultrasonic transducers;

generating image data based on the reflection of the ultrasound signal; and authenticating the object based on the image data.

17. The method of claim 16, wherein the first array of ultrasonic transducers comprises a polymer piezoelectric layer.

18. The method of claim 16, wherein the metallic conductive layer is grounded.

19. The method of claim 16, wherein the ultrasound signal has a frequency in a range from about 12.5 megahertz to about 100 megahertz.

20. The method of claim 16, wherein the ultrasound signal has a frequency in a range from about 12.5 megahertz to about 50 megahertz.

* * * * *